US008678896B2

(12) United States Patent
Pitsch et al.

(10) Patent No.: US 8,678,896 B2
(45) Date of Patent: *Mar. 25, 2014

(54) SYSTEMS AND METHODS FOR ASYNCHRONOUS BAND INTERACTION IN A RHYTHM ACTION GAME

(75) Inventors: Geoff Pitsch, Somerville, MA (US); Daniel Charles Teasdale, Cambridge, MA (US); Daniel Asher Brakeley, Cambridge, MA (US); Daniel Schmidt, Somerville, MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 665 days.

This patent is subject to a terminal disclaimer.

(21) Appl. No.: 12/559,279

(22) Filed: Sep. 14, 2009

(65) Prior Publication Data

US 2010/0029386 A1 Feb. 4, 2010

Related U.S. Application Data

(63) Continuation-in-part of application No. 12/140,000, filed on Jun. 16, 2008.

(60) Provisional application No. 60/944,054, filed on Jun. 14, 2007.

(51) Int. Cl.
*A63F 13/00* (2006.01)
*G06F 17/00* (2006.01)

(52) U.S. Cl.
USPC .................................. 463/7; 463/42; 463/35

(58) Field of Classification Search
USPC .......................................................... 463/35
See application file for complete search history.

(56) References Cited

U.S. PATENT DOCUMENTS 3,430,530 A 3/1963 Fletcher
D211,666 S 7/1968 MacGillavry
(Continued)

FOREIGN PATENT DOCUMENTS

AT 468071 T 6/2010
AU 741239 B2 4/1999
(Continued)

OTHER PUBLICATIONS

"Guitar Hero," In Wikipedia Online Encyclopedia. Wikipedia, 2007, Retrieved from the Internet: <URL: http://en.wikipedia.org/w/index.php?title=guitary_hero&oldid=137778068>, 5 pages) (retrieved May 22, 2012).

(Continued)

*Primary Examiner* — Melba Bumgarner
*Assistant Examiner* — Anh Vo V Nguyen
(74) *Attorney, Agent, or Firm* — Wilmer Cutler Pickering Hale and Dorr LLP

(57) ABSTRACT

Provided are methods and systems and computer readable media for providing interaction between remote players and one or more local players of a rhythm-action game executed on a game platform. One or more local players is identified to participate in a networked session of a rhythm action game corresponding to a predetermined band template, each local player associated with a type of simulated musical instrument. A first type of simulated musical instrument, represented in the predetermined band template and not associated with any of the one or more local players, may then be identified, along with a remote player associated with the first type of simulated musical instrument. Then, game platforms of the local and remote players communicate to establish a networked session of the rhythm action game with the one or more local players and the identified remote player before initiating a game session where the players play the game.

24 Claims, 14 Drawing Sheets

(56) References Cited

U.S. PATENT DOCUMENTS

| | | |
|---|---|---|
| 3,897,711 A | 8/1975 | Elledge |
| D245,038 S | 7/1977 | Ebata et al. |
| D247,795 S | 4/1978 | Darrell |
| 4,128,037 A | 12/1978 | Montemurro |
| D259,785 S | 7/1981 | Kushida et al. |
| 4,295,406 A | 10/1981 | Smith |
| D262,017 S | 11/1981 | Frakes, Jr. |
| D265,821 S | 8/1982 | Okada et al. |
| D266,664 S | 10/1982 | Hoshino et al. |
| D287,521 S | 12/1986 | Obara |
| 4,644,495 A | 2/1987 | Crane |
| 4,766,541 A | 8/1988 | Bleich et al. |
| 4,783,812 A | 11/1988 | Kaneoka |
| 4,794,838 A | 1/1989 | Corrigau, III |
| 4,843,568 A | 6/1989 | Krueger et al. |
| 4,890,833 A | 1/1990 | Lantz et al. |
| D310,668 S | 9/1990 | Takada |
| 5,074,182 A | 12/1991 | Capps et al. |
| 5,107,743 A | 4/1992 | Decker |
| 5,109,482 A | 4/1992 | Bohrman |
| 5,140,889 A | 8/1992 | Segan et al. |
| 5,194,683 A | 3/1993 | Tsumura et al. |
| 5,208,413 A | 5/1993 | Tsumura et al. |
| 5,250,745 A | 10/1993 | Tsumura |
| 5,262,765 A | 11/1993 | Tsumura et al. |
| 5,287,789 A | 2/1994 | Zimmerman |
| D345,554 S | 3/1994 | Dones |
| 5,362,049 A | 11/1994 | Hofer |
| 5,368,309 A | 11/1994 | Monroe et al. |
| 5,393,926 A | 2/1995 | Johnson |
| 5,395,123 A | 3/1995 | Kondo |
| 5,398,585 A | 3/1995 | Starr |
| 5,399,799 A | 3/1995 | Gabriel |
| 5,434,949 A | 7/1995 | Jeong |
| 5,453,570 A | 9/1995 | Umeda et al. |
| 5,464,946 A | 11/1995 | Lewis |
| 5,482,087 A | 1/1996 | Overbergh et al. |
| 5,488,196 A | 1/1996 | Zimmerman et al. |
| 5,491,297 A | 2/1996 | Johnson et al. |
| 5,510,573 A | 4/1996 | Cho et al. |
| 5,513,129 A | 4/1996 | Bolas et al. |
| 5,524,637 A | 6/1996 | Erickson |
| 5,534,917 A | 7/1996 | MacDougall |
| 5,537,528 A | 7/1996 | Takahashi et al. |
| 5,553,864 A | 9/1996 | Sitrick |
| 5,557,056 A | 9/1996 | Hong et al. |
| 5,557,057 A | 9/1996 | Starr |
| 5,563,358 A | 10/1996 | Zimmerman |
| 5,565,639 A | 10/1996 | Bae |
| 5,567,162 A | 10/1996 | Park |
| 5,568,275 A | 10/1996 | Norton et al. |
| 5,574,238 A | 11/1996 | Mencher |
| 5,613,909 A | 3/1997 | Stelovsky |
| 5,616,078 A | 4/1997 | Oh |
| 5,627,335 A | 5/1997 | Rigopulos et al. |
| 5,631,433 A | 5/1997 | Iida et al. |
| 5,634,849 A | 6/1997 | Abecassis |
| 5,663,517 A | 9/1997 | Oppenheim |
| 5,670,729 A | 9/1997 | Miller et al. |
| 5,681,223 A | 10/1997 | Weinreich |
| 5,693,903 A | 12/1997 | Heidorn et al. |
| D389,216 S | 1/1998 | Isetani et al. |
| 5,704,836 A | 1/1998 | Norton et al. |
| 5,715,179 A | 2/1998 | Park |
| 5,719,344 A | 2/1998 | Pawate |
| 5,723,802 A | 3/1998 | Johnson et al. |
| 5,734,961 A | 3/1998 | Castille |
| 5,739,457 A | 4/1998 | Devecka |
| 5,763,804 A | 6/1998 | Rigopulos et al. |
| 5,768,396 A | 6/1998 | Sone |
| 5,777,251 A | 7/1998 | Hotta et al. |
| 5,782,692 A | 7/1998 | Stelovsky |
| D398,916 S | 9/1998 | Bernardi |
| 5,804,752 A | 9/1998 | Sone et al. |
| D399,887 S | 10/1998 | Schultz et al. |
| D400,196 S | 10/1998 | Cameron et al. |
| 5,824,933 A | 10/1998 | Gabriel |
| 5,825,427 A | 10/1998 | MacLeod |
| 5,830,065 A | 11/1998 | Sitrick |
| 5,833,469 A | 11/1998 | Ito et al. |
| D403,024 S | 12/1998 | Muraki et al. |
| 5,861,881 A | 1/1999 | Freeman et al. |
| 5,874,686 A | 2/1999 | Ghias et al. |
| 5,880,788 A | 3/1999 | Bregler |
| 5,886,275 A | 3/1999 | Kato et al. |
| 5,889,224 A | 3/1999 | Tanaka |
| 5,906,494 A | 5/1999 | Ogawa et al. |
| D411,258 S | 6/1999 | Isetani et al. |
| 5,913,727 A | 6/1999 | Ahdoot |
| 5,915,288 A | 6/1999 | Gabriel |
| 5,915,972 A | 6/1999 | Tada |
| 5,915,975 A | 6/1999 | McGrath |
| 5,925,843 A | 7/1999 | Miller et al. |
| 5,953,005 A | 9/1999 | Liu |
| 5,953,485 A | 9/1999 | Abecassis |
| 5,969,716 A | 10/1999 | Davis et al. |
| 5,983,280 A | 11/1999 | Hunt |
| 5,990,405 A | 11/1999 | Auten et al. |
| 5,999,173 A | 12/1999 | Ubillos |
| 6,001,013 A | 12/1999 | Ota |
| 6,009,457 A | 12/1999 | Moller |
| 6,011,212 A | 1/2000 | Rigopulos et al. |
| 6,016,380 A | 1/2000 | Norton |
| 6,018,121 A | 1/2000 | Devecka |
| 6,032,156 A | 2/2000 | Marcus |
| 6,065,042 A | 5/2000 | Reimer et al. |
| 6,066,792 A | 5/2000 | Sone |
| 6,067,126 A | 5/2000 | Alexander |
| 6,067,566 A | 5/2000 | Moline |
| 6,072,113 A | 6/2000 | Tohgi et al. |
| 6,072,480 A | 6/2000 | Gorbet et al. |
| 6,073,489 A | 6/2000 | French et al. |
| 6,074,215 A | 6/2000 | Tsurumi |
| 6,075,197 A | 6/2000 | Chan |
| 6,083,009 A | 7/2000 | Kim et al. |
| 6,091,408 A | 7/2000 | Treibitz et al. |
| 6,098,458 A | 8/2000 | French et al. |
| 6,118,444 A | 9/2000 | Garmon et al. |
| 6,121,531 A | 9/2000 | Kato |
| 6,142,870 A | 11/2000 | Wada et al. |
| 6,150,947 A | 11/2000 | Shima |
| 6,162,981 A | 12/2000 | Newcomer et al. |
| 6,166,314 A | 12/2000 | Weinstock et al. |
| 6,177,623 B1 | 1/2001 | Ooseki |
| 6,182,044 B1 | 1/2001 | Fong et al. |
| 6,184,899 B1 | 2/2001 | Akemann |
| 6,191,350 B1 | 2/2001 | Okulov et al. |
| 6,215,411 B1 | 4/2001 | Gothard |
| 6,224,486 B1 | 5/2001 | Walker et al. |
| 6,227,968 B1 | 5/2001 | Suzuki et al. |
| 6,227,974 B1 | 5/2001 | Eilat et al. |
| 6,243,087 B1 | 6/2001 | Davis et al. |
| 6,243,092 B1 | 6/2001 | Okita et al. |
| 6,252,153 B1 | 6/2001 | Toyama |
| 6,262,724 B1 | 7/2001 | Crow et al. |
| 6,263,392 B1 | 7/2001 | McCauley |
| 6,268,557 B1 | 7/2001 | Devecka |
| 6,283,860 B1 | 9/2001 | Lyons et al. |
| 6,287,198 B1 | 9/2001 | McCauley |
| 6,288,727 B1 | 9/2001 | Akemann |
| 6,292,620 B1 | 9/2001 | Ohmori et al. |
| 6,307,576 B1 | 10/2001 | Rosenfeld |
| 6,308,565 B1 | 10/2001 | French et al. |
| 6,309,301 B1 | 10/2001 | Sano |
| 6,319,129 B1 | 11/2001 | Igarashi et al. |
| 6,319,130 B1 | 11/2001 | Ooseki et al. |
| 6,320,110 B1 | 11/2001 | Ishikawa et al. |
| 6,326,536 B1 | 12/2001 | Wang |
| 6,329,620 B1 | 12/2001 | Oishi et al. |
| 6,337,433 B1 | 1/2002 | Nishimoto |
| 6,350,942 B1 | 2/2002 | Thomson |
| 6,352,432 B1 | 3/2002 | Tsai et al. |
| 6,353,174 B1 | 3/2002 | Schmidt et al. |
| D455,792 S | 4/2002 | Isetani et al. |

(56) References Cited

U.S. PATENT DOCUMENTS

| | | |
|---|---|---|
| 6,369,313 B2 | 4/2002 | Devecka |
| 6,379,244 B1 | 4/2002 | Sagawa et al. |
| 6,380,474 B2 | 4/2002 | Taruguchi et al. |
| 6,380,950 B1 | 4/2002 | Montgomery et al. |
| 6,384,736 B1 | 5/2002 | Gothard |
| 6,392,133 B1 | 5/2002 | Georges |
| 6,407,324 B1 | 6/2002 | Hulcher |
| 6,410,835 B2 | 6/2002 | Suzuki et al. |
| 6,417,432 B1 | 7/2002 | Downing |
| 6,425,822 B1 | 7/2002 | Hayashida et al. |
| 6,425,825 B1 | 7/2002 | Sitrick |
| 6,425,827 B1 | 7/2002 | Nimura |
| 6,425,828 B2 | 7/2002 | Walker et al. |
| 6,429,863 B1 | 8/2002 | LoPiccolo et al. |
| 6,430,997 B1 | 8/2002 | French et al. |
| 6,437,227 B1 | 8/2002 | Theimer |
| D462,698 S | 9/2002 | Sturm |
| 6,444,887 B1 | 9/2002 | Hiraoka et al. |
| 6,450,886 B1 | 9/2002 | Oishi et al. |
| 6,450,888 B1 | 9/2002 | Takase et al. |
| 6,461,239 B1 | 10/2002 | Sagawa et al. |
| 6,463,205 B1 | 10/2002 | Aschbrenner et al. |
| 6,464,585 B1 | 10/2002 | Miyamoto et al. |
| 6,468,161 B1 | 10/2002 | Shimomura |
| 6,471,584 B1 | 10/2002 | Wada et al. |
| 6,482,087 B1 | 11/2002 | Egozy et al. |
| 6,483,018 B2 | 11/2002 | Mead |
| 6,504,089 B1 | 1/2003 | Nagasawa et al. |
| 6,504,990 B1 | 1/2003 | Abecassis |
| 6,506,969 B1 | 1/2003 | Baron |
| 6,514,083 B1 | 2/2003 | Kumar et al. |
| 6,527,639 B2 | 3/2003 | Suzuki |
| 6,530,834 B2 | 3/2003 | Kondo |
| 6,530,839 B2 | 3/2003 | Horio |
| 6,535,269 B2 | 3/2003 | Sherman et al. |
| 6,540,613 B2 | 4/2003 | Okubo et al. |
| 6,542,155 B1 | 4/2003 | Mifune et al. |
| 6,542,168 B2 | 4/2003 | Negishi et al. |
| 6,544,119 B2 | 4/2003 | Kubo et al. |
| 6,544,122 B2 | 4/2003 | Araki et al. |
| 6,544,125 B2 | 4/2003 | Horigami et al. |
| 6,554,706 B2 | 4/2003 | Kim et al. |
| 6,554,711 B1 | 4/2003 | Kawasaki et al. |
| 6,555,737 B2 | 4/2003 | Miyaki et al. |
| 6,570,078 B2 | 5/2003 | Ludwig |
| 6,577,330 B1 | 6/2003 | Tsuda et al. |
| 6,582,235 B1 | 6/2003 | Tsai et al. |
| 6,582,309 B2 | 6/2003 | Higurashi et al. |
| 6,589,120 B1 | 7/2003 | Takahashi |
| 6,598,074 B1 | 7/2003 | Moller et al. |
| 6,599,195 B1 | 7/2003 | Araki et al. |
| 6,607,446 B1 | 8/2003 | Shimomura et al. |
| 6,608,249 B2 | 8/2003 | Georges |
| 6,609,979 B1 | 8/2003 | Wada |
| 6,611,278 B2 | 8/2003 | Rosenfeld |
| 6,612,931 B2 | 9/2003 | Kojima et al. |
| 6,613,100 B2 | 9/2003 | Miller |
| 6,618,053 B1 | 9/2003 | Tanner |
| 6,621,503 B1 | 9/2003 | Ubillos |
| 6,623,358 B2 | 9/2003 | Harima |
| 6,629,892 B2 | 10/2003 | Oe et al. |
| 6,634,886 B2 | 10/2003 | Oyama et al. |
| 6,636,877 B1 | 10/2003 | Doleac et al. |
| 6,638,160 B2 | 10/2003 | Yoshitomi |
| 6,645,076 B1 | 11/2003 | Sugai |
| 6,645,784 B2 | 11/2003 | Tayebati et al. |
| 6,659,873 B1 | 12/2003 | Kitano et al. |
| 6,661,496 B2 | 12/2003 | Sherman et al. |
| 6,663,491 B2 | 12/2003 | Watabe et al. |
| 6,666,764 B1 | 12/2003 | Kudo |
| 6,669,563 B1 | 12/2003 | Kitami et al. |
| 6,676,523 B1 | 1/2004 | Kasai et al. |
| 6,682,424 B2 | 1/2004 | Yamauchi et al. |
| 6,684,480 B2 | 2/2004 | Conrad |
| 6,685,480 B2 | 2/2004 | Nishimoto et al. |
| 6,695,694 B2 | 2/2004 | Ishikawa et al. |
| 6,712,692 B2 | 3/2004 | Basson et al. |
| 6,725,108 B1 | 4/2004 | Hall |
| 6,727,889 B2 | 4/2004 | Shaw |
| 6,733,382 B2 | 5/2004 | Oe et al. |
| 6,738,052 B1 | 5/2004 | Manke et al. |
| 6,740,802 B1 | 5/2004 | Browne, Jr. |
| 6,740,803 B2 | 5/2004 | Brinkman et al. |
| 6,743,099 B2 | 6/2004 | Yabe et al. |
| 6,749,432 B2 | 6/2004 | French et al. |
| 6,749,508 B2 | 6/2004 | Kohira et al. |
| 6,750,848 B1 | 6/2004 | Pryor |
| 6,758,753 B1 | 7/2004 | Nagata et al. |
| 6,758,756 B1 | 7/2004 | Horigami et al. |
| 6,764,399 B2 | 7/2004 | Nagata et al. |
| 6,765,590 B1 | 7/2004 | Watahiki et al. |
| 6,765,726 B2 | 7/2004 | French et al. |
| 6,767,282 B2 | 7/2004 | Matsuyama et al. |
| 6,769,689 B1 | 8/2004 | Shimomura et al. |
| 6,786,821 B2 | 9/2004 | Nobe et al. |
| 6,801,930 B1 | 10/2004 | Dionne et al. |
| 6,811,491 B1 | 11/2004 | Levenberg et al. |
| 6,821,203 B2 | 11/2004 | Suga et al. |
| 6,831,220 B2 | 12/2004 | Varme |
| 6,831,656 B2 | 12/2004 | Kitao |
| 6,835,136 B2 | 12/2004 | Kitao |
| 6,835,887 B2 | 12/2004 | Devecka |
| 6,838,608 B2 | 1/2005 | Koike |
| 6,843,726 B1 | 1/2005 | Nomi et al. |
| 6,850,252 B1 | 2/2005 | Hoffberg |
| 6,852,034 B2 | 2/2005 | Nagata et al. |
| 6,856,923 B2 | 2/2005 | Jung |
| 6,857,960 B2 | 2/2005 | Okubo et al. |
| D503,407 S | 3/2005 | Kaku |
| 6,876,496 B2 | 4/2005 | French et al. |
| 6,881,148 B2 | 4/2005 | Yotsugi et al. |
| 6,881,887 B2 | 4/2005 | Berens |
| 6,890,262 B2 | 5/2005 | Oishi et al. |
| 6,893,343 B2 | 5/2005 | Suda et al. |
| 6,894,693 B1 | 5/2005 | Nash |
| 6,898,637 B2 | 5/2005 | Curtin |
| 6,915,488 B2 | 7/2005 | Omori et al. |
| 6,921,332 B2 | 7/2005 | Fukunaga et al. |
| 6,930,235 B2 | 8/2005 | Sandborn et al. |
| 6,930,236 B2 | 8/2005 | Jung |
| 6,936,758 B2 | 8/2005 | Itoh |
| 6,949,023 B1 | 9/2005 | Okubo et al. |
| 6,953,887 B2 | 10/2005 | Nagashima et al. |
| 6,964,610 B2 | 11/2005 | Yamauchi et al. |
| 6,967,275 B2 | 11/2005 | Ozick |
| 6,976,918 B2 | 12/2005 | Hosokawa |
| 6,991,542 B2 | 1/2006 | Asami et al. |
| 6,995,765 B2 | 2/2006 | Boudier |
| 6,995,869 B2 | 2/2006 | Onodera |
| 6,998,527 B2 | 2/2006 | Agnihotri |
| 7,000,200 B1 | 2/2006 | Martins |
| 7,001,272 B2 | 2/2006 | Yamashita et al. |
| 7,010,291 B2 | 3/2006 | Iwanaga |
| D519,569 S | 4/2006 | Kiyono et al. |
| 7,022,905 B1 | 4/2006 | Hinman et al. |
| 7,027,046 B2 | 4/2006 | Zhang |
| 7,027,124 B2 | 4/2006 | Foote et al. |
| 7,030,307 B2 | 4/2006 | Wedel |
| 7,030,311 B2 | 4/2006 | Brinkman et al. |
| 7,037,197 B2 | 5/2006 | Watanabe |
| 7,038,855 B2 | 5/2006 | French et al. |
| 7,044,856 B2 | 5/2006 | Suzuki |
| 7,044,857 B1 | 5/2006 | Klitsner et al. |
| 7,064,672 B2 | 6/2006 | Gothard |
| 7,066,818 B2 | 6/2006 | Ikeda |
| 7,069,296 B2 | 6/2006 | Moller et al. |
| 7,070,500 B1 | 7/2006 | Nomi et al. |
| 7,071,914 B1 | 7/2006 | Marks |
| 7,074,999 B2 | 7/2006 | Sitrick et al. |
| 7,076,052 B2 | 7/2006 | Yoshimura |
| 7,079,026 B2 | 7/2006 | Smith |
| 7,079,114 B1 | 7/2006 | Smith et al. |
| 7,084,855 B2 | 8/2006 | Kaku et al. |
| 7,084,888 B2 | 8/2006 | Takahama et al. |

(56) References Cited

U.S. PATENT DOCUMENTS

| | | |
|---|---|---|
| 7,098,392 B2 | 8/2006 | Sitrick et al. |
| 7,098,921 B2 | 8/2006 | Nash et al. |
| 7,103,873 B2 | 9/2006 | Tanner et al. |
| 7,119,268 B2 | 10/2006 | Futamase et al. |
| 7,122,751 B1 | 10/2006 | Anderson et al. |
| 7,123,272 B2 | 10/2006 | Moriyama |
| 7,126,607 B2 | 10/2006 | Emerson |
| 7,128,649 B2 | 10/2006 | Nobe et al. |
| 7,129,408 B2 | 10/2006 | Uehara |
| 7,134,876 B2 | 11/2006 | Hou |
| 7,142,807 B2 | 11/2006 | Lee |
| 7,143,353 B2 | 11/2006 | McGee et al. |
| 7,145,070 B2 | 12/2006 | Barry |
| D535,659 S | 1/2007 | Hally et al. |
| 7,164,075 B2 | 1/2007 | Tada |
| 7,164,076 B2 | 1/2007 | McHale et al. |
| 7,169,998 B2 | 1/2007 | Kondo et al. |
| 7,170,510 B2 | 1/2007 | Kawahara et al. |
| 7,174,510 B2 | 2/2007 | Salter |
| 7,189,912 B2 | 3/2007 | Jung |
| 7,192,353 B2 | 3/2007 | Okubo |
| 7,194,676 B2 | 3/2007 | Fayan et al. |
| 7,199,298 B2 | 4/2007 | Funaki |
| 7,199,801 B2 | 4/2007 | Tsunashima et al. |
| 7,201,659 B2 | 4/2007 | Nakayama et al. |
| 7,221,852 B2 | 5/2007 | Iizuka et al. |
| 7,223,913 B2 | 5/2007 | Knapp et al. |
| 7,227,526 B2 | 6/2007 | Hildreth et al. |
| 7,259,357 B2 | 8/2007 | Walker |
| 7,259,971 B1 | 8/2007 | Allen et al. |
| 7,263,668 B1 | 8/2007 | Lentz |
| 7,271,329 B2 | 9/2007 | Franzblau |
| 7,272,780 B2 | 9/2007 | Abbott et al. |
| 7,274,803 B1 | 9/2007 | Sharma et al. |
| 7,304,232 B1 | 12/2007 | Nicholes |
| 7,317,812 B1 | 1/2008 | Krahnstoever et al. |
| 7,320,643 B1 | 1/2008 | Brosius et al. |
| 7,323,631 B2 | 1/2008 | Miyaki et al. |
| 7,324,165 B2 | 1/2008 | Shan et al. |
| 7,336,890 B2 | 2/2008 | Lu et al. |
| 7,346,472 B1 | 3/2008 | Moskowitz et al. |
| 7,352,359 B2 | 4/2008 | Zalewski et al. |
| 7,352,952 B2 | 4/2008 | Herberger et al. |
| 7,359,121 B2 | 4/2008 | French et al. |
| 7,359,617 B2 | 4/2008 | Ma |
| D568,659 S | 5/2008 | Ophardt et al. |
| D568,892 S | 5/2008 | Stabb et al. |
| D569,382 S | 5/2008 | Yow et al. |
| 7,367,887 B2 | 5/2008 | Watabe et al. |
| 7,383,508 B2 | 6/2008 | Toyama et al. |
| 7,391,409 B2 | 6/2008 | Zalewski et al. |
| 7,391,874 B1 | 6/2008 | Semmes, Jr. et al. |
| D572,265 S | 7/2008 | Guimaraes et al. |
| 7,398,002 B2 | 7/2008 | Hsiao et al. |
| 7,408,106 B2 | 8/2008 | Weiner et al. |
| 7,423,213 B2 | 9/2008 | Sitrick |
| 7,430,360 B2 | 9/2008 | Abecassis |
| 7,432,810 B2 | 10/2008 | Menache et al. |
| 7,435,178 B1 | 10/2008 | Tam et al. |
| 7,453,035 B1 | 11/2008 | Evans et al. |
| 7,458,025 B2 | 11/2008 | Crow et al. |
| 7,459,324 B1 | 12/2008 | Ptasinski et al. |
| 7,459,624 B2 | 12/2008 | Schmidt et al. |
| 7,462,772 B2 | 12/2008 | Salter |
| 7,480,446 B2 | 1/2009 | Bhadkamkar et al. |
| 7,480,873 B2 | 1/2009 | Kawahara |
| 7,488,886 B2 | 2/2009 | Kemp |
| D590,407 S | 4/2009 | Watanabe et al. |
| 7,521,619 B2 | 4/2009 | Salter |
| 7,528,315 B2 | 5/2009 | Goodwin |
| 7,536,654 B2 | 5/2009 | Anthony et al. |
| 7,546,130 B2 | 6/2009 | Vance |
| 7,559,834 B1 | 7/2009 | York |
| 7,559,841 B2 | 7/2009 | Hashimoto |
| 7,579,543 B2 | 8/2009 | Haruyama et al. |
| D599,812 S | 9/2009 | Hirsch |
| D599,819 S | 9/2009 | Lew |
| 7,582,015 B2 | 9/2009 | Onoda et al. |
| 7,589,727 B2 | 9/2009 | Haeker |
| 7,593,618 B2 | 9/2009 | Xu et al. |
| 7,599,554 B2 | 10/2009 | Agnihotri et al. |
| 7,605,322 B2 | 10/2009 | Nakamura |
| 7,612,278 B2 | 11/2009 | Sitrick et al. |
| 7,625,284 B2 | 12/2009 | Kay et al. |
| 7,628,699 B2 | 12/2009 | Onoda et al. |
| 7,640,069 B1 | 12/2009 | Johnston |
| D607,892 S | 1/2010 | Murchie et al. |
| 7,649,134 B2 | 1/2010 | Kashioka |
| D609,715 S | 2/2010 | Chaudhri |
| 7,660,510 B2 | 2/2010 | Kawahara et al. |
| 7,660,700 B2 | 2/2010 | Moskowitz et al. |
| 7,690,017 B2 | 3/2010 | Stecyk et al. |
| 7,692,630 B2 | 4/2010 | Natsume et al. |
| 7,714,849 B2 | 5/2010 | Pryor |
| 7,716,572 B2 | 5/2010 | Beauregard et al. |
| 7,722,450 B2 | 5/2010 | Onoda et al. |
| 7,747,348 B2 | 6/2010 | Shim et al. |
| D619,598 S | 7/2010 | Maitlen et al. |
| D619,609 S | 7/2010 | Meziere |
| 7,754,961 B1 | 7/2010 | Yang et al. |
| 7,758,427 B2 | 7/2010 | Egozy |
| 7,760,908 B2 | 7/2010 | Curtner et al. |
| 7,772,480 B2 | 8/2010 | Brennan |
| 7,774,706 B2 | 8/2010 | Sakai |
| 7,791,808 B2 | 9/2010 | French et al. |
| 7,797,641 B2 | 9/2010 | Karukka et al. |
| D624,932 S | 10/2010 | Chaudhri |
| 7,806,759 B2 | 10/2010 | McHale et al. |
| 7,814,436 B2 | 10/2010 | Schrag et al. |
| 7,823,070 B2 | 10/2010 | Nelson et al. |
| 7,829,777 B2 | 11/2010 | Kyuma et al. |
| 7,838,755 B2 | 11/2010 | Taub et al. |
| 7,840,288 B2 | 11/2010 | Graepel |
| 7,840,907 B2 | 11/2010 | Kikuchi et al. |
| D628,582 S | 12/2010 | Kurozumi et al. |
| 7,853,896 B2 | 12/2010 | Ok et al. |
| 7,853,897 B2 | 12/2010 | Ogawa et al. |
| 7,865,834 B1 | 1/2011 | van Os et al. |
| 7,877,690 B2 | 1/2011 | Margulis |
| 7,881,702 B2 | 2/2011 | Heyworth et al. |
| 7,890,867 B1 | 2/2011 | Margulis |
| 7,893,337 B2 | 2/2011 | Lenz |
| 7,895,617 B2 | 2/2011 | Pedlow, Jr. |
| 7,899,389 B2 | 3/2011 | Mangum |
| 7,904,814 B2 | 3/2011 | Errico et al. |
| 7,917,644 B2 | 3/2011 | Vedantham et al. |
| 7,920,931 B2 | 4/2011 | Van de Sluis et al. |
| 7,923,620 B2 | 4/2011 | Foster |
| 7,928,307 B2 | 4/2011 | Hetherington et al. |
| 7,935,880 B2 | 5/2011 | Stoddard et al. |
| 7,949,494 B2 | 5/2011 | Moskowitz et al. |
| 7,973,230 B2 | 7/2011 | Mahowald |
| 7,980,997 B2 | 7/2011 | Thukral et al. |
| 7,982,114 B2 | 7/2011 | Applewhite et al. |
| 8,003,872 B2 | 8/2011 | Lopiccolo et al. |
| 8,010,088 B2 | 8/2011 | Cheng |
| 8,026,435 B2 | 9/2011 | Stoddard et al. |
| 8,057,290 B2 | 11/2011 | Vance et al. |
| D650,802 S | 12/2011 | Jang et al. |
| 8,076,564 B2 | 12/2011 | Applewhite |
| 8,076,574 B2 | 12/2011 | Irmer et al. |
| 8,079,901 B2 | 12/2011 | Brosius et al. |
| 8,079,907 B2 | 12/2011 | Egozy |
| 8,080,722 B2 | 12/2011 | Applewhite et al. |
| D651,608 S | 1/2012 | Allen et al. |
| D651,609 S | 1/2012 | Pearson et al. |
| 8,176,439 B2 | 5/2012 | Kamen et al. |
| 8,198,526 B2 | 6/2012 | Izen et al. |
| 8,202,161 B2 | 6/2012 | Leake et al. |
| 8,205,172 B2 | 6/2012 | Wong et al. |
| 8,209,606 B2 | 6/2012 | Ording |
| 8,214,175 B2 | 7/2012 | Moskowitz et al. |
| 8,225,227 B2 | 7/2012 | Headrick et al. |
| 8,230,360 B2 | 7/2012 | Ma et al. |

(56) References Cited

U.S. PATENT DOCUMENTS

| | | |
|---|---|---|
| D664,975 S | 8/2012 | Arnold |
| 2001/0004861 A1 | 6/2001 | Suzuki et al. |
| 2001/0007824 A1 | 7/2001 | Fukuda |
| 2001/0007829 A1 | 7/2001 | Suzuki |
| 2001/0008844 A1 | 7/2001 | Yamauchi et al. |
| 2001/0008846 A1 | 7/2001 | Yamauchi et al. |
| 2001/0012795 A1 | 8/2001 | Asami et al. |
| 2001/0014440 A1 | 8/2001 | Oyama et al. |
| 2001/0014620 A1 | 8/2001 | Nobe et al. |
| 2001/0014621 A1 | 8/2001 | Okubo et al. |
| 2001/0016510 A1 | 8/2001 | Ishikawa et al. |
| 2001/0023202 A1 | 9/2001 | Okubo |
| 2001/0024972 A1 | 9/2001 | Kitao |
| 2001/0030652 A1 | 10/2001 | Kitao |
| 2001/0031653 A1 | 10/2001 | Oe et al. |
| 2001/0033287 A1 | 10/2001 | Naegle et al. |
| 2001/0035868 A1 | 11/2001 | Uehara et al. |
| 2001/0036861 A1 | 11/2001 | Uehara et al. |
| 2001/0037181 A1 | 11/2001 | Matsuura et al. |
| 2001/0039207 A1 | 11/2001 | Horigami et al. |
| 2001/0041615 A1 | 11/2001 | Kondo |
| 2002/0002411 A1 | 1/2002 | Higurashi et al. |
| 2002/0002900 A1 | 1/2002 | Cho |
| 2002/0004420 A1 | 1/2002 | Suga et al. |
| 2002/0005109 A1 | 1/2002 | Miller |
| 2002/0006819 A1 | 1/2002 | Kubo et al. |
| 2002/0006823 A1 | 1/2002 | Horio |
| 2002/0013166 A1 | 1/2002 | Yoshitomi |
| 2002/0016203 A1 | 2/2002 | Nagata et al. |
| 2002/0019258 A1 | 2/2002 | Kim et al. |
| 2002/0022520 A1 | 2/2002 | Oe et al. |
| 2002/0022522 A1 | 2/2002 | Yamada |
| 2002/0025841 A1 | 2/2002 | Nobe et al. |
| 2002/0025853 A1 | 2/2002 | Kojima et al. |
| 2002/0027899 A1 | 3/2002 | Ikeda |
| 2002/0032054 A1 | 3/2002 | Hosoya |
| 2002/0041385 A1 | 4/2002 | Onodera |
| 2002/0052236 A1 | 5/2002 | Kohira et al. |
| 2002/0054127 A1 | 5/2002 | Omori et al. |
| 2002/0055383 A1 | 5/2002 | Onda et al. |
| 2002/0055386 A1 | 5/2002 | Yotsugi et al. |
| 2002/0061776 A1 | 5/2002 | Wada et al. |
| 2002/0065121 A1 | 5/2002 | Fukunaga et al. |
| 2002/0085833 A1 | 7/2002 | Miyauchi |
| 2002/0091455 A1 | 7/2002 | Williams |
| 2002/0091847 A1 | 7/2002 | Curtin |
| 2002/0094865 A1 | 7/2002 | Araki et al. |
| 2002/0094866 A1 | 7/2002 | Takeda et al. |
| 2002/0105229 A1 | 8/2002 | Tanaka |
| 2002/0119811 A1 | 8/2002 | Yabe et al. |
| 2002/0128736 A1 | 9/2002 | Yoshida et al. |
| 2002/0142818 A1 | 10/2002 | Nakatsuka et al. |
| 2002/0142824 A1 | 10/2002 | Kazaoka et al. |
| 2002/0142827 A1 | 10/2002 | Aida et al. |
| 2002/0142834 A1 | 10/2002 | Sobue |
| 2002/0151337 A1 | 10/2002 | Yamashita et al. |
| 2002/0160824 A1 | 10/2002 | Goto et al. |
| 2002/0169014 A1 | 11/2002 | Egozy et al. |
| 2002/0187835 A1 | 12/2002 | Nakayama et al. |
| 2002/0198045 A1 | 12/2002 | Okubo |
| 2003/0003431 A1 | 1/2003 | Maeda |
| 2003/0003991 A1 | 1/2003 | Kuraishi |
| 2003/0003992 A1 | 1/2003 | Furuya |
| 2003/0011620 A1 | 1/2003 | Moriyama |
| 2003/0017872 A1 | 1/2003 | Oishi et al. |
| 2003/0028598 A1 | 2/2003 | Moller et al. |
| 2003/0032478 A1 | 2/2003 | Takahama et al. |
| 2003/0045334 A1 | 3/2003 | Hosokawa |
| 2003/0069071 A1 | 4/2003 | Britt et al. |
| 2003/0078086 A1 | 4/2003 | Matsuyama et al. |
| 2003/0078102 A1 | 4/2003 | Okita et al. |
| 2003/0099461 A1 | 5/2003 | Johnson |
| 2003/0104868 A1 | 6/2003 | Okita et al. |
| 2003/0109298 A1 | 6/2003 | Oishi et al. |
| 2003/0164084 A1* | 9/2003 | Redmann et al. .............. 84/615 |
| 2003/0218626 A1 | 11/2003 | Greene |
| 2003/0232644 A1 | 12/2003 | Takahashi et al. |
| 2003/0232645 A1 | 12/2003 | Suda et al. |
| 2004/0021684 A1 | 2/2004 | Millner |
| 2004/0063479 A1 | 4/2004 | Kimura |
| 2004/0063480 A1 | 4/2004 | Wang |
| 2004/0072620 A1 | 4/2004 | Nagata et al. |
| 2004/0077405 A1 | 4/2004 | Watanabe |
| 2004/0082380 A1 | 4/2004 | George et al. |
| 2004/0082386 A1 | 4/2004 | George et al. |
| 2004/0092303 A1 | 5/2004 | George et al. |
| 2004/0092304 A1 | 5/2004 | George et al. |
| 2004/0092305 A1 | 5/2004 | George et al. |
| 2004/0092306 A1 | 5/2004 | George et al. |
| 2004/0092307 A1 | 5/2004 | George et al. |
| 2004/0092313 A1 | 5/2004 | Saito et al. |
| 2004/0092314 A1 | 5/2004 | George et al. |
| 2004/0098582 A1 | 5/2004 | Mori |
| 2004/0109000 A1 | 6/2004 | Chosokabe |
| 2004/0113360 A1 | 6/2004 | George et al. |
| 2004/0116069 A1 | 6/2004 | Fadavi-Ardekani et al. |
| 2004/0116184 A1 | 6/2004 | George et al. |
| 2004/0116185 A1 | 6/2004 | George et al. |
| 2004/0127282 A1 | 7/2004 | Naobayashi |
| 2004/0127291 A1 | 7/2004 | George et al. |
| 2004/0132531 A1 | 7/2004 | George et al. |
| 2004/0152514 A1 | 8/2004 | Kasai et al. |
| 2004/0186720 A1 | 9/2004 | Kemmochi |
| 2004/0204211 A1 | 10/2004 | Suzuki |
| 2004/0204238 A1 | 10/2004 | Aoki |
| 2004/0207774 A1 | 10/2004 | Gothard |
| 2004/0209673 A1 | 10/2004 | Shiraishi |
| 2004/0236543 A1 | 11/2004 | Stephens |
| 2004/0239678 A1 | 12/2004 | Tsunashima et al. |
| 2004/0243482 A1 | 12/2004 | Laut |
| 2004/0254016 A1 | 12/2004 | Shimazaki |
| 2004/0259632 A1 | 12/2004 | Crittenden et al. |
| 2004/0259644 A1 | 12/2004 | McCauley |
| 2005/0027381 A1 | 2/2005 | George et al. |
| 2005/0027383 A1 | 2/2005 | Nagata et al. |
| 2005/0045025 A1 | 3/2005 | Wells et al. |
| 2005/0049047 A1 | 3/2005 | Kitao |
| 2005/0059480 A1 | 3/2005 | Soukup et al. |
| 2005/0060231 A1 | 3/2005 | Soukup et al. |
| 2005/0070349 A1 | 3/2005 | Kimura |
| 2005/0070359 A1* | 3/2005 | Rodriquez et al. .............. 463/42 |
| 2005/0073427 A1 | 4/2005 | Gothard |
| 2005/0075165 A1 | 4/2005 | George et al. |
| 2005/0082559 A1 | 4/2005 | Hasan Zaidi et al. |
| 2005/0101364 A1 | 5/2005 | Onoda et al. |
| 2005/0106546 A1 | 5/2005 | Strom |
| 2005/0115383 A1 | 6/2005 | Chang |
| 2005/0120865 A1* | 6/2005 | Tada .............................. 84/600 |
| 2005/0120868 A1 | 6/2005 | Hinman et al. |
| 2005/0143174 A1 | 6/2005 | Goldman et al. |
| 2005/0164779 A1 | 7/2005 | Okuniewicz |
| 2005/0181864 A1 | 8/2005 | Britt et al. |
| 2005/0215319 A1 | 9/2005 | Rigopulos et al. |
| 2005/0221892 A1 | 10/2005 | Takase |
| 2005/0227767 A1 | 10/2005 | Shimomura et al. |
| 2005/0229769 A1 | 10/2005 | Resnikoff |
| 2005/0235809 A1 | 10/2005 | Kageyama |
| 2005/0250565 A1 | 11/2005 | Nojiri et al. |
| 2005/0252362 A1 | 11/2005 | McHale et al. |
| 2005/0255923 A1 | 11/2005 | Aoki |
| 2006/0003839 A1 | 1/2006 | Lawrence et al. |
| 2006/0009282 A1 | 1/2006 | George et al. |
| 2006/0009979 A1 | 1/2006 | McHale et al. |
| 2006/0026304 A1 | 2/2006 | Price |
| 2006/0030382 A1 | 2/2006 | Okamura et al. |
| 2006/0052161 A1 | 3/2006 | Soukup et al. |
| 2006/0052162 A1 | 3/2006 | Soukup et al. |
| 2006/0052163 A1 | 3/2006 | Aida |
| 2006/0052167 A1 | 3/2006 | Boddicker et al. |
| 2006/0052169 A1 | 3/2006 | Britt et al. |
| 2006/0058099 A1 | 3/2006 | Soukup et al. |
| 2006/0058101 A1 | 3/2006 | Rigopulos |
| 2006/0063573 A1 | 3/2006 | Ishikawa et al. |
| 2006/0068911 A1 | 3/2006 | Pirich et al. |

(56) References Cited

U.S. PATENT DOCUMENTS

| | | |
|---|---|---|
| 2006/0107819 A1 | 5/2006 | Salter |
| 2006/0107822 A1 | 5/2006 | Bowen |
| 2006/0135253 A1 | 6/2006 | George et al. |
| 2006/0152622 A1 | 7/2006 | Tan et al. |
| 2006/0154710 A1 | 7/2006 | Serafat |
| 2006/0166744 A1 | 7/2006 | Igarashi et al. |
| 2006/0175758 A1 | 8/2006 | Riolo |
| 2006/0180008 A1 | 8/2006 | Negoescu et al. |
| 2006/0189879 A1 | 8/2006 | Miyajima et al. |
| 2006/0191401 A1 | 8/2006 | Ueshima et al. |
| 2006/0204214 A1 | 9/2006 | Shah et al. |
| 2006/0218239 A1 | 9/2006 | Umezawa et al. |
| 2006/0218288 A1 | 9/2006 | Umezawa et al. |
| 2006/0247046 A1 | 11/2006 | Choi et al. |
| 2006/0252503 A1 | 11/2006 | Salter |
| 2006/0258450 A1 | 11/2006 | Ishihata et al. |
| 2006/0266200 A1 | 11/2006 | Goodwin |
| 2006/0287106 A1* | 12/2006 | Jensen ............... 463/42 |
| 2006/0288842 A1 | 12/2006 | Sitrick et al. |
| 2006/0290810 A1 | 12/2006 | Mallinson |
| 2007/0015571 A1 | 1/2007 | Walker et al. |
| 2007/0026943 A1 | 2/2007 | Yoshimura |
| 2007/0059670 A1 | 3/2007 | Yates |
| 2007/0060312 A1 | 3/2007 | Dempsey et al. |
| 2007/0081562 A1 | 4/2007 | Ma |
| 2007/0088812 A1 | 4/2007 | Clark |
| 2007/0111802 A1 | 5/2007 | Ishihara et al. |
| 2007/0119292 A1 | 5/2007 | Nakamura |
| 2007/0155494 A1 | 7/2007 | Wells et al. |
| 2007/0162497 A1 | 7/2007 | Pauws |
| 2007/0163427 A1 | 7/2007 | Rigopulos et al. |
| 2007/0168415 A1 | 7/2007 | Matahira et al. |
| 2007/0175317 A1 | 8/2007 | Salter |
| 2007/0178973 A1 | 8/2007 | Camhi |
| 2007/0201815 A1 | 8/2007 | Griffin |
| 2007/0218444 A1 | 9/2007 | Konetski et al. |
| 2007/0226293 A1 | 9/2007 | Sakurada et al. |
| 2007/0232374 A1 | 10/2007 | Lopiccolo et al. |
| 2007/0234284 A1 | 10/2007 | Tanner et al. |
| 2007/0234881 A1 | 10/2007 | Takehisa |
| 2007/0234885 A1 | 10/2007 | Schmidt et al. |
| 2007/0243915 A1 | 10/2007 | Egozy et al. |
| 2007/0245881 A1 | 10/2007 | Egozy et al. |
| 2007/0256540 A1 | 11/2007 | Salter |
| 2007/0256541 A1 | 11/2007 | McCauley |
| 2007/0260984 A1 | 11/2007 | Marks et al. |
| 2007/0265095 A1 | 11/2007 | Jonishi |
| 2007/0270223 A1 | 11/2007 | Nonaka et al. |
| 2007/0273700 A1 | 11/2007 | Nash et al. |
| 2007/0297755 A1 | 12/2007 | Holt et al. |
| 2008/0009346 A1 | 1/2008 | Jessop et al. |
| 2008/0026355 A1 | 1/2008 | Petef |
| 2008/0053295 A1 | 3/2008 | Goto et al. |
| 2008/0076497 A1* | 3/2008 | Kiskis et al. ............ 463/9 |
| 2008/0096654 A1 | 4/2008 | Mondesir et al. |
| 2008/0101762 A1 | 5/2008 | Kellock et al. |
| 2008/0102958 A1* | 5/2008 | Kitamura et al. ......... 463/42 |
| 2008/0113698 A1 | 5/2008 | Egozy |
| 2008/0113797 A1 | 5/2008 | Egozy |
| 2008/0115657 A1 | 5/2008 | Wakiyama |
| 2008/0125229 A1 | 5/2008 | Jonishi |
| 2008/0146342 A1 | 6/2008 | Harvey et al. |
| 2008/0155421 A1 | 6/2008 | Ubillos et al. |
| 2008/0184870 A1 | 8/2008 | Toivola |
| 2008/0200224 A1* | 8/2008 | Parks ................ 463/7 |
| 2008/0202321 A1 | 8/2008 | Goto et al. |
| 2008/0220864 A1 | 9/2008 | Brosius et al. |
| 2008/0222685 A1 | 9/2008 | McCarthy et al. |
| 2008/0268943 A1 | 10/2008 | Jacob |
| 2008/0273755 A1 | 11/2008 | Hildreth |
| 2008/0276175 A1 | 11/2008 | Kim et al. |
| 2008/0280680 A1 | 11/2008 | Dutilly et al. |
| 2008/0288866 A1 | 11/2008 | Spencer et al. |
| 2008/0289477 A1 | 11/2008 | Salter |
| 2008/0311969 A1 | 12/2008 | Kay et al. |
| 2008/0311970 A1 | 12/2008 | Kay et al. |
| 2009/0010335 A1 | 1/2009 | Harrison et al. |
| 2009/0013253 A1 | 1/2009 | Laefer et al. |
| 2009/0015653 A1 | 1/2009 | Baek |
| 2009/0038467 A1 | 2/2009 | Brennan |
| 2009/0069096 A1 | 3/2009 | Nishimoto |
| 2009/0073117 A1 | 3/2009 | Tsurumi et al. |
| 2009/0075711 A1 | 3/2009 | Brosius et al. |
| 2009/0082078 A1 | 3/2009 | Schmidt et al. |
| 2009/0083281 A1 | 3/2009 | Sarig et al. |
| 2009/0088249 A1 | 4/2009 | Kay et al. |
| 2009/0098918 A1 | 4/2009 | Teasdale et al. |
| 2009/0100992 A1 | 4/2009 | Elion |
| 2009/0104956 A1 | 4/2009 | Kay et al. |
| 2009/0122146 A1 | 5/2009 | Zalewski et al. |
| 2009/0135135 A1 | 5/2009 | Tsurumi |
| 2009/0158220 A1 | 6/2009 | Zalewski et al. |
| 2009/0165632 A1 | 7/2009 | Rigopulos et al. |
| 2009/0177742 A1 | 7/2009 | Rhoads et al. |
| 2009/0186698 A1 | 7/2009 | Ludden |
| 2009/0188371 A1 | 7/2009 | Chiu et al. |
| 2009/0189775 A1 | 7/2009 | Lashina et al. |
| 2009/0191932 A1 | 7/2009 | Chiu et al. |
| 2009/0215533 A1 | 8/2009 | Zalewski et al. |
| 2009/0222392 A1 | 9/2009 | Martin et al. |
| 2009/0228544 A1 | 9/2009 | Demers et al. |
| 2009/0231425 A1 | 9/2009 | Zalewski |
| 2009/0233714 A1 | 9/2009 | Toro |
| 2009/0241758 A1 | 10/2009 | Neubacker |
| 2009/0258686 A1 | 10/2009 | Mccauley et al. |
| 2009/0258700 A1 | 10/2009 | Bright et al. |
| 2009/0258703 A1 | 10/2009 | Brunstetter |
| 2009/0260508 A1 | 10/2009 | Elion |
| 2009/0265668 A1 | 10/2009 | Esser et al. |
| 2009/0282335 A1 | 11/2009 | Alexandersson |
| 2009/0300676 A1 | 12/2009 | Harter, Jr. |
| 2009/0310027 A1 | 12/2009 | Fleming |
| 2009/0317783 A1 | 12/2009 | Noguchi |
| 2009/0318228 A1 | 12/2009 | Hughes |
| 2010/0009749 A1 | 1/2010 | Chrzanowski, Jr. et al. |
| 2010/0009750 A1 | 1/2010 | Egozy et al. |
| 2010/0029386 A1 | 2/2010 | Pitsch et al. |
| 2010/0035688 A1 | 2/2010 | Picunko |
| 2010/0041477 A1 | 2/2010 | Kay et al. |
| 2010/0062405 A1 | 3/2010 | Zboray et al. |
| 2010/0064238 A1 | 3/2010 | Ludwig |
| 2010/0080528 A1 | 4/2010 | Yen et al. |
| 2010/0087240 A1 | 4/2010 | Egozy et al. |
| 2010/0100848 A1 | 4/2010 | Ananian et al. |
| 2010/0113117 A1 | 5/2010 | Ku et al. |
| 2010/0120470 A1 | 5/2010 | Kim et al. |
| 2010/0137049 A1 | 6/2010 | Epstein |
| 2010/0144436 A1 | 6/2010 | Marks et al. |
| 2010/0151948 A1 | 6/2010 | Vance et al. |
| 2010/0160038 A1 | 6/2010 | Youm et al. |
| 2010/0161432 A1 | 6/2010 | Kumanov et al. |
| 2010/0186579 A1 | 7/2010 | Schnitman |
| 2010/0192106 A1 | 7/2010 | Watanabe et al. |
| 2010/0209003 A1 | 8/2010 | Toebes et al. |
| 2010/0216598 A1 | 8/2010 | Nicolas et al. |
| 2010/0228740 A1 | 9/2010 | Cannistraro et al. |
| 2010/0245241 A1 | 9/2010 | Kim et al. |
| 2010/0247081 A1 | 9/2010 | Pons et al. |
| 2010/0255827 A1 | 10/2010 | Jordan et al. |
| 2010/0261146 A1 | 10/2010 | Kim |
| 2010/0265398 A1 | 10/2010 | Johnson et al. |
| 2010/0283723 A1 | 11/2010 | Konishi |
| 2010/0299405 A1 | 11/2010 | Socher et al. |
| 2010/0300264 A1 | 12/2010 | Foster |
| 2010/0300265 A1 | 12/2010 | Foster et al. |
| 2010/0300266 A1 | 12/2010 | Stoddard et al. |
| 2010/0300267 A1 | 12/2010 | Stoddard et al. |
| 2010/0300268 A1 | 12/2010 | Applewhite et al. |
| 2010/0300269 A1 | 12/2010 | Applewhite |
| 2010/0300270 A1 | 12/2010 | Applewhite et al. |
| 2010/0300272 A1 | 12/2010 | Scherf |
| 2010/0304810 A1 | 12/2010 | Stoddard |
| 2010/0304811 A1 | 12/2010 | Schmidt et al. |
| 2010/0304812 A1 | 12/2010 | Stoddard et al. |

(56) References Cited

U.S. PATENT DOCUMENTS

| | | |
|---|---|---|
| 2010/0304863 A1 | 12/2010 | Applewhite et al. |
| 2010/0304865 A1 | 12/2010 | Picunko et al. |
| 2010/0306655 A1 | 12/2010 | Mattingly et al. |
| 2011/0010667 A1 | 1/2011 | Sakai et al. |
| 2011/0021273 A1 | 1/2011 | Buckley et al. |
| 2011/0039659 A1 | 2/2011 | Kim et al. |
| 2011/0047471 A1 | 2/2011 | Lord et al. |
| 2011/0066940 A1 | 3/2011 | Asghari Kamrani et al. |
| 2011/0098106 A1 | 4/2011 | He et al. |
| 2011/0098109 A1 | 4/2011 | Leake et al. |
| 2011/0118621 A1 | 5/2011 | Chu |
| 2011/0140931 A1 | 6/2011 | Geurts et al. |
| 2011/0151975 A1 | 6/2011 | Mori |
| 2011/0159938 A1 | 6/2011 | Umeda |
| 2011/0185309 A1 | 7/2011 | Challinor et al. |
| 2011/0195779 A1 | 8/2011 | Lau |
| 2011/0197740 A1 | 8/2011 | Chang et al. |
| 2011/0237324 A1 | 9/2011 | Clavin et al. |
| 2011/0238676 A1 | 9/2011 | Liu et al. |
| 2011/0251840 A1 | 10/2011 | Cook et al. |
| 2011/0256929 A1 | 10/2011 | Dubrofsky et al. |
| 2011/0257771 A1 | 10/2011 | Bennett et al. |
| 2011/0283236 A1 | 11/2011 | Beaumier et al. |
| 2011/0306396 A1 | 12/2011 | Flury et al. |
| 2011/0306397 A1 | 12/2011 | Fleming et al. |
| 2011/0306398 A1 | 12/2011 | Boch et al. |
| 2011/0312397 A1 | 12/2011 | Applewhite et al. |
| 2011/0312415 A1 | 12/2011 | Booth et al. |
| 2012/0021833 A1 | 1/2012 | Boch et al. |
| 2012/0052947 A1 | 3/2012 | Yun |
| 2012/0063617 A1 | 3/2012 | Ramos |
| 2012/0069131 A1 | 3/2012 | Abelow |
| 2012/0094730 A1 | 4/2012 | Egozy |
| 2012/0108305 A1 | 5/2012 | Akiyama et al. |
| 2012/0108334 A1 | 5/2012 | Tarama et al. |
| 2012/0143358 A1 | 6/2012 | Adams et al. |

FOREIGN PATENT DOCUMENTS

| | | |
|---|---|---|
| AU | 2003285918 A1 | 5/2004 |
| AU | 2010229693 A1 | 11/2011 |
| CA | 2587415 A1 | 5/2005 |
| CA | 2609587 A1 | 12/2005 |
| CA | 2720723 A1 | 11/2009 |
| CA | 2757238 A1 | 9/2010 |
| CA | 2760210 A1 | 12/2010 |
| DE | 19716937 A1 | 3/1998 |
| DE | 69804915 T2 | 5/2002 |
| DE | 69726507 T2 | 11/2004 |
| DE | 69832379 T2 | 8/2006 |
| DE | 69739885 | 7/2010 |
| EP | 0903169 A2 | 3/1999 |
| EP | 919267 A2 | 6/1999 |
| EP | 972550 A2 | 1/2000 |
| EP | 974382 A1 | 1/2000 |
| EP | 974954 A1 | 1/2000 |
| EP | 978301 A1 | 2/2000 |
| EP | 982055 A1 | 3/2000 |
| EP | 992928 A2 | 4/2000 |
| EP | 992929 A2 | 4/2000 |
| EP | 993847 A1 | 4/2000 |
| EP | 0997870 A1 | 5/2000 |
| EP | 1003130 A2 | 5/2000 |
| EP | 1022672 A1 | 7/2000 |
| EP | 1029565 A2 | 8/2000 |
| EP | 1029566 A2 | 8/2000 |
| EP | 1029570 A2 | 8/2000 |
| EP | 1029571 A2 | 8/2000 |
| EP | 1031363 A2 | 8/2000 |
| EP | 1031904 A2 | 8/2000 |
| EP | 1033157 A2 | 9/2000 |
| EP | 1033158 A2 | 9/2000 |
| EP | 1043745 A1 | 10/2000 |
| EP | 1043746 A1 | 10/2000 |
| EP | 1048330 A2 | 11/2000 |
| EP | 1061501 A1 | 12/2000 |
| EP | 1064974 A2 | 1/2001 |
| EP | 1064975 A2 | 1/2001 |
| EP | 1066866 A2 | 1/2001 |
| EP | 1079368 A1 | 2/2001 |
| EP | 1 081 680 A1 | 3/2001 |
| EP | 1081679 A1 | 3/2001 |
| EP | 1082981 A2 | 3/2001 |
| EP | 1082982 A2 | 3/2001 |
| EP | 1082983 A2 | 3/2001 |
| EP | 1088573 A2 | 4/2001 |
| EP | 1 096 468 A2 | 5/2001 |
| EP | 1114659 A2 | 7/2001 |
| EP | 1122703 A2 | 8/2001 |
| EP | 1125607 A2 | 8/2001 |
| EP | 1125613 A2 | 8/2001 |
| EP | 1127599 A2 | 8/2001 |
| EP | 1130569 A2 | 9/2001 |
| EP | 1132889 A2 | 9/2001 |
| EP | 1134723 A2 | 9/2001 |
| EP | 1136107 A2 | 9/2001 |
| EP | 1138357 A1 | 10/2001 |
| EP | 1139293 A2 | 10/2001 |
| EP | 1145744 A2 | 10/2001 |
| EP | 1145745 A2 | 10/2001 |
| EP | 1145748 A2 | 10/2001 |
| EP | 1145749 A2 | 10/2001 |
| EP | 1150276 A2 | 10/2001 |
| EP | 1151770 A2 | 11/2001 |
| EP | 1151773 A2 | 11/2001 |
| EP | 1157723 A2 | 11/2001 |
| EP | 1159992 A2 | 12/2001 |
| EP | 1160762 A2 | 12/2001 |
| EP | 1161974 A2 | 12/2001 |
| EP | 1 174 856 A2 | 1/2002 |
| EP | 1170041 A2 | 1/2002 |
| EP | 1178427 A1 | 2/2002 |
| EP | 1184061 A1 | 3/2002 |
| EP | 1187427 A2 | 3/2002 |
| EP | 1192976 A2 | 4/2002 |
| EP | 1195721 A2 | 4/2002 |
| EP | 1197947 A2 | 4/2002 |
| EP | 1199702 A2 | 4/2002 |
| EP | 1199703 A2 | 4/2002 |
| EP | 1 201 277 A2 | 5/2002 |
| EP | 1206950 A2 | 5/2002 |
| EP | 1208885 A1 | 5/2002 |
| EP | 1214959 A2 | 6/2002 |
| EP | 1220539 A2 | 7/2002 |
| EP | 1228794 A2 | 8/2002 |
| EP | 1245255 A2 | 10/2002 |
| EP | 1249260 A2 | 10/2002 |
| EP | 1258274 A2 | 11/2002 |
| EP | 1264622 A2 | 12/2002 |
| EP | 1270049 A2 | 1/2003 |
| EP | 1270050 A2 | 1/2003 |
| EP | 1271294 A2 | 1/2003 |
| EP | 1279425 A2 | 1/2003 |
| EP | 1287864 A2 | 3/2003 |
| EP | 1306112 A1 | 5/2003 |
| EP | 1413340 A1 | 4/2004 |
| EP | 000181482-0005 | 9/2004 |
| EP | 1503365 A1 | 2/2005 |
| EP | 1533010 A1 | 5/2005 |
| EP | 1542132 A1 | 6/2005 |
| EP | 1552864 A1 | 7/2005 |
| EP | 1552865 A1 | 7/2005 |
| EP | 1569171 A1 | 8/2005 |
| EP | 1604711 A1 | 12/2005 |
| EP | 1609513 A1 | 12/2005 |
| EP | 1630746 A1 | 3/2006 |
| EP | 1666109 A1 | 6/2006 |
| EP | 1696385 A2 | 8/2006 |
| EP | 1699017 A2 | 9/2006 |
| EP | 1731204 A1 | 12/2006 |
| EP | 1743680 A1 | 1/2007 |
| EP | 1 758 387 A1 | 2/2007 |
| EP | 1 825 896 A1 | 8/2007 |

(56) References Cited

FOREIGN PATENT DOCUMENTS

| | | |
|---|---|---|
| EP | 000859418-0008 | 2/2008 |
| EP | 000890447-0040 | 4/2008 |
| EP | 000890447-0046 | 4/2008 |
| EP | 2000190 A2 | 12/2008 |
| EP | 2001569 A2 | 12/2008 |
| EP | 2027577 A1 | 2/2009 |
| EP | 2206539 A1 | 7/2010 |
| EP | 2206540 A1 | 7/2010 |
| EP | 2301253 A1 | 3/2011 |
| EP | 2411101 A2 | 2/2012 |
| EP | 2494432 A2 | 9/2012 |
| FI | 200705530 | 1/2009 |
| FI | 20096276 | 12/2009 |
| GB | 2118809 A | 11/1983 |
| GB | 2425730 A | 11/2006 |
| GB | 2465918 A | 6/2010 |
| GB | 2471871 A | 1/2011 |
| HK | 1018021 A1 | 10/2002 |
| HK | 1023734 A1 | 2/2006 |
| JP | 11128534 A | 5/1989 |
| JP | 7185131 A | 7/1995 |
| JP | 3014386 B1 | 8/1995 |
| JP | 2552427 Y2 | 11/1996 |
| JP | 11053563 A | 2/1999 |
| JP | 11128535 | 5/1999 |
| JP | 11151380 A | 6/1999 |
| JP | 11156054 A | 6/1999 |
| JP | 2922509 | 7/1999 |
| JP | 11219443 A | 8/1999 |
| JP | 2951948 B1 | 9/1999 |
| JP | 2982147 B1 | 11/1999 |
| JP | 11313979 A | 11/1999 |
| JP | 3003851 U | 1/2000 |
| JP | 2000014931 | 1/2000 |
| JP | 2000037490 | 2/2000 |
| JP | 3017986 B1 | 3/2000 |
| JP | 3031676 B1 | 4/2000 |
| JP | 2000107447 A | 4/2000 |
| JP | 2000107458 | 4/2000 |
| JP | 2000112485 A | 4/2000 |
| JP | 2000116938 A | 4/2000 |
| JP | 3053090 B1 | 6/2000 |
| JP | 2000157723 | 6/2000 |
| JP | 3066528 U | 7/2000 |
| JP | 2000218046 | 8/2000 |
| JP | 3088409 B2 | 9/2000 |
| JP | 2000237454 A | 9/2000 |
| JP | 2000237455 A | 9/2000 |
| JP | 2000245957 | 9/2000 |
| JP | 2000245964 A | 9/2000 |
| JP | 2000245967 | 9/2000 |
| JP | 2000250534 | 9/2000 |
| JP | 2000/288254 | 10/2000 |
| JP | 2000293292 A | 10/2000 |
| JP | 2000293294 A | 10/2000 |
| JP | 2000300838 A | 10/2000 |
| JP | 2000300851 A | 10/2000 |
| JP | 2000308759 A | 11/2000 |
| JP | 2000317144 A | 11/2000 |
| JP | 2000325665 A | 11/2000 |
| JP | 2000350861 A | 12/2000 |
| JP | 2001000610 A | 1/2001 |
| JP | 2001009149 A | 1/2001 |
| JP | 2001009152 A | 1/2001 |
| JP | 2001009157 A | 1/2001 |
| JP | 2001046739 A | 2/2001 |
| JP | 2001062144 A | 3/2001 |
| JP | 2001070637 A | 3/2001 |
| JP | 2001070640 A | 3/2001 |
| JP | 2001070652 A | 3/2001 |
| JP | 2001075579 A | 3/2001 |
| JP | 2001096059 A | 4/2001 |
| JP | 2001096061 A | 4/2001 |
| JP | 2001129244 A | 5/2001 |
| JP | 2001145777 A | 5/2001 |
| JP | 2001145778 A | 5/2001 |
| JP | 3179769 B2 | 6/2001 |
| JP | 2001162049 | 6/2001 |
| JP | 2001170352 A | 6/2001 |
| JP | 2001175254 A | 6/2001 |
| JP | 3187758 B2 | 7/2001 |
| JP | 2001190834 A | 7/2001 |
| JP | 2001190835 A | 7/2001 |
| JP | 2001190844 A | 7/2001 |
| JP | 2001198351 A | 7/2001 |
| JP | 2001198352 A | 7/2001 |
| JP | 2001198354 A | 7/2001 |
| JP | 3202733 B2 | 8/2001 |
| JP | 2001212369 A | 8/2001 |
| JP | 2001218980 A | 8/2001 |
| JP | 2001222280 A | 8/2001 |
| JP | 2001224850 A | 8/2001 |
| JP | 2001231904 A | 8/2001 |
| JP | 2001232059 | 8/2001 |
| JP | 2001232062 A | 8/2001 |
| JP | 2001-252470 | 9/2001 |
| JP | 3204652 B2 | 9/2001 |
| JP | 2001252467 A | 9/2001 |
| JP | 2001259224 A | 9/2001 |
| JP | 2001269482 A | 10/2001 |
| JP | 2001273517 A | 10/2001 |
| JP | 2001293246 | 10/2001 |
| JP | 2001293254 A | 10/2001 |
| JP | 2001293256 A | 10/2001 |
| JP | 2001299975 A | 10/2001 |
| JP | 2001312260 A | 11/2001 |
| JP | 2001312740 A | 11/2001 |
| JP | 2001314645 A | 11/2001 |
| JP | 2001321565 A | 11/2001 |
| JP | 2001344049 A | 12/2001 |
| JP | 2001353374 A | 12/2001 |
| JP | 3245139 B2 | 1/2002 |
| JP | 2002000936 A | 1/2002 |
| JP | 2002018123 A | 1/2002 |
| JP | 2002018134 A | 1/2002 |
| JP | 2002028368 A | 1/2002 |
| JP | 3258647 B2 | 2/2002 |
| JP | 3261110 B2 | 2/2002 |
| JP | 2002045567 A | 2/2002 |
| JP | 2002056340 A | 2/2002 |
| JP | 2002066127 A | 3/2002 |
| JP | 2002066128 A | 3/2002 |
| JP | 2002084292 A | 3/2002 |
| JP | 3270928 B2 | 4/2002 |
| JP | 2002116752 A | 4/2002 |
| JP | 2002140727 A | 5/2002 |
| JP | 2002143567 A | 5/2002 |
| JP | 2002153673 A | 5/2002 |
| JP | 3306021 B2 | 7/2002 |
| JP | 2002204426 | 7/2002 |
| JP | 3310257 B2 | 8/2002 |
| JP | 3317686 B2 | 8/2002 |
| JP | 3317956 B2 | 8/2002 |
| JP | 2002224435 A | 8/2002 |
| JP | 2002239223 A | 8/2002 |
| JP | 2002239233 A | 8/2002 |
| JP | 3320700 B2 | 9/2002 |
| JP | 3321111 B2 | 9/2002 |
| JP | 2002263229 | 9/2002 |
| JP | 3333773 B2 | 10/2002 |
| JP | 3338005 B2 | 10/2002 |
| JP | 2002282417 A | 10/2002 |
| JP | 2002282418 A | 10/2002 |
| JP | 2002292123 A | 10/2002 |
| JP | 2002292139 A | 10/2002 |
| JP | 2002301263 A | 10/2002 |
| JP | 3345591 B2 | 11/2002 |
| JP | 3345719 B2 | 11/2002 |
| JP | 2002325975 A | 11/2002 |
| JP | 3351780 B2 | 12/2002 |
| JP | 2002360937 A | 12/2002 |
| JP | 3361084 B2 | 1/2003 |
| JP | 3370313 B2 | 1/2003 |
| JP | 3371132 B2 | 1/2003 |

(56) References Cited

FOREIGN PATENT DOCUMENTS

| | | |
|---|---|---|
| JP | 2003000951 A | 1/2003 |
| JP | 2003010541 A | 1/2003 |
| JP | 2003010542 A | 1/2003 |
| JP | 2003019346 A | 1/2003 |
| JP | 2003030686 A | 1/2003 |
| JP | 2003058317 A | 2/2003 |
| JP | 3392833 B2 | 3/2003 |
| JP | 2003117233 A | 4/2003 |
| JP | 2003126548 A | 5/2003 |
| JP | 3417555 B2 | 6/2003 |
| JP | 3417918 B2 | 6/2003 |
| JP | 3420221 B2 | 6/2003 |
| JP | 2003175279 A | 6/2003 |
| JP | 3425548 B2 | 7/2003 |
| JP | 3425552 B2 | 7/2003 |
| JP | 3433918 B2 | 8/2003 |
| JP | 3439187 B2 | 8/2003 |
| JP | 2003236244 A | 8/2003 |
| JP | 3442730 | 9/2003 |
| JP | 3448043 B2 | 9/2003 |
| JP | 2003256552 A | 9/2003 |
| JP | 3458090 B2 | 10/2003 |
| JP | 3470119 B2 | 11/2003 |
| JP | 2003334387 A | 11/2003 |
| JP | 3491759 B1 | 1/2004 |
| JP | 2004016315 A | 1/2004 |
| JP | 2004016388 A | 1/2004 |
| JP | 3496874 B2 | 2/2004 |
| JP | 3500379 B1 | 2/2004 |
| JP | 3500383 B1 | 2/2004 |
| JP | 2004033266 A | 2/2004 |
| JP | 2004097610 A | 4/2004 |
| JP | 2004105309 A | 4/2004 |
| JP | 2004121397 A | 4/2004 |
| JP | 3526302 B1 | 5/2004 |
| JP | 2004141261 A | 5/2004 |
| JP | 3534345 B1 | 6/2004 |
| JP | 2004164519 A | 6/2004 |
| JP | 2004166994 A | 6/2004 |
| JP | 3545755 B2 | 7/2004 |
| JP | 3545983 B2 | 7/2004 |
| JP | 3546206 B2 | 7/2004 |
| JP | 3547374 B2 | 7/2004 |
| JP | 2004192069 A | 7/2004 |
| JP | 2004201937 A | 7/2004 |
| JP | 3561456 B2 | 9/2004 |
| JP | 3566195 B2 | 9/2004 |
| JP | 3573288 B2 | 10/2004 |
| JP | 3576994 B2 | 10/2004 |
| JP | 3582716 B2 | 10/2004 |
| JP | 2004283249 A | 10/2004 |
| JP | 2004298469 A | 10/2004 |
| JP | 2004321245 A | 11/2004 |
| JP | 3597465 B2 | 12/2004 |
| JP | 2004337256 A | 12/2004 |
| JP | 3611807 B2 | 1/2005 |
| JP | 2005046445 A | 2/2005 |
| JP | 2005049913 A | 2/2005 |
| JP | 3626711 B2 | 3/2005 |
| JP | 3634273 B2 | 3/2005 |
| JP | 2005095440 A | 4/2005 |
| JP | 3656118 B2 | 6/2005 |
| JP | 3686906 B2 | 8/2005 |
| JP | 3699660 B2 | 9/2005 |
| JP | 2005261586 A | 9/2005 |
| JP | 3702269 B2 | 10/2005 |
| JP | 2005287830 A | 10/2005 |
| JP | 2005301578 A | 10/2005 |
| JP | 3715513 B2 | 11/2005 |
| JP | 2005319025 A | 11/2005 |
| JP | 3727275 B2 | 12/2005 |
| JP | 2006020758 A | 1/2006 |
| JP | 3753425 B2 | 3/2006 |
| JP | 2006075264 A | 3/2006 |
| JP | 2006116046 A | 5/2006 |
| JP | 2006116047 A | 5/2006 |
| JP | 2006192157 A | 7/2006 |
| JP | 3804939 B2 | 8/2006 |
| JP | 3816931 B2 | 8/2006 |
| JP | 3822887 B2 | 9/2006 |
| JP | 3831695 B2 | 10/2006 |
| JP | 3869175 B2 | 1/2007 |
| JP | 2007029589 A | 2/2007 |
| JP | 3890445 B2 | 3/2007 |
| JP | 2007504901 A | 3/2007 |
| JP | 2008018287 | 1/2008 |
| JP | 2008168143 | 7/2008 |
| JP | 2009531153 A | 9/2009 |
| JP | 2010509000 A | 3/2010 |
| KR | 20010027533 A | 4/2001 |
| KR | 20050047024 A | 5/2005 |
| RU | 2010146213 A | 5/2012 |
| TW | 340049 | 3/2009 |
| TW | 200951764 A | 12/2009 |
| TW | 201006526 A | 2/2010 |
| TW | 322023 | 3/2010 |
| TW | 201116318 A | 5/2011 |
| WO | WO-9717598 A1 | 5/1997 |
| WO | WO-9938588 A1 | 8/1999 |
| WO | WO-01/63592 A2 | 8/2001 |
| WO | WO-0230535 A1 | 4/2002 |
| WO | WO-2004002590 A1 | 1/2004 |
| WO | WO-2004002594 A1 | 1/2004 |
| WO | WO-2004024256 A1 | 3/2004 |
| WO | WO-2004024263 A1 | 3/2004 |
| WO | WO-2004027631 A1 | 4/2004 |
| WO | WO-2004030779 A1 | 4/2004 |
| WO | WO-2004039055 A2 | 5/2004 |
| WO | WO-2004052483 A1 | 6/2004 |
| WO | WO-2004053800 A1 | 6/2004 |
| WO | WO-2004082786 A1 | 9/2004 |
| WO | WO-2004087272 A1 | 10/2004 |
| WO | WO-2004101093 A1 | 11/2004 |
| WO | WO-2004107270 A1 | 12/2004 |
| WO | WO-2005027062 A1 | 3/2005 |
| WO | WO-2005027063 A1 | 3/2005 |
| WO | WO-2005030354 A1 | 4/2005 |
| WO | WO-2005099842 A1 | 10/2005 |
| WO | WO-2005107902 A1 | 11/2005 |
| WO | WO-2005/113096 A1 | 12/2005 |
| WO | WO-2005114648 A1 | 12/2005 |
| WO | WO-2006006274 A1 | 1/2006 |
| WO | WO-2006075494 A1 | 7/2006 |
| WO | WO-2007/055522 A1 | 5/2007 |
| WO | WO-2007070738 A2 | 6/2007 |
| WO | WO-2007078639 | 7/2007 |
| WO | WO-2007/115299 A2 | 10/2007 |
| WO | WO-2007111247 A1 | 10/2007 |
| WO | WO-2007130582 A2 | 11/2007 |
| WO | WO-2008001088 A2 | 1/2008 |
| WO | WO-2008145952 A1 | 12/2008 |
| WO | WO-2009021124 A2 | 2/2009 |
| WO | WO-2010018485 A1 | 2/2010 |
| WO | WO-2010036989 A1 | 4/2010 |
| WO | WO-2011067469 A1 | 6/2011 |
| WO | WO-2011155958 A1 | 12/2011 |

OTHER PUBLICATIONS

"Rock Band," In Wikipedia Online Encyclopedia, Wikipedia, 2007, Retrieved from the Internet. http://en.wikipedia.org/w/index.php?title=Rock_Band_(video_game)&oldid=13740658. 1 page (retrieved on May 22, 2012).

[Video] "E3 2010 Live Demo", where Ubi talked about MJ:TE for Kinect (<http://www.gametrailers.com/video/e3-2010-michael-jackson/101449>).

[Video] MJ the Experience Kinect: release Apr. 2011, http//www.youtube.com/watch?v=N7oyxHIP48A.

[Video] 'Don't Stop' Gameplay Trailer: <http://www.gametrailers.com/video/dont-stop-michael-jackson/707336> (Nov. 10, 2010).

[Video] 'Ghosts' Gameplay Trailer: <http://www.gametrailers.com/video/ghosts-gameplay-michael-jackson/706825> (Oct. 27, 2010).

[Video] Dance Summit 2001: Bust A Groove (Released Nov. 2, 2000 for PS2); <http://www.youtube.com/watch?v=E8NjTGHYQcM>.

(56) References Cited

OTHER PUBLICATIONS

[Video] Dancing With the Stars—Activision, Zoe Mode; <http://www.youtube.com/watch?v=C7zBVfEJ0gg> (Oct. 2007).
[Video] Dancing with the Stars: We Dance—Activision, Zoe Mode; <http://www.youtube.com/watch?v=3IG0b-CT8vs> (Oct. 2008).
[Video] DDR Hottest Party; <http://www.youtube.com/watch?v=zk20hEzGmUY> (Sep. 2007).
[Video] E3 2010 Live Demo <http://www.gametrailers.com/video/e3-2010-michael-jackson/101449>; (Jun. 14, 2010).
[Video] Eyetoy Groove for PS2; <http://www.youtube.com/watch?v=c80aaOU_fuE> . Apr. 2004.
[Video] Gamescom '10—Billie Jean Demo <http://www.gametrailers.com/video/gc-10-michael-jackson/703294> (:58-1:13) (Aug. 20, 2010).
[Video] Gamescom '10—Working Day and Night Demo <http://www.gametrailers.com/video/gc-10-michael-jackson/703295> (Aug. 20, 2010).
[Video] Grease Dance—505 Games: release—Oct. 2011. http://www.youtube.com/watch?v=PaGBHSB2urg.
[Video] Hannah Montana: Spotlight World Tour (Released Nov. 6, 2007 for Wii); <http://www.youtube.com/watch?v=WtyuU2NaL3Q>.
[Video] Britney's Dance Beat (Released May 8, 2002 for PS2); <http://www.youtube.com/watch?v=-KR1dRGNX_w>.
[Video] Dance Dance Revolution: Hottest Party 3 (Released Sep. 27, 2009 for Wii) <http://www.youtube.com/watch?v=zk20hEzGmUY>.
[Video] Dance on Broadway—Ubisoft, Longtail Studios; <http://www.youtube.com/watch?v=eYaP-dT4z-M> (Jun. 6, 2010).
[Video] Dance on Broadway: Jun. 2010 (http://youtube/Wi9Y5HHcvtY).
[Video] Dancing with the Stars: Oct. 2007 (http://www.youtube.com/watch?v=8UChG2v5DI).
Amplitude for Playstation. Retrieved from the Internet: www.target.com/gp/detail.html/601-0682676-9911341?asin=B0000859TM&AFID. Retrieved on Feb. 22, 2005. 1 page.
Amplitude Review by Ryan Davis. Retrieved from the Internet: www,gamespot.com/ps2/puzzle/amplitude/reviews/amplitude-review-6023980.html. Mar. 26, 2003. 4 pages.
Amplitude. Retrieved from the Internet: www.gamesquestdirect.com/71171972582.html. Retrieved on Jun. 8, 2012. 2 pages.
Amplitude: Sony's Rocking Rhythm Game Outdoes Itself on All Fronts by Douglass C. Perry. Retrieved from the Internet: http://ps2.ign.com/articles/390/390620pl.html. Retrieved on Jun. 8, 2012. 6 pages.
Beat Planet Music (Import) Review by Christian Nutt. Retrieved from the Internet: www.gamespot.com/gamespot/stories/reviews/0,10867,2546762,00.html. Retrieved on Jun. 11, 2012. 3 pages.
Beatmania IIDX 9 Style. Retrieved from the Internet: www.play-asia.com/paOS-13-71-8g-70-giu.html Retrieved on Feb. 22, 2005. 2 pages.
Beatmania PlayStation Review from www.GamePro.com/sony/psx/games/reviews/89.html. Retrieved on Feb. 22, 2005. 1 page.
Beatmania Review. Retrieved from the Internet: www.gamesarefun.com/gamesdb/review.php?reviewid=294. Retrieved on Jun. 11, 2012. 1 page.
Beatmania IIDX 7 Style. Retrieved from the Internet: www.lik-sang.com/Info.php?category=27&products id=4061. Retrieved on Feb. 22, 2005. 1 page.
Beatnik Patent Sale Offering, Nov. 2008 (81 pp).
Bishop, Sam; Frequency: If you decide to pick up this game, you better give up on the idea of getting a full night of sleep. via www.ign.com [online], Nov. 26, 2001 [retrieved on Mar. 1, 2006]. Retrieved from the Internet <URL: http://ps2.ign.com/articles/166/166450p1.html>. Retrieved on Jun. 8, 2012. 8 pages.
Boombox Icons, http://findicons.com/search/boombox, viewed on Jul. 31, 2012 copyright 2010 (1 page).
Bust A Groove Review by Jeff Gerstmann. Retrieved from the Internet: www.gamespot.com/ps/puzzlebusta groove/printable_2546923.html. Retrieved on Jun. 11, 2012. 9 pages.
Bust A Groove. Retrieved from the Internet: www.buyritegames.com/product_information.asp?rc=frgl&number=PS-BUSTA2. Retrieved on Feb. 22, 2005. 1 page.
Bust A Groove. Retrieved from the Internet: www.estarland.com/index.asp?page=Playstation.com/playstation.cat.F.product.6257.html Retrieved on Jun. 11, 2012. 2 pages.
Bust A Groove: 989 Studios Best Game of the Year is a Funky Dance Sim That's Got the Fever by Doug Peny. Retrieved from the Internet http://psx.ign.com/articles/152/152308pl.html. Retrieved on Jun. 8, 2012. 5 pages.
BVH File Specification, Character Studio, http://web.archive.org/web/20060321 075406/http:/Icharacterstudio. net/bvh file specification.htm, Mar. 21, 2006 (16 pages).
Dance Dance Revolution Review by Andy Chien. Retrieved from the Internet www.gaming-age.com/reviews/archive/old_reviews/psx/ddr. Retrieved on Feb. 22, 2005. 3 pages.
Dance Dance Revolution Review by Ryan Davis. Retrieved from the Internet www.gamespot.com/ps/puzzle/dancedancerevolutionfprintable_2699724.html. Retrieved on Jun. 11, 2012. 9 pages.
Dance Dance Revolution, Konami via www.ign.com [online], Apr. 4, 2001 [retrieved on Mar. 1, 2006]. Retrieved from the Internet <URL: http://psx.ign.com/articles/161/161525p1.html>. Retrieved on Jun. 14, 2012. 7 pages.
Dance Dance Revolution. Retrieved from the Internet: www.ebgames.com/ebx/product/224789.asp. Retrieved on Feb. 22, 2005. 2 pages.
Dancing with the Stars Game Manual (1 page). Date not available.
Dave H, et al. StepMania Tutorial. Nov. 3, 2004. <http://web.archive.org/web/200411031145/www.stepmania.com/stepmania/wiki.php?pagename=Tutorial>. Retrieved on Jun. 19, 2012. 7 pages.
Def Jam Vendetta Review by Alex Navarro. Retrieved from the Internet www.gamespot.com/ps2/actionf actionfdefjamvendetta/prIntable_6024297 .html. Retrieved on Jun. 11, 2012. 10 pages.
Def Jam Vendetta. Retrieved from the Internet www.ebgames.com/ebx/product/232378.asp. Retrieved on Feb. 22, 2005. 2 pages.
Def Jam Vendetta: Rapper's Delight or Fight-Night Fright? Smash Sumthin' and Find Out by Jon Robinson. Mar. 31, 2003. Retrieved from the Internet http://m.ign.com/articles/2003/03/31/def-jam-vendetta-4. Retrieved on Jun. 8, 2012. 6 pages.
Digital Play: Reloaded. Opening Reception. Museum of the Moving Image. Mar. 19, 2005. <http://web.archive.Org/web/20050319060247/ http://www.movingimage.us/site/screenings/contenV2005/digital_play_reloaded.ht ml>. 1 page.
Donkey Konga Review by Ryan Davis. Retrieved from the Internet: www.gamespot.com/gamecube/puzzle/ donkeykonga/printable_6108977.html. Retrieved on Jun. 11, 2012. 11 pages.
Donkey Konga. Retrieved from the Internet: www.ebgames.com/ebx/product/244024.asp. Retrieved on Jun. 11, 2012. 2 pages.
Donkey Konga: Could a Game Featuring Donkey Kong and Mini-Bongos ever Fail? Our Full Review by Juan Castro. Retrieved from the Internet: cube.ign.com/articles/550/550723pl.html. Retrieved on Jun. 8, 2012. 6 pages.
DrumMania w/ Drum Set. Retrieved from the Internet www.estarland.com/product18126.html Retrieved on Jun. 11, 2012. 2 pages.
DrumMania (Import) Review by Jeff Gerstmann. Retrieved from the Internet: www.gamespot.com/ps2/actionf drummania/printable_2546356.html. Retrieved on Jun. 11, 2012. 9 pages.
DrumMania OST. Retrieved from the Internet www.lik-sang.corn/info/php?category=264&products id=4793. Retrieved on Feb. 22, 2005. 2 pages.
DrumMania Review by Wyrdwad. Retrieved from the Internet www.gamefaqs.com/ps2/197168-drummania/reviews/review-56573 Retrieved on Jun. 11, 2012. 2 pages.
ESRB Game Ratings: Game Rating & Descriptor Guide via www.esrb.org[online], Retrieved from the Internet: <URL: http://www.esrb.org/ratings/ratings-guide.jsp Retrieved on Jun. 14, 2012. 3 pages.
Eye Toy Groove with Camera (Playstation 2). Retrieved from the Internet www.jr.com/JRProductPage.process?ProductCode=PS2+97400&JRSource=google. Retrieved on Feb. 22, 2005. 1 page.

(56) References Cited

OTHER PUBLICATIONS

Eye Toy Groove with Eye Toy Camera PS2. Retrieved from the Internet: www.walmart.com/catalog/product.gsp?dest=9999999997&product id-2607013&s. Retrieved on Feb. 22, 2005. 1 page.
Eye Toy: Groove—The Little Camera That Could comes Back with a Few New Tricks by Ed Lewis. Retrieved from the Internet: http://ps2.ign.corn/articles/507/507854pl.html. Retrieved on Jun. 8, 2012. 8 pages.
Eye Toy: Groove Review by Ryan Davis. Retrieved from the Internet: www.gamespot.com/ps2/puzzle/ eyetoygroove/printable_6094754. html. Retrieved on Jun. 11, 2012. 10 pages.
Frequency—Pre-Played. Retrieved from the Internet www.ebgames. com/ebx/product/203370.asp. Retrieved on Feb. 22, 2005. 2 pages.
Frequency PS2 Review from GamePro.com, written by Dan Electro on Nov. 26, 2001. Retrieved from the Internet: www.gamepro.com/sony/ps2/games/reviews/18464.shtml. Retrieved on Jun. 11, 2012. 2 pages.
Frequency PS2. Retrieved from the Internet: www.walmart.com/catalog/product.gsp?dests9999999997&product id=1635738&s. Retrieved on Feb. 22, 2005. 2 pages.
Frequency Review by Ryan Davis. Retrieved from the Internet:www. gamespot.com/ps2/puzzle/frequency/ printable 2827476.html. Retrieved on Jun. 19, 2012. 9 pages.
Get on Da Mic Overview by Matt Gonzales. Retrieved from the Internet www.gamechronicles.com/reviews/ ps2/getondamic/body. htm. Retrieved on Jun. 11, 2012. 3 pages.
Get On Da Mic Review by Jeff Gerstmann. Retrieved from the Internet www.gamespot.comrri/ps2/puzzle/getondamic/printable 6110242.html. Retrieved on Jun. 11, 2012. 10 pages.
Get On Da Mic. Retrieved from the Internet: www.ebgames.com/ebx/product/245102.asp. Retrieved on Jun. 11, 2012. 2 pages.
Gitaroo Man. Retrieved from the Internet www.estarland.com/playstation2.cat..product.676.html Retrieved on Jun. 14, 2012. 2 pages.
Gitaroo-Man Review by David Smith. Retrieved from the Internet http://p2.ign.com/articles/135/135184p1.html; retrived Jun. 11, 2012. 4 pages.
Gitaroo-Man Review by Ryan Davis. Retrieved from the Internet: www.gamesrx)t.coiTi/ps2/puzzle/gitaroomart/printable 2847915.html. Retrieved on Jun. 19, 2012. 9 pages.
Gitaroo-Man. Retrieved from the Internet www.buyritegames.com/product_information.asp?rc=frgl&number=PS2-GITARO. Retrieved on Feb. 22, 2005. 1 page.
Guitar Freaks (Import) Review by Sam Kennedy. Retrieved from the Internet: www.gamespot.com/guitar-freaks/reviews/guitar-freaks-import-review-2545966/. Retrieved on Jun. 11, 2012 as it appeared on May 26, 2012. 10 pages.
Guitar Freaks Review by Wade Monnig. Retrieved from the Internet: www.gamesarefun.com/gamesdb/review. php? .reviewid=301. Retrieved on Jun. 11, 2012. 3 pages.
Guitar Freaks Sony. Retrieved from the Internet www.gameexpress. com/product_detail.cfm.?UPC=SCPS45422. Retrieved on Feb. 22 2005. 1 page.
Guitar Freaks with Guitar. Retrieved from the Internet: www. buyritegames.com/product_information.asp?rc=frgl &number=PSJ-GU1TWG. Retrieved on Feb. 22, 2005. 1 page.
Guitar Hero (video game)—Wikipedia, the free encyclopedia—(Publisher—RedOctane) Release Date Nov. 2005. 25 pages.
Guitar Hero—Wikipedia, the free encyclopedia—Nov. 2005. http://en.wikipedia.org/w/index.php?title=Guitar_Hero &oldid=137778068. Retrieved on May 22, 2012. 5 pages.
GuitarFreaks—Wikipedia, the free encyclopedia—(Publisher—Konami, Konami Digital Entertainment) Release Date 1998. Accessed on Mar. 19, 2009 at http://en.wiipedia.org/wiki/GuitarFreaks. 5 pages.
International Search Report issued for PCT/US2010/054300, dated May 31, 2011 (5 pages).
International Search Report, PCT/US2006/062287, Mailed on May 10, 2007. 2 pages.
Ipodgames.com Tips. Dec. 4, 2004. <http://web.archive.org/web/20041204032612Awww.ipodgames.com/tips.html > 1 page.
Karaoke Revolution Review by Jeff Gerstmann. Retrieved from the Internet at www.gamespot.com/karaoke-revolution-2003/reviews/karaoke-revolution-review-6081709/. Retrieved on Jun. 14, 2012 as it appeared on Jun. 7, 2012. 10 page.
Karaoke Revolution. Retrieved from the Internet: www.ebgames. com/ebx/product/244806.asp. Retrieved on Feb. 22, 2005. 2 pages.
Karaoke Revolution: The Revolution will be Televised by Ed Lewis. Retrieved from the Internet: http://ps2.ign.com/articles/458/458064p1.html. Retrieved on Jun. 8, 2012. 7 pages.
Kuwayama, Y. Trademarks & Symbols, vol. 2: Symbolical Designs, Van Nostrand Reinhold Company, (Nov. 4, 1980). 4 pages.
Lohman, "Rockstar vs. Guitar Hero," (The Rebel Yell). Nov. 13, 2008, accessed on Mar. 19, 2009 at http://onlyrebelyell.com/2008/11/13/rockstar-vs-guitar-hero/. 5 pages.
Mad Maestro!—Pre-Played. Retrieved from the Internet: www. ebgames.com/ebx/product/217604.asp. Retrieved on Feb. 22, 2005. 2 pages.
Mad Maestro! by Ryan Davis. Retrieved from the Internet: www. gamespot.com/ps2/puzzle.madmaestro/ printable_2856821.html. Retrieved on Jun. 19, 2012. 9 pages.
Mad Maestro: The First Orchestra-conducting Sim on US Soil—Is It All It Could Have Been? by David Smith. Retrieved from the Internet http://ps2.ign.com/articles/3551355561 p1.html. Retrieved on Jun. 8, 2012. 6 pages.
Microsoft Office Online Clip Art, http://office.microsoft.com/en-us/clipart/results.aspx?Scope=MC,MM,MP,MS &PoleAssetID=MCJ04316180000&Querty=Icons&CTT=6 &Origin=EC01017435m (Feb. 21, 2007) (1 page).
Microsoft PowerPoint Handbook, (1 page) (1992).
Mojib Ribbon Playtest by Anoop Gantayat. Retrieved from the Internet: http://ie.ign.com/articles/442/442204p1.html. Retrieved on Jun. 8, 2012. 4 pages.
Mojib Ribbon—Review. Retrieved from the Internet: www.ntsc-uk. com/review.php?platform=ps2&game=MoiibRibbon. Retrieved on Jun. 14, 2012. 2 pages.
Mojib Ribbon. Retrieved from the Internet: www.lik-sang.com/info. php?category=27&productsid=3805&PHPSESSID=b9eQca. Retrieved on Feb. 22, 2005. 1 page.
Mojib Ribbon. Retrieved from the Internet: www.ncsxshop.com/cgi-bin/shop/SCPS.11033.html. Retrieved on Jun. 14, 2012. 2 pages.
Non-Final Office Action as issued by The United States Patent and Trademark Office for U.S. Appl. No. 12/474,899, dated Jan. 19, 2011, 7 pages.
PaRappa the Rapper 2. Retrieved from the Internet: www.amazon. com/exec/obidos/tq/detail/-/B00005UNWD/104-4695527-8827110. Retrieved on Feb. 22, 2005. 2 pages.
PaRappa The Rapper Review by Jer Horwitz. Retrieved from the Internet: www.gamespot.com/pslpuzzlel parappatherapper/printable_2548866.html. Retrieved on Jun. 14, 2012. 9 pages.
Parappa the Rapper. Retrieved from the Internet: www.estarland. com/index.asp?page=Playstation&cat=F&product=6871&q. Retrieved on Jun. 11, 2012. 2 pages.
Parappa The Rapper: PaRapper the Rapper Is finally here, but does it live up to the hype? by Adam Douglas. Retrieved from the Internet http://m.ign.com/articles/1997/11/19/parappa-the-rapper Retrieved on Jun. 8, 2012. 2 pages.
PopCap Games Site Review, retrieved on Mar. 3, 2006. Retrieved from the Internet <URL:http://www.download-free-games.com/reviews/popcap_games.htm>. 2 pages.
Rez PlayStation^A. Retrieved from the internet: http://www.yesasia. com/us/rez-playstation2-the-best-japan-version/1002847668-0-0-cssid. Retrieved on Jun. 14, 2012. 1 page.
Rez Review by Jeff Gerstmann. Retrieved from the Internet:www. qamespot.com/ps2/action/rez/printable 2838815.html. Retrieved on Jun. 11, 2012. 9 pages.
Rez. Retrieved from the Internet: www.estarland.com/playstation2. product.5426.html. Retrieved on Jun. 14, 2012. 2 pages.
Rez: You May Not Understand This Review. We May Not Either. But you should certainly play this game by.David Smith. Retrieved from the Internet: http://m.ign.com/articles/2002/01/09/rez. Retrieved on Jun. 11, 2012. 3 pages.

(56) References Cited

OTHER PUBLICATIONS

SingStar Party (SingStar2) Bundle. Retrieved from the Internet: www.gameswarehouse.com.Au/longpage.asp?gameid=10329. Retrieved on Feb. 22, 2005. 2 pages.
SingStar Party. Retrieved from the Internet: www.argos.co.uk/Webapp/wcs/stores/servlet/ProductDisplay?storeId=10001&langId. Retrieved on Feb. 22, 2005. 1 page.
SingStar Review (PS2) by James Hamer-Morton. Retrieved from the Internet http://ps2.boomtown.net/en_uk/articles/ art.view.php?id=5279. Retrieved on Jun. 11, 2012. 5 pages.
SingStar Review by Luke Van Leuveren. Retrieved from the Internet http://web.archive.org/web/20110526133204/http://palgn.com.au/playstation-2/1282/singst.. Retrieved on Jun. 11, 2012. 5 pages.
Space Channel 5 Special Edition Review by Brad Shoemaker. Retrieved from the Internet: www.gamespot.corn/ps2/puzzle/spacecriannel5pait2/printeble_6085137.h Retrieved on Jun. 11, 2012. 10 pages.
Space Channel 5. Retrieved from the Internet: www.lik-sang.com/info.php?products_is=2050&likref=froggle4. Retrieved on Feb. 22, 2005. 1 page.
Space Channel 5: Description. Retrieved from the Internet: www.buyritegames.com/product_information.asp?rc=frgl&number=DC-SPACEC5. Retrieved on Feb. 22, 2005. 1 page.
Space Channel 5: Special Edition by Jason Thompson. Retrieved from the Internet www.popmatters.com/multimedia/reviews/s/space-channel-5.shtml. Retrieved on Jun. 8, 2012. 2 pages.
Taiko Drum Master Review by Justin Calvert. Retrieved from the Internet: www.gamespot.com/ps2 puzzie/taikodrummaster/printable_6111767.html. Retrieved on Jun. 14, 2012. 10 pages.
Taiko Drum Master w/ Drum. Retrieved from the Internet: www.ebgames.com/ebx/product/244015.asp. Retrieved on Jun. 14, 2012. 2 pages.
Taiko no Tatsujin. Retrieved from the Internet http://games.channel.aol.com/review.adp?qameID-7569. Retrieved on Feb. 22, 2005. 3 pages.
Thalmann, "L'animation par ordinateur" http://web.archive.org/web/20060421045510/http://vrlab.epfl.ch/{thalmann/CG/infogr.4.pdf>, Apr. 21, 2006 (52 pages).
Vib Ribbon (PSX): Homepage, Screenshots by James Anthony. http://www.vib-ribbon.com/vibhtml/english/index.html. Retrieved on Jun. 14, 2012. 1 page.
Vib-Ribbon (Import) Review by Jeff Gerstmann. Retrieved from the Internet: www.gamespot.com/ps /puzzle/vibribbon/printable 2550100.html. Retrieved on Jun. 14, 2012. 9 pages.
Vib-Ribbon. Retrieved from the Internet: www.ncsxshop.com/cgi-bin/shop/SCPS-45469.html. Retrieved on Feb. 22, 2005. 1 page.
Video MJ the Experience Kinect: announce—Oct. 2010: (http://www.youtube.com/watch?v=xLbiPicu0MM).
Video "Dance Online—Dance lessons gameplay" <http://www.youtube.com/watch?v=B4phOjfVNLk>. Last accessed on Nov. 8, 2012.
Video <http://www.bing.com/videos/search?q=dance+ instruction+game&mid=E69356CFA1B6719FF5C8E69356CFA1B6719FF5C8&view=detail&FORM=VIRE5> (uploaded Jul. 27, 2010).
Video Alvin and The Chipmunks Chipwrecked—Majesco Sales: release—Nov. 2011 (http://www.youtube.com/watch?v=xKeW3CUt14A&feature=related).
Video Dream Dance & Cheer (Released Sep. 13, 2009 for Wii) <http://www.youtube.com/watch?v=oi9vQjT1x5Q>.
Video Just Dance—Ubisoft Paris; <http://www.youtube.com/watch?v=t7f22xQCEpY>; (Nov. 17, 2009).
Video Just Dance 2—Ubisoft; <http://www.youtube.com/watch?v=kpaW9sM_M2Q> (Oct. 12, 2010).
Video Just Dance 2: Oct. 2010 (http://youtube/2ChliUgqLtw).
Video Just Dance: Nov. 2009 (http://youtube/rgBo-JnwYBw).
Video Kidz Bop Dance Party! The Video Game (Released Sep. 14, 2010 on Wii) <http://www.youtube.com/watch?v=I8VD9EvFdeM>.
Video Let's Cheer—Take 2 Interactive: release—Nov. 2011; announce—Jun. 2011 (http://www.youtube.com/watch?v=uv1IMBIw2Dw&feature=related).
Video Michael Jackson: The Experience—Ubisoft, Ubisoft Paris, Ubisoft Montpelier; <http://www.youtube.com/watch?v=AS3-SuYhSBk> . Date not available.
Video MJ—Paris Week game demo—Oct. 29, 2010 http://www.dailymotion.com/video/xfg4oe_pgw-10-michael-jackson-experi-ence-kinect_videogames?start=13#from=embed <http://www.dailymotion.com/video/xfg4oe_pgw-10-michael-jackson-experience-kinect_videogames?start=13>.
Video MJ the Experience Wii: Nov. 2010 (http://www.youtube.com/watch?v=8ZA59JY8Y_w).
Video MJ:TE Kinect from Aug. 19, 2010 at <http://www.youtube.com/watch?v=6AjGmSnN6gQ>; Michael Jackson The Experience Video Game—Kinect for Xbox 360—Gamescom 2010 HD.
Video MJ:TE on Wii (Nov. 2010); <http://www.youtube.com/watch?v=gmIMNGWxgvo>.
Video N. Y. Comic Con '10—Billie Jean Gameplay Demo: <http://www.gametrailers.com/video/nycc-10-michael-jackson/706056> (Oct. 13, 2010).
Video Tokyo Game Show '10—'Every Step' Trailer: http://www.gametrailers.com/video/tgs-10-michael-jackson/704548 (Sep. 15, 2010).
Video Victorious: Time to Shine—D3 publishers: Dec. 22, 2011 (http://www.youtube.com/watch?v=ud69OK02KGg&feature=fvst).
Video We Cheer 2 (Released Nov. 3, 2009 for Wii) <http://www.youtube.com/watch?v=-4oalxqnbll>.
Video Dance Dance Revolution: Hottest Party 3 (Released Sep. 27, 2009 for Wii) <http://www.youtube.com/watch?v=zk20hEzGmUY>.
Taiko Drum Master Game Manual (Release Date: Oct. 24, 2004 (18 pages)).
U.S. Appl. No. 29/393,964, filed Jun. 10, 2011.
U.S. Appl. No. 29/393,967, filed Jun. 10, 2011.
U.S. Appl. No. 29/393,968, filed Jun. 10, 2011.
U.S. Appl. No. 29/393,970, filed Jun. 10, 2011.
U.S. Appl. No. 29/393,973, filed Jun. 10, 2011.
U.S. Appl. No. 29/393,975, filed Jun. 10, 2011.
Konami Corporation, The computer game "Dance Dance Revolution Max", released in the US by Konami Corporation on Oct. 29, 2002, as evidenced by the game manual (2 pgs.).

\* cited by examiner

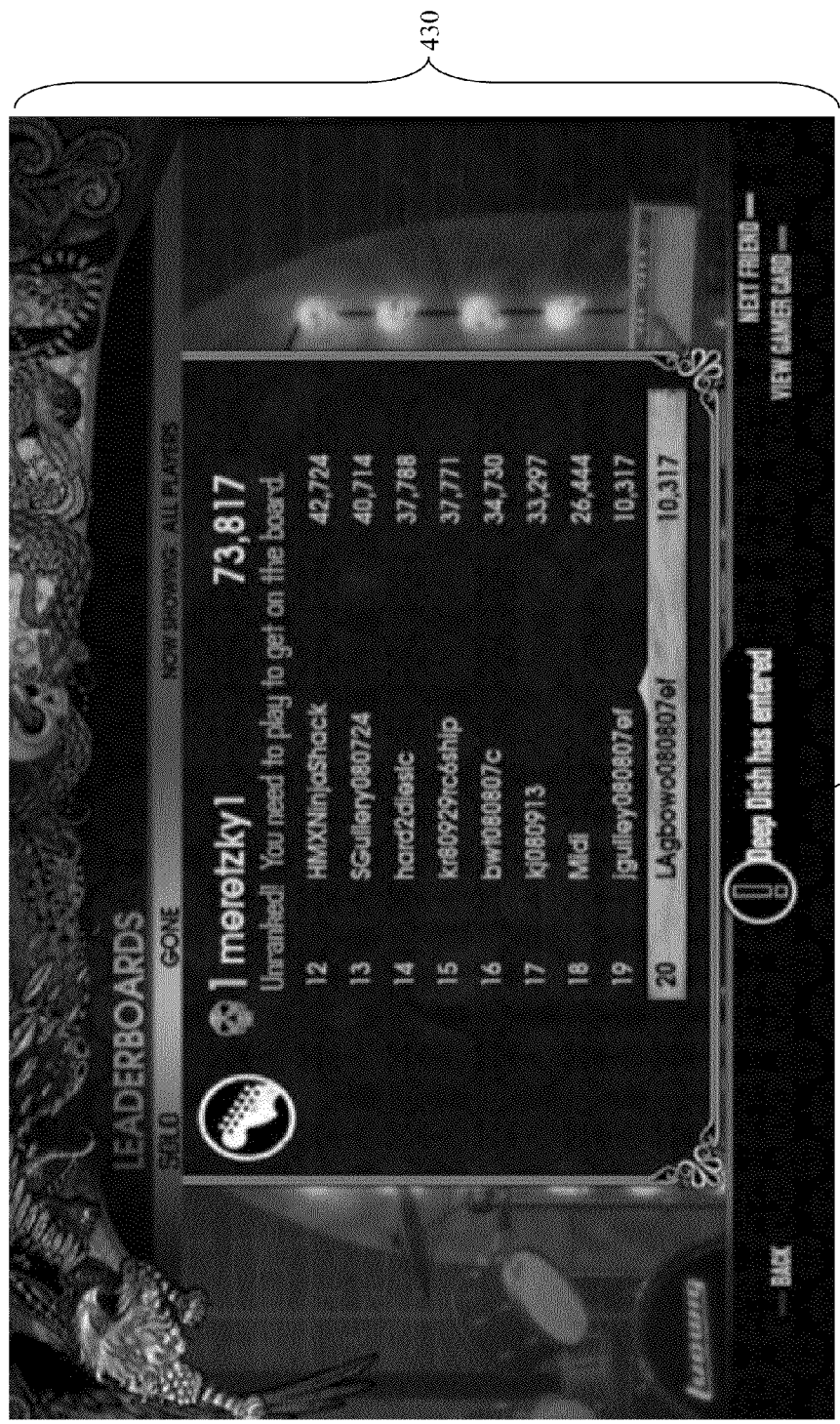

SYSTEMS AND METHODS FOR ASYNCHRONOUS BAND INTERACTION IN A RHYTHM ACTION GAME

RELATED APPLICATIONS

The present application is a continuation-in-part of U.S. application Ser. No. 12/140,000, filed Jun. 16, 2008 and titled "Systems and Methods for Online Band Matching in a Rhythm Action Game." This application also claims priority to U.S. Provisional Application Ser. No. 60/944,054, filed Jun. 14, 2007 and titled "Systems and Methods for Simulating a Rock Band Experience," the contents of which are expressly incorporated by reference herein.

BACKGROUND OF THE INVENTION

Music making is often a collaborative effort among many musicians who interact with each other. One form of musical interaction may be provided by a video game genre known as "rhythm-action," which involves a player performing phrases from a pre-recorded musical composition using a video game's input device to simulate a musical performance. If the player performs a sufficient percentage of the notes or cues displayed, he may score well and win the game. If the player fails to perform a sufficient percentage, he may score poorly and lose the game. Two or more players may compete against each other, such as by each one attempting to play back different, parallel musical phrases from the same song simultaneously, by playing alternating musical phrases from a song, or by playing similar phrases simultaneously. The player who plays the highest percentage of notes correctly may achieve the highest score and win. Two or more players may also play with each other cooperatively. In this mode, players may work together to play a song, such as by playing different parts of a song, either on similar or dissimilar instruments. One example of a rhythm-action game is the GUITAR HERO series of games published by Red Octane and Activision. Another example of a rhythm-action game is the KARAOKE REVOLUTION series of games published by Konami.

In many cases players may wish to play rhythm action games online, either cooperatively or competitively, with remote players. Thus there exists a need for efficient ways of matching remote players of rhythm action games.

SUMMARY OF THE INVENTION

Broadly speaking, the present invention relates to methods and systems for providing interaction between remote players and one or more local players of a rhythm-action game having different instruments into bands for cooperative or competitive online play. Bands may require certain instrumentation, and one object of the invention is to efficiently match remote players or groups of players to quickly form bands with the desired instrumentation for a song and/or session of a game. For example, players may play as bands featuring a guitarist, a bassist, a drummer, and a vocalist, and matchmaking methods may be used to allow players to play with others remotely according to the needed instrumentation. Beneficially, the players can also interact asynchronously while waiting for other band members to be ready to play the game.

In one aspect, the present invention relates to methods for providing interaction between remote players and one or more local players of a rhythm-action game. In one embodiment, such a method includes identifying one or more local players to participate in a networked session of a rhythm action game corresponding to a predetermined band template, each local player associated with a type of simulated musical instrument. A first type of simulated musical instrument represented in the predetermined band template and not associated with any of the one or more local players may then be identified, along with a remote player associated with the first type of simulated musical instrument. Then the game platform of the local players communicates with a game platform of the remote player to establish a networked session of the rhythm action game before initiating a game session for the local players and the remote player.

In one aspect, the present invention relates to a computer program product, tangibly embodied in a computer-readable medium, for providing interaction between remote players and one or more local players of a rhythm-action game. The computer program product includes instructions operable to cause a data processing apparatus to perform various functions such as identifying one or more local players to participate in a networked session of a rhythm action game corresponding to a predetermined band template, each local player associated with a type of simulated musical instrument, identifying a first type of simulated musical instrument represented in the predetermined band template and not associated with any of the one or more local players, identifying a remote player associated with the first type of simulated musical instrument, and communicating with a game platform of the remote player, to establish a networked session of the rhythm action game with the one or more local players and the identified remote player before initiating a game session for the one or more local players and the identified remote player.

Beneficially, any of the above embodiments enjoy the following benefits. In some embodiments, the networked session of the rhythm action game also provide a standby interfaces to local players and remote players, which allow the local players and remote player to perform actions asynchronously with respect to the actions of the other players. For example, a local player can be customizing an avatar, while a remote player is viewing a high score table or leaderboard. Or vice versa. Additionally or alternatively, the players can be viewing or altering a band profile or indicate that they are ready to begin a gameplay session. When all players have indicated that they are ready to begin gameplay, the networked sessions on each game console of the players are synchronized and a gameplay session is initiated.

BRIEF DESCRIPTION OF THE DRAWINGS

The foregoing and other objects, aspects, features, and advantages of the invention will become more apparent and better understood by referring to the following description taken in conjunction with the accompanying drawings, in which:

FIGS. 5A, 5B, 5C, and 5D depict remote players and the leader performing various actions described herein asynchronously via their shells while waiting for all players to be ready.

DETAILED DESCRIPTION

Figure 1A:
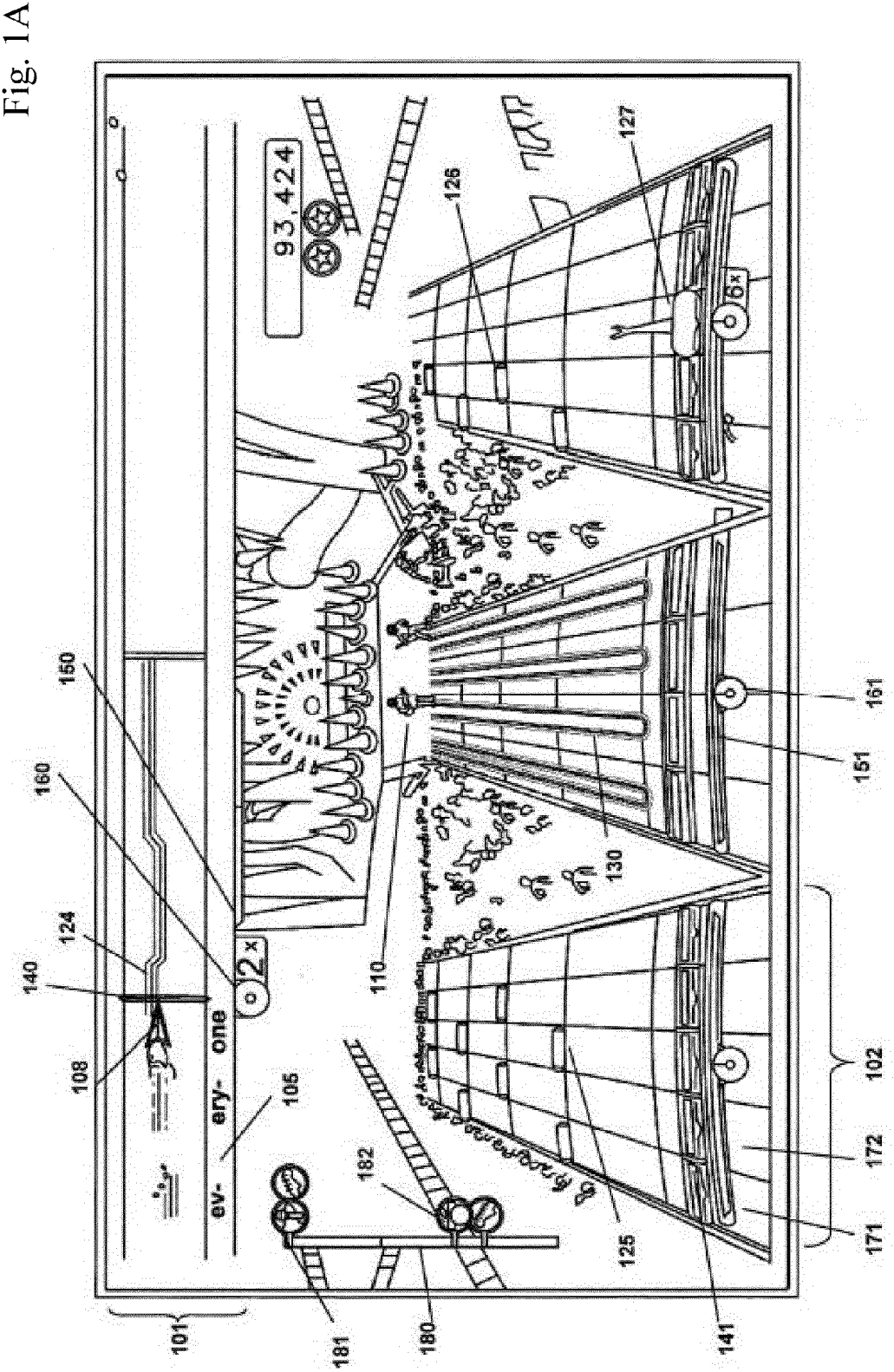
FIG. 1A is an example screenshot of one embodiment of a multiplayer rhythm-action game.

Referring now to FIG. 1A, an embodiment of a screen display for a video game in which four players emulate a musical performance is shown. One or more of the players may be represented on screen by an avatar 110. Although FIG. 1A depicts an embodiment in which four players participate, any number of players may participate simultaneously. For example, a fifth player may join the game as a keyboard player. In this case, the screen may be further subdivided to make room to display a fifth avatar and/or music interface. In some embodiments, an avatar 110 may be a computer-generated image. In other embodiments, an avatar may be a digital image, such as a video capture of a person. An avatar may be modeled on a famous figure or, in some embodiments, the avatar may be modeled on the game player associated with the avatar.

Still referring to FIG. 1A, a lane 101, 102 has one or more game "cues" 124, 125, 126, 127, 130 corresponding to musical events distributed along the lane. During gameplay, the cues, also referred to as "musical targets," "gems," or "game elements," appear to flow toward a target marker 140, 141. In some embodiments, the cues may appear to be flowing towards a player. The cues are distributed on the lane in a manner having some relationship to musical content associated with the game level. For example, the cues may represent note information (gems spaced more closely together for shorter notes and further apart for longer notes), pitch (gems placed on the left side of the lane for notes having lower pitch and the right side of the lane for higher pitch), volume (gems may glow more brightly for louder tones), duration (gems may be "stretched" to represent that a note or tone is sustained, such as the gem 127), articulation, timbre or any other time-varying aspects of the musical content. The cues may be any geometric shape and may have other visual characteristics, such as transparency, color, or variable brightness.

As the gems move along a respective lane, musical data represented by the gems may be substantially simultaneously played as audible music. In some embodiments, audible music represented by a gem is only played (or only played at full or original fidelity) if a player successfully "performs the musical content" by capturing or properly executing the gem. In some embodiments, a musical tone is played to indicate successful execution of a musical event by a player. In other embodiments, a stream of audio is played to indicate successful execution of a musical event by a player. In certain embodiments, successfully performing the musical content triggers or controls the animations of avatars.

In other embodiments, the audible music, tone, or stream of audio represented by a cue is modified, distorted, or otherwise manipulated in response to the player's proficiency in executing cues associated with a lane. For example, various digital filters can operate on the audible music, tone, or stream of audio prior to being played by the game player. Various parameters of the filters can be dynamically and automatically modified in response to the player capturing cues associated with a lane, allowing the audible music to be degraded if the player performs poorly or enhancing the audible music, tone, or stream of audio if the player performs well. For example, if a player fails to execute a game event, the audible music, tone, or stream of audio represented by the failed event may be muted, played at less than full volume, or filtered to alter its sound.

In certain embodiments, a "wrong note" sound may be substituted for the music represented by the failed event. Conversely, if a player successfully executes a game event, the audible music, tone, or stream of audio may be played normally. In some embodiments, if the player successfully executes several, successive game events, the audible music, tone, or stream of audio associated with those events may be enhanced, for example, by adding an echo or "reverb" to the audible music. The filters can be implemented as analog or digital filters in hardware, software, or any combination thereof. Further, application of the filter to the audible music output, which in many embodiments corresponds to musical events represented by cues, can be done dynamically, that is, during play. Alternatively, the musical content may be processed before game play begins. In these embodiments, one or more files representing modified audible output may be created and musical events to output may be selected from an appropriate file responsive to the player's performance.

In addition to modification of the audio aspects of game events based on the player's performance, the visual appearance of those events may also be modified based on the player's proficiency with the game. For example, failure to execute a game event properly may cause game interface elements to appear more dimly. Alternatively, successfully executing game events may cause game interface elements to glow more brightly. Similarly, the player's failure to execute game events may cause their associated avatar to appear embarrassed or dejected, while successful performance of game events may cause their associated avatar to appear happy and confident. In other embodiments, successfully executing cues associated with a lane causes the avatar associated with that lane to appear to play an instrument. For example, the drummer avatar will appear to strike the correct drum for producing the audible music. Successful execution of a number of successive cues may cause the corresponding avatar to execute a "flourish," such as kicking their leg, pumping their first, performing a guitar "windmill," spinning around, winking at the "crowd," or throwing drum sticks.

Player interaction with a cue may be required in a number of different ways. In general, the player is required to provide input when a cue passes under or over a respective one of a set of target markers 140, 141 disposed on the lane. For example, the player associated with lane 102 (lead guitar) may use a specialized controller to interact with the game that simulates a guitar, such as a Guitar Hero SG Controller, manufactured by RedOctane of Sunnyvale, Calif. In this embodiment, the player executes the cue by activating the "strum bar" while pressing the correct fret button of the controller when the cue 125 passes under the target marker 141. In other embodiments, the player may execute a cue by performing a "hammer on" or "pull off," which requires quick depression or release of a fret button without activation of the strum bar. In other embodiments, the player may be required to perform a cue using a "whammy bar" provided by the guitar controller. For example, the player may be required to bend the pitch of a note represented by a cue using the whammy bar. In some embodiments, the guitar controller may also use one or more "effects pedals," such as reverb or fuzz, to alter the sound reproduced by the gaming platform.

In other embodiments, player interaction with a cue may comprise singing a pitch and or a lyric associated with a cue. For example, the player associated with lane 101 may be required to sing into a microphone to match the pitches indicated by the gem 124 as the gem 124 passes over the target marker 140. As shown in FIG. 1A, the notes of a vocal track are represented by "note tubes" 124. In the embodiment shown in FIG. 1A, the note tubes 124 appear at the top of the screen and flow horizontally, from right to left, as the musical content progresses. In this embodiment, vertical position of a note tube 124 represents the pitch to be sung by the player; the length of the note tube indicates the duration for which the player must hold that pitch. In other embodiments, the note tubes may appear at the bottom or middle of the screen. The arrow 108 provides the player with visual feedback regarding the pitch of the note that is currently being sung. If the arrow is above the note tube 124, the player needs to lower the pitch of the note being sung. Similarly, if the arrow 108 is below the note tube 124, the player needs to raise the pitch of the note being sung. In these embodiments, the vocalist may provide vocal input using a USB microphone of the sort manufactured by Logitech International of Switzerland. In other embodiments, the vocalist may provide vocal input using another sort of simulated microphone. In still further embodiments, the vocalist may provide vocal input using a traditional microphone commonly used with amplifiers. As used herein, a "simulated microphone" is any microphone apparatus that does not have a traditional XLR connector. As shown in FIG. 1A, lyrics 105 may be provided to the player to assist their performance.

In still other embodiments, a player interaction with a cue may comprise any manipulation of any simulated instrument and/or game controller.

As shown in FIG. 1A, each lane may be subdivided into a plurality of segments. Each segment may correspond to some unit of musical time, such as a beat, a plurality of beats, a measure, or a plurality of measures. Although the embodiment shown in FIG. 1A show equally-sized segments, each segment may have a different length depending on the particular musical data to be displayed. In addition to musical data, each segment may be textured or colored to enhance the interactivity of the display. For embodiments in which a lane comprises a tunnel or other shape (as described above), a cursor is provided to indicate which surface is "active," that is, with which lane surface a player is currently interacting. In these embodiments, the viewer can use an input device to move the cursor from one surface to another. As shown in FIG. 1A, each lane may also be divided into a number of sub-lanes, with each sub-lane containing musical targets indicating different input elements. For example, the lane 102 is divided into five sub-lanes, including sub-lanes 171 and 172. Each sub-lane may correspond to a different fret button on the neck of a simulated guitar.

Figure 1B:
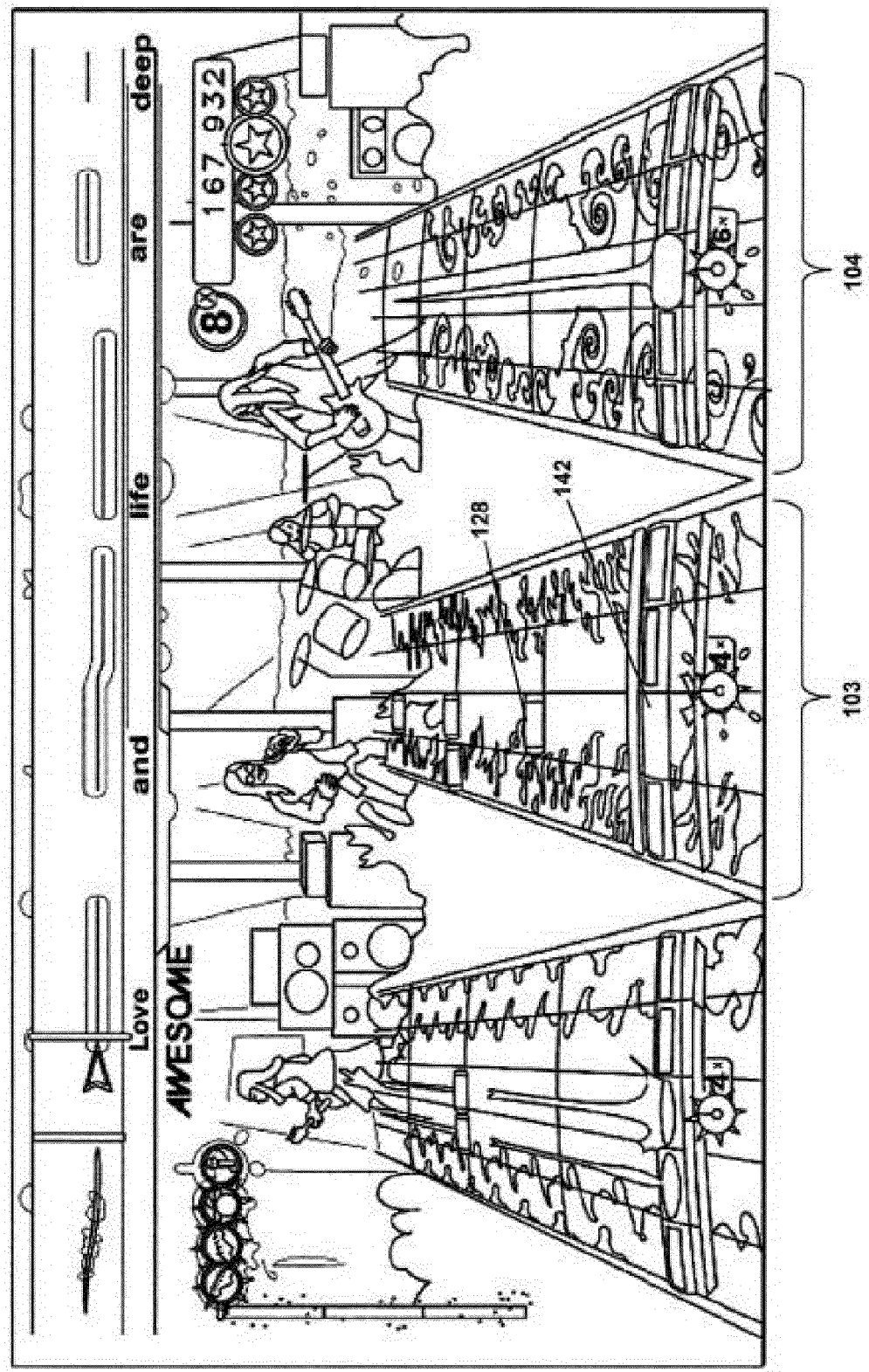
FIG. 1B is a second example screenshot of one embodiment of a multiplayer rhythm-action game.

Referring now to FIG. 1B, a second embodiment of a screen display for a video game in which four players emulate a musical performance is shown. In the embodiment shown, the lanes 103, 104 have graphical designs corresponding to gameplay events. For example, lane 103 comprises a flame pattern, which may correspond to a bonus activation by the player. For example, lane 104 comprises a curlicue pattern, which may correspond to the player achieving the 6× multiplier shown.

In other embodiments, a game display may alternate the display of one or more avatars and/or the display of the band as a whole. For example, during the performance of a song, a display may switch between a number of camera angle providing, for example, close-ups of the guitarist, bassist, drummer, or vocalist, shots of the band as a whole, shots of the crowd, and/or any combination of the avatars, stage, crowd, and instruments. In some embodiments, the sequence and timing of camera angles may be selected to resemble a music video. In some embodiments, the camera angles may be selected to display an avatar of a player who is performing a distinctive portion of a song. In other embodiments the camera angles may be selected to display an avatar of a player who is performing particularly well or poorly. In some embodiments, an avatar's gestures or actions may correspond to the current camera angle. For example, an avatar may have certain moves, such as a jump, head bang, devil horns, special dance, or other move, which are performed when a close-up of the avatar is shown. In some embodiments, the avatars motions may be choreographed to mimic the actual playing of the song. For example, if a song contains a section where the drummer hits a cymbal crash, the drummer avatar may be shown to hit a cymbal crash at the correct point in the song.

In some embodiments, avatars may interact with the crowd at a venue, and camera angles may correspond to the interaction. For example, in one camera angle, an avatar may be shown pointing at various sections of the crowd. In the next camera angle the various sections of the crowd may be shown screaming, waving, or otherwise interacting with the avatar. In other embodiments, avatars may interact with each other. For example, two avatars may lean back-to-back while performing a portion of a song. Or for example, the entire band may jump up and land simultaneously, and stage pyrotechnics may also be synchronized to the band's move.

In some embodiments, the "lanes" containing the musical cues to be performed by the players may be on screen continuously. In other embodiments one or more lanes may be removed in response to game conditions, for example if a player has failed a portion of a song, or if a song contains an extended time without requiring input from a given player.

Although depicted in FIGS. 1A and 1B, in some embodiments (not shown), instead of a lane extending from a player's avatar, a three-dimensional "tunnel" comprising a number of lanes extends from a player's avatar. The tunnel may have any number of lanes and, therefore, may be triangular, square, pentagonal, sextagonal, septagonal, octagonal, nonanogal, or any other closed shape. In still other embodiments, the lanes do not form a closed shape. The sides may form a road, trough, or some other complex shape that does not have its ends connected. For ease of reference throughout this document, the display element comprising the musical cues for a player is referred to as a "lane."

In some embodiments, a lane does not extend perpendicularly from the image plane of the display, but instead extends obliquely from the image plane of the display. In further embodiments, the lane may be curved or may be some combination of curved portions and straight portions. In still further embodiments, the lane may form a closed loop through which the viewer may travel, such as a circular or ellipsoid loop.

It should be understood that the display of three-dimensional "virtual" space is an illusion achieved by mathematically "rendering" two-dimensional images from objects in a three-dimensional "virtual space" using a "virtual camera," just as a physical camera optically renders a two-dimensional view of real three-dimensional objects. Animation may be achieved by displaying a series of two-dimensional views in rapid succession, similar to motion picture films that display multiple still photographs per second.

To generate the three-dimensional space, each object in the three-dimensional space is typically modeled as one or more polygons, each of which has associated visual features such as texture, transparency, lighting, shading, anti-aliasing, z-buffering, and many other graphical attributes. The combination of all the polygons with their associated visual features can be used to model a three-dimensional scene. A virtual camera may be positioned and oriented anywhere within the scene. In many cases, the camera is under the control of the viewer, allowing the viewer to scan objects. Movement of the camera through the three-dimensional space results in the creation of animations that give the appearance of navigation by the user through the three-dimensional environment.

A software graphics engine may be provided which supports three-dimensional scene creation and manipulation. A graphics engine generally includes one or more software modules that perform the mathematical operations necessary to "render" the three-dimensional environment, which means that the graphics engine applies texture, transparency, and other attributes to the polygons that make up a scene. Graphic engines that may be used in connection with the present invention include Gamebryo, manufactured by Emergent Game Technologies of Calabasas, Calif., the Unreal Engine, manufactured by Epic Games, and Renderware, manufactured by Criterion Software of Austin, Tex. In other embodiments, a proprietary graphic engine may be used. In many embodiments, a graphics hardware accelerator may be utilized to improve performance. Generally, a graphics accelerator includes video memory that is used to store image and environment data while it is being manipulated by the accelerator.

In other embodiments, a three-dimensional engine may not be used. Instead, a two-dimensional interface may be used. In such an embodiment, video footage of a band can be used in the background of the video game. In others of these embodiments, traditional two-dimensional computer-generated representations of a band may be used in the game. In still further embodiments, the background may be only slightly related, or unrelated, to the band. For example, the background may be a still photograph or an abstract pattern of colors. In these embodiments, the lane may be represented as a linear element of the display, such as a horizontal, vertical or diagonal element.

Still referring to FIG. 1B, the player associated with the middle lane 103 (drummer) may also use a specialized controller to interact with the game that simulates a drum kit, such as the DrumMania drum controller, manufactured by Topway Electrical Appliance Co., Ltd. of Shenzhen, China. In some embodiments, the drum controller provides four drum pads and a kick drum pedal. In other embodiments, the drum controller surrounds the player, as a "real" drum kit would do. In still other embodiments, the drum controller is designed to look and feel like an analog drum kit. In these embodiments, a cue may be associated with a particular drum. The player strikes the indicated drum when the cue 128 passes under the target marker 142, to successfully execute cue 128. In other embodiments, a player may use a standard game controller to play, such as a DualShock game controller, manufactured by Sony Corporation.

Referring back to FIG. 1A, in some embodiments, improvisational or "fill" sections may be indicated to a drummer or any other instrumentalist. In FIG. 1A, a drum fill is indicated by long tubes 130 filling each of the sub-lanes of the center lane which corresponds to the drummer.

In some embodiments, a player is associated with a "turntable" or "scratch" track. In these embodiments, the player may provide input using a simulated turntable such as the turntable controller sold by Konami Corporation.

Local play may be competitive or it may be cooperative. Cooperative play is when two or more players work together in an attempt to earn a combined score. Competitive play may be when a player competes against another player in an attempt to earn a higher score. In other embodiments, competitive play involves a team of cooperating players competing against another team of competing players in attempt to achieve a higher team score than the other team. Competitive local play may be head-to-head competition using the same instrument, head-to-head competition using separate instruments, simultaneous competition using the same instrument, or simultaneous competition using separate instruments. In some embodiments, rather than competing for a high score, players or teams may compete for the best crowd rating, longest consecutive correct note streak, highest accuracy, or any other performance metric. In some embodiments, competitive play may feature a "tug-of-war" on a crowd meter, in which each side tries to "pull" a crowd meter in their direction by successfully playing a song. In one embodiment, a limit may be placed on how far ahead one side can get in a competitive event. In this manner, even a side which has been significantly outplayed in the first section of a song may have a chance late in a song to win the crowd back and win the event.

In one embodiment, competition in local play may involve two or more players using the same type of instrument controller to play the game, for example, guitar controllers. In some embodiments, each player associates themselves with a band in order to begin play. In other embodiments, each player can simply play "solo," without association with a band. In these embodiments, the other instruments required for performance of a musical composition are reproduced by the gaming platform. Each of the players has an associated lane and each player is alternately required to perform a predetermined portion of the musical composition. Each player scores depending on how faithfully he or she reproduces their portions of the musical composition. In some embodiments, scores may be normalized to produce similar scores and promote competition across different difficulty levels. For example, a guitarist on a "medium" difficulty level may be required to perform half of the notes as a guitarist on a "hard" difficulty level and, as such, should get 100 points per note instead of 50. An additional per-difficulty scalar may be required to make this feel "fair."

This embodiment of head-to-head play may be extended to allow the players to use different types of game controllers and, therefore, to perform different portions of the musical composition. For example, one player may elect to play using a guitar-type controller while a second player may play using a drum-type controller. Alternatively, each player may use a guitar-type controller, but one player elects to play "lead guitar" while the other player elects to play "rhythm guitar" or, in some embodiments, "bass guitar." In these examples, the gaming platform reproduces the instruments other than the guitar when it is the first player's turn to play, and the lane associated with the first player is populated with gems representing the guitar portion of the composition. When it is time for the second player to compete, the gaming platform reproduces the instruments other than, for example, the drum part, and the second player's lane is populated with gems representing the drum portion of the musical composition. In some of these embodiments, a scalar factor may be applied to the score of one of the player's to compensate for the differences in the parts of the musical composition.

In still other embodiments, the players may compete simultaneously, that is, each player may provide a musical performance at the same time as the other player. In some embodiments, both players may use the same type of controller. In these embodiments, each player's lane provides the same pattern of cues and each player attempts to reproduce the musical performance identified by those elements more faithfully than the other player. In other embodiments, the players use different types of controllers. In these embodiments, one player attempts to reproduce one portion of a musical composition while the other player tries to represent a different portion of the same composition.

In any of these forms of competition, the relative performance of a player may affect their associated avatar. For example, the avatar of a player that is doing better than the competition may, for example, smile, look confident, glow, swagger, "pogo stick," etc. Conversely, the losing player's avatar may look depressed, embarrassed, etc.

Instead of competing, the players may cooperate in an attempt to achieve a combined score. In these embodiments, the score of each player contributes to the score of the team, that is, a single score is assigned to the team based on the performance of all players. As described above, a scalar factor may be applied to the score of one of the player's to compensate for the differences in the parts of the musical composition.

Still referring to FIG. 1A, an indicator of the performance of a number of players on a single performance meter 180 is shown. In brief overview, each of the players in a band may be represented by an icon 181, 182. In the figure shown the icons 181, 182 are circles with graphics indicating the instrument the icon corresponds to. For example, the icon 181 contains a microphone representing the vocalist, while icon 182 contains a drum set representing the drummer. The position of a player's icon on the meter 180 indicates a current level of performance for the player. A colored bar on the meter may indicate the performance of the band as a whole. Although the meter shown displays the performance of four players and a band as a whole, in other embodiments, any number of players or bands may be displayed on a meter, including two, three, four, five, six, seven, eight, nine, or ten players, and any number of bands.

The meter 180 may indicate any measure of performance, and performance may be computed in any manner. In some embodiments, the meter 180 may indicate a weighted rolling average of a player's performance. For example, a player's position on the meter may reflect a percentage of notes successfully hit, where more recent notes are weighted more heavily than less recent notes. In another embodiment, a player's position on the meter may be calculated by computing a weighted average of the player's performance on a number of phrases. In some embodiments, a player's position on the meter may be updated on a note-by-note basis. In other embodiments, a player's position on the meter may be updated on a phrase-by-phrase basis. The meter may also indicate any measure of a band's performance. In some embodiments, the meter may display the band's performance as an average of each of the players' performances. In other embodiments, the indicated band's performance may comprise a weighted average in which some players' performances are more heavily weighted.

In some embodiments, the meter 180 may comprise subdivisions which indicate relative levels of performance. For example, in the embodiment shown, the meter 140 is divided roughly into thirds, which may correspond to Good, Average, and Poor performance.

In some embodiments, a player or players in a band may "fail" a song if their performance falls to the bottom of the meter. In some embodiments, consequences of failing a song may include being removed from the rest of the song. In these embodiments, a player who has failed may have their lane removed from the display, and the audio corresponding to that player's part may be removed. In some embodiments, if a single member of a band fails a song, the band may consequently fail the song. In other embodiments, if a member of a band fails a song, one or more other members of the band may continue playing. In still other embodiments, one or more other members of a band may reinstate the failed player.

The icons 181, 182 displayed to indicate each player may comprise any graphical or textual element. In some embodiments, the icons may comprise text with the name of one or more of the players. In another embodiment the icon may comprise text with the name of the instrument of the player. In other embodiments, the icons may comprise a graphical icon corresponding to the instrument of the player. For example, an icon containing a drawing of a drum 182 may be used to indicate the performance of a drummer.

The overall performance of the band may be indicated in any manner on the meter 180. In the embodiment shown, a filled bar 180 indicates the band's performance as a whole. In other embodiments, the band's performance may be represented by an icon. In some embodiments, individual performances may not be indicated on a meter, and only the performance of the band as a whole may be displayed.

Although described above in the context of a single player providing a single type of input, a single player may provide one or more types of input simultaneously. For example, a single player providing instrument-based input (such as for a lead guitar track, bass guitar track, rhythm guitar track, keyboard track, drum track, or other percussion track) and vocal input simultaneously.

Still referring to FIG. 1A, meters 150, 151 may be displayed for each player indicating an amount of stored bonus. The meters may be displayed graphically in any manner, including a bar, pie, graph, or number. In some embodiments, each player may be able to view the meters of remote players. In other embodiments, only bonus meters of local players may be shown. Bonuses may be accumulated in any manner including, without limitation, by playing specially designated musical phrases, hitting a certain number of consecutive notes, or by maintaining a given percentage of correct notes.

In some embodiments, if a given amount of bonuses are accumulated, a player may activate the bonus to trigger an in-game effect. An in-game effect may comprise a graphical display change including, without limitation, an increase or change in crowd animation, avatar animation, performance of a special trick by the avatar, lighting change, setting change, or change to the display of the lane of the player. An in-game effect may also comprise an aural effect, such as a guitar modulation, including feedback, distortion, screech, flange, wah-wah, echo, or reverb, a crowd cheer, an increase in volume, and/or an explosion or other aural signifier that the bonus has been activated. An in-game effect may also comprise a score effect, such as a score multiplier or bonus score addition. In some embodiments, the in-game effect may last a predetermined amount of time for a given bonus activation.

In some embodiments, bonuses may be accumulated and/or deployed in a continuous manner. In other embodiments, bonuses may be accumulated and/or deployed in a discrete manner. For example, instead of the continuous bar shown in FIG. 1A, a bonus meter may comprise a number of "lights" each of which corresponds to a single bonus earned. A player may then deploy the bonuses one at a time.

In some embodiments, bonus accumulation and deployment may be different for each simulated instrument. For example, in one embodiment only the bass player may accumulate bonuses, while only the lead guitarist can deploy the bonuses.

FIG. 1A also depicts score multiplier indicators 160, 161. A score multiplier indicator 160, 161 may comprise any graphical indication of a score multiplier currently in effect for a player. In some embodiments, a score multiplier may be raised by hitting a number of consecutive notes. In other embodiments, a score multiplier may be calculated by averaging score multipliers achieved by individual members of a band. For example, a score multiplier indicator 160, 161 may comprise a disk that is filled with progressively more pie slices as a player hits a number of notes in a row. Once the player has filled the disk, the player's multiplier may be increased, and the disk may be cleared. In some embodiments, a player's multiplier may be capped at certain amounts. For example, a drummer may be limited to a score multiplier of no higher than 4×. Or for example, a bass player may be limited to a score multiplier of no higher than 6×.

In some embodiments, a separate performance meter (not shown) may be displayed under the lane of each player. This separate performance meter may comprise a simplified indication of how well the player is doing. In one embodiment, the separate performance meter may comprise an icon which indicates whether a player is doing great, well, or poorly. For example, the icon for "great" may comprise a hand showing devil horns, "good" may be a thumbs up, and "poor" may be a thumbs down. In other embodiments, a player's lane may flash or change color to indicate good or poor performance.

Each player may use a gaming platform in order to participate in the game. In one embodiment, the gaming platform is a dedicated game console, such as: PLAYSTATION2, PLAYSTATION3, or PLAYSTATION PERSONAL, manufactured by Sony Corporation; DREAMCAST, manufactured by Sega Corp.; GAMECUBE, GAMEBOY, GAMEBOY ADVANCE, or WII, manufactured by Nintendo Corp.; or XBOX or XBOX360, manufactured by Microsoft Corp. In other embodiments, the gaming platform comprises a personal computer, personal digital assistant, or cellular telephone. In some embodiments, the players associated with avatars may be physically proximate to one another. For example, each of the players associated with the avatars may connect their respective game controllers into the same gaming platform ("local play").

Figure 1C:
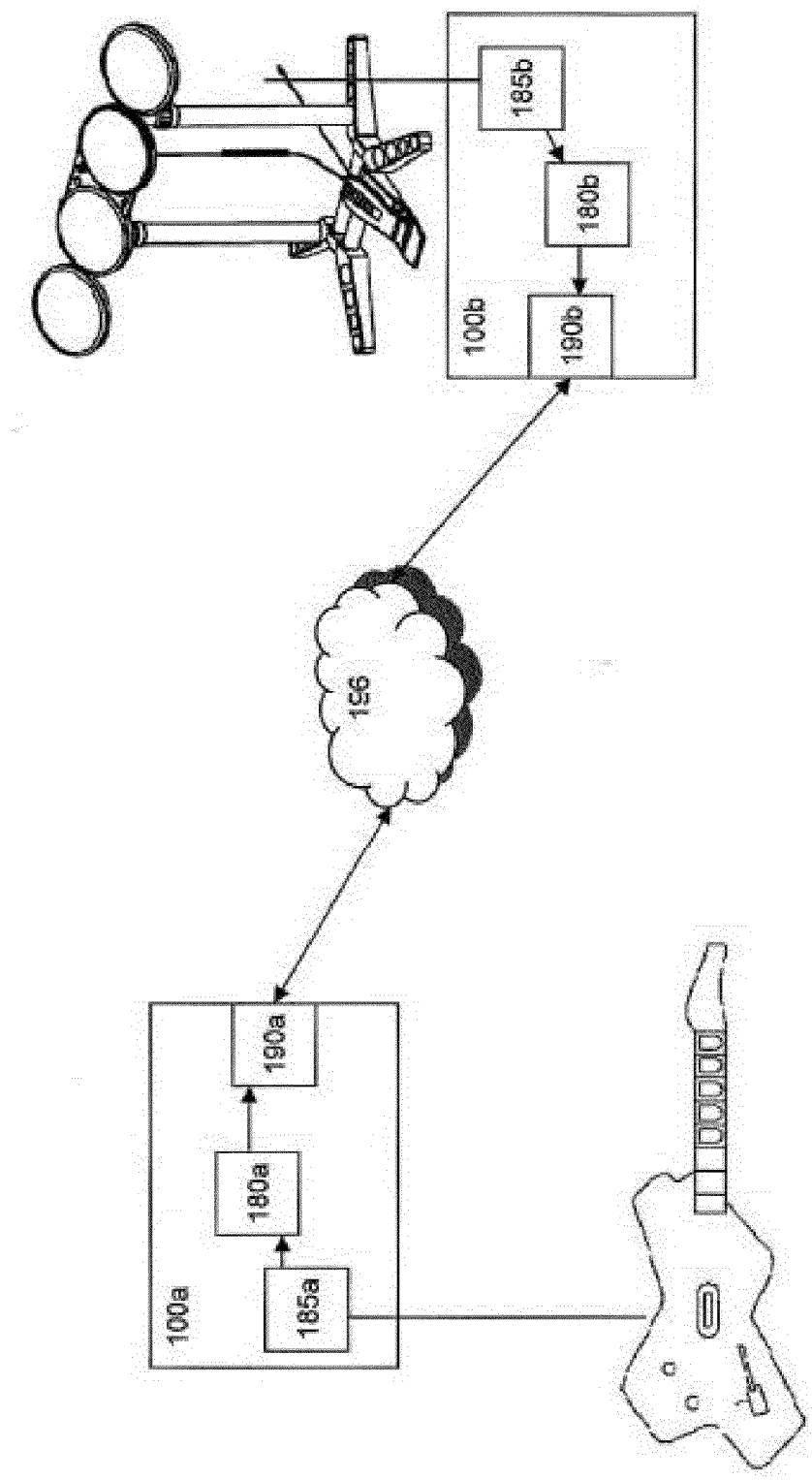
FIG. 1C is a block diagram of a system facilitating network play of a rhythm action game.

In some embodiments, one or more of the players may participate remotely. FIG. 1C depicts a block diagram of a system facilitating network play of a rhythm action game. As shown in FIG. 1C, a first gaming platform 100a and a second gaming platform 100b communicate over a network 196, such as a local area network (LAN), a metropolitan area network (MAN), or a wide area network (WAN) such as the Internet or the World Wide Web. The gaming platforms connect to the network through one of a variety of connections including standard telephone lines, LAN or WAN links (e.g., T1, T3, 56 kb, X.25), broadband connections (e.g., ISDN, Frame Relay, ATM), and wireless connections (e.g., 802.11a, 802.11g, Wi-Max). The first gaming platform 100a and the second gaming platform 100b may be any of the types of gaming platforms identified above. In some embodiments, the first gaming platforms 100a and the second gaming platform 100b are of different types.

When a networked multiplayer game session begins at the direction of one of the players, that player's gaming platform 100a (the "host") transmits a "start" instruction to all other gaming platforms participating in the networked game, and the game begins on all platforms. A timer begins counting on each gaming platform, each player's game cues are displayed, and each player begins attempting to perform the musical composition.

Gameplay on gaming platform 100a is independent from game play on gaming platform 100b, except that each player's gaming platform contains a local copy of the musical event data for all other players. The timers on the various gaming platforms communicate with each other via the network 196 to maintain approximate synchrony using any number of the conventional means known in the art.

The gaming platforms 100a, 100b also continually transmit game score data to each other, so that each system (and player) remains aware of the game score of all other systems (and players). Similarly, this is accomplished by any number of means known in the art. Note that this data is not particularly timing sensitive, because if there is momentary disagreement between any two gaming platforms regarding the score (or similar game-related parameters), the consequences to gameplay are negligible.

In one embodiment, as each player plays the game at their respective location, an analyzer module 180a, 180b on that player's gaming platform 100a, 100b continually extracts data from an event monitor 185a, 185b regarding the local player's performance, referred to hereafter as "emulation data". Emulation data may include any number of parameters that describe how well the player is performing. Some examples of these parameters include:

whether or not the most recent event type was a correctly-played note or an incorrectly-played note;

a timing value representing the difference between actual performance of the musical event and expected performance of the musical event;

a moving average of the distribution of event types (e.g., the recent ratio of correct to incorrect notes); and a moving average of the differences between the actual performance of musical events and the expected performance times of the musical events; or a moving average of timing errors of incorrect notes.

Each analyzer module 180a, 180b continually transmits the emulation data it extracts over the network 196 using transceiver 190a, 190b; each event monitor 185a, 185b continually receives the other gaming platform's emulation data transmitted over the network 196.

In one embodiment, the emulation data essentially contains a statistical description of a player's performance in the recent past. The event monitor 185a, 185b uses received emulation data to create a statistical approximation of the remote player's performance.

In one particular example, an incoming emulation parameter from a remote player indicates that the most recent remote event was correctly reproduced. When the local event monitor 185a, 185b reaches the next note in the local copy of the remote player's note data, it will respond accordingly by "faking" a successfully played note, triggering the appropriate sound. That is, the local event monitor 185a, 185b will perform the next musical event from the other players' musical event data, even though that event was not necessarily actually performed by the other player's event monitor 185a, 185b. If instead the emulation parameter had indicated that the most recent remote event was a miss, no sound would be triggered.

In another particular example, an incoming emulation parameter from a remote player indicates that, during the last 8 beats, 75% of events were correctly reproduced and 25% were not correctly reproduced. When the local event monitor 185a reaches the next note in the local copy of the remote player's note data, it will respond accordingly by randomly reproducing the event correctly 75% of the time and not reproducing it correctly 25% of the time.

In another particular example, an incoming emulation parameter from a remote player indicates that, during the last 4 beats, 2 events were incorrectly performed, with an average timing error of 50 "ticks." The local event monitor 185a, 185b will respond accordingly by randomly generating incorrect events at a rate of 0.5 misses-per-beat, displacing them in time from nearby notes by the specified average timing error.

The above three cases are merely examples of the many types of emulation parameters that may be used. In essence, the remote player performances are only emulated (rather than exactly reproduced) on each local machine.

In this embodiment, the analyzer module 180a, 180b may extract musical parameters from the input and transmit them over a network 196 to a remote gaming platform. For example, the analyzer module 180a, 180b may simply transmit the input stream over a network 196 or it may extract the information into a more abstract form, such as "faster" or "lower." Although described in the context of a two-player game, the technique may be used with any number of players.

Still referring to FIG. 1C, in another embodiment, analyzer module 180a, 180b extracts data from the event monitor 185a, 185b regarding the local player's performance. In this embodiment, however, the extracted data is transmitted over the network 196 using the transceiver 190a, 190b. When the analyzer 180a, 180b receives the transmitted data, it generates an emulation parameter representing the other player's musical performance and provides the locally-generated emulation parameter to the event monitor 185a, 185b, as described above. One advantage of this embodiment is that each player may locally set their preference for how they want the event monitor 185a, 185b to act on emulation parameters.

In other embodiments, the transmitted data is associated with a flag that indicates whether the transmitted data represents a successfully executed musical event or an unsuccessfully executed musical event. In these embodiments, the analyzer 180a, 180b provides a locally-generated emulation parameter to the event monitor 185a, 185b based on the flag associated with the transmitted data.

One unusual side effect of these techniques is that each local player does not hear an exact reproduction of the remote players' performances; only a statistical approximation. However, these statistical approximations have two countervailing positive attributes: because they are synchronized to the local player's timer and the local copy of the remote players' note data, they are synchronous with the local player's performance; and while not exact reproductions, they are "close enough" to effectively communicate to the local player the essence of how well the remote players are performing musically. In this model, delays in the transmission of the data over the network 196 do not have the intolerable side effect of causing cacophonous asynchronicity between the note streams triggering sounds on each player's local system.

In other embodiments, a central server may be used to facilitate communication between the gaming platforms 100a, 100b. Extraction of emulation parameters is performed, as described above. The server distributes data, whether music performance data or emulation parameter data, to all other gaming platforms participating in the current game. In other embodiments, the server may store received data for use later. For example, a band may elect to use the stored data for the performance of a band member who is unavailable to play in a specific game.

Figure 1D:
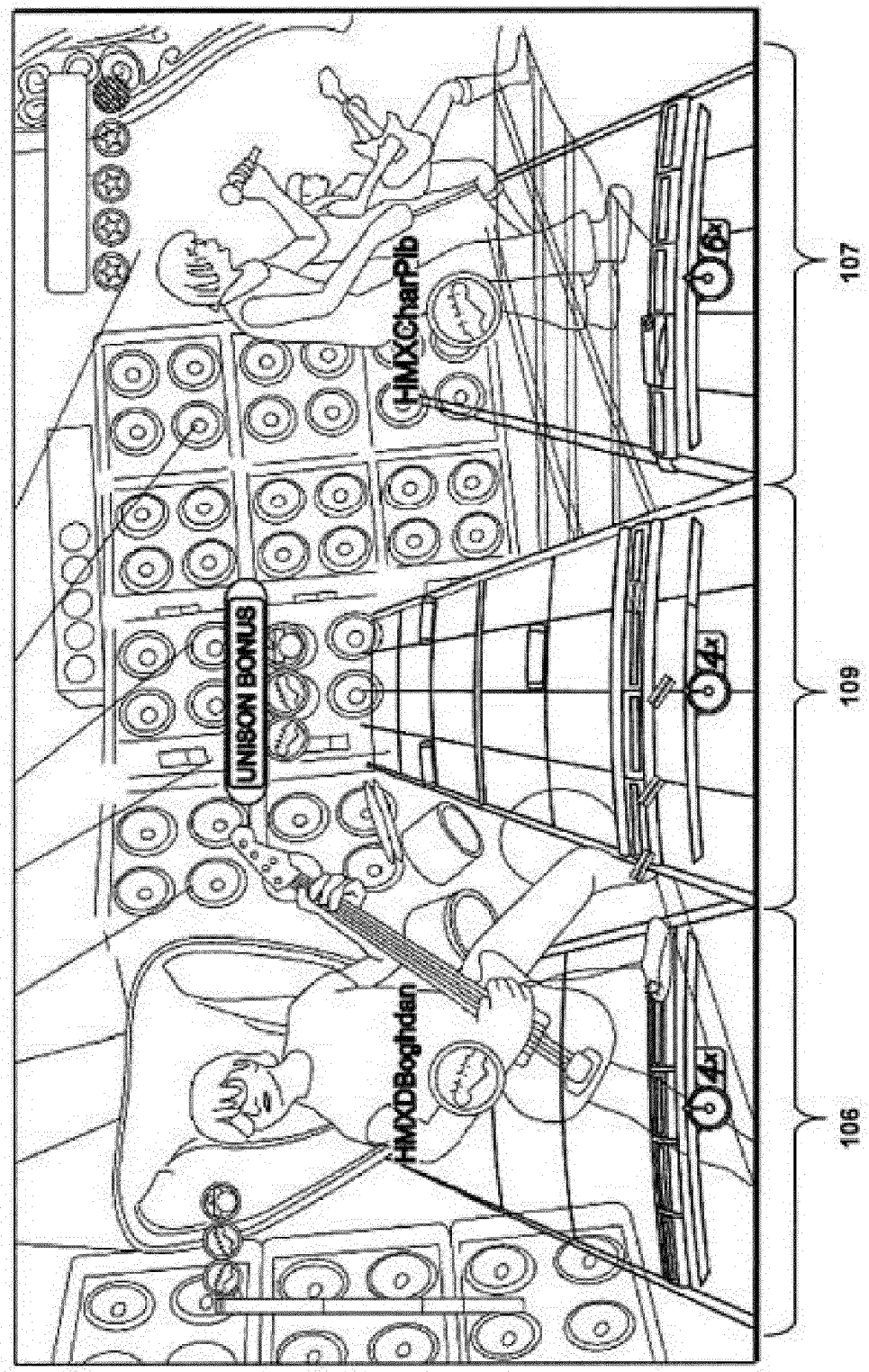
FIG. 1D is an example screenshot of one embodiment of network play of a rhythm action game.

Referring now to FIG. 1D, one embodiment of a screen display for remote multiplayer play is shown. The embodiment of the screen display shown in FIG. 1D may be used for head-to-head play, for simultaneous competition, and for cooperative play. As shown in FIG. 1D, a local player's lane 109 is shown larger than the lanes 106, 107 of two remote players. The avatars for remote players may appear normally on stage in a similar manner as if the avatars represented local players. In other embodiments, the lanes may be displayed in a similar manner for both local multiplayer and remote multiplayer. In still other embodiments, in remote multiplayer, only the local player or player's avatars may be shown.

As shown in FIG. 1D, the lanes 106, 107 associated with the remote players are shown smaller than the local player's lane 109. In other embodiments, the lanes of one or more remote players may be graphically distinguished in any other way. For example, the remote players' lanes may be shown translucently. Or for example, the remote players' lanes may have a higher transparency than local player's lanes. Or the remote players' lanes may be shown in grayscale, or in a different screen location than local players' lanes. In some embodiments, a remote vocalist's lane may not be shown at all, and instead only the lyrics of the song may be displayed.

In some embodiments, multiple players participate in an online face-off between two bands. A "band" is two or more players that play in a cooperative mode. In some embodiments, the two bands need to have the same types of instruments at the same difficulty level selection, i.e., a guitarist playing on "hard" and a bassist playing on "medium" playing against a guitarist playing on "hard" and a bassist playing on "medium." In other embodiments, the two bands still need to have the same types of instruments but the difficulty selections can be different: Players participating at a lower difficulty level simply have fewer gems to contribute to the overall score. The song to be played may be selected after the teams have been paired up. Alternatively, a band may publish a challenge to play a particular song and a team may accept the challenge.

For example, a local group of players may formed a band and give their band a name ("The Freqs."). Each of the four players in the "The Freqs" is local to one another. They may then competing against a team of players located remotely, who have formed a band called "The Champs." In some cases "The Champs" may each be local to one another. In other cases, members of "The Champs" may be remote to each other. Each player in "The Freqs" and "the Champs" may see a display similar to FIG. 1A or FIG. 1B. However, in some embodiments, an additional score meter may be displayed showing the score of the other band. In other embodiments any other measure and indication of performance of a band may be given. For example, in some embodiments, meters may be displayed for each band indicating relative performance, crowd engagement, percentage of notes hit, or any other metric. In some embodiments, a four-in-one meter 180 as depicted in FIG. 1A may be displayed for each band. In some embodiments, avatars from both bands may be depicted on the stage.

In some embodiments, the bands "trade" alternating portions of the musical composition to perform; that is, the performance of the song alternates between bands. In these embodiments, musical performance output from "The Champs" is reproduced locally at the gaming platform used by "The Freqs" when "The Champs" are performing. Similarly, the musical performance of "The Freqs" is reproduced remotely (using the emulation parameter technique described above) at the gaming platform of "The Champs" when "The Freqs" are performing. In other embodiments, the bands play simultaneously. In these embodiments, the displayed score may be the only feedback that "The Freqs" are provided regarding how well "The Champs" are performing.

In some particular embodiments, members of cooperating bands may be local to one another or remote from one another.

Similarly, members of competing bands may be local to one another or remote from one another. In one example, each player is remote from every other player.

In some embodiments, players may form persistent bands. In these embodiments, those bands may only compete when at least a majority of the band in available online. In some of the embodiments, if a member of a persistent band in not online and the other band members want to compete, a gaming platform may substitute for the missing band member. Alternatively, a player unaffiliated with the band may substitute for the missing band member. In still other embodiments, a stream of emulation parameters stored during a previous performance by the missing band member may be substituted for the player. In other embodiments, an online venue may be provided allowing players to form impromptu bands. Impromptu bands may dissolve quickly or they may become persistent bands.

Although FIGS. 1A, 1B and 1D show a band comprising one or more guitars, a drummer, and a vocalist, a band may comprise any number of people playing any musical instruments. Instruments that may be simulated and played in the context of a game may include, without limitation, any percussion instruments (including cymbals, bell lyre, celeste, chimes, crotales, glockenspiel, marimba, orchestra bells, steel drums, timpani, vibraphone, xylophone, bass drum, crash cymbal, gong, suspended cymbal, tam-tam, tenor drum, tom-tom, acme siren, bird whistle, boat whistle, finger cymbals, flex-a-tone, mouth organ, marching machine, police whistle, ratchet, rattle, sandpaper blocks, slapstick, sleigh bells, tambourine, temple blocks, thunder machine, train whistle, triangle, vibra-slap, wind machine, wood block, agogo bells, bongo drum, cabaca, castanets, claves, conga, cowbell, maracas, scraper, timbales, kick drum, hi-hat, ride cymbal, sizzle cymbal, snare drum, and splash cymbal), wind instruments (including piccolo, alto flute, bass flute, contraalto flute, contrabass flute, subcontrabass flute, double contrabass flute, piccolo clarinet, sopranino clarinet, soprano clarinet, basset horn, alto clarinet, bass clarinet, contra-alto clarinet, contrabass clarinet, octocontra-alto clarinet, octocontrabass clarinet, saxonette, soprillo, sopranino saxophone, soprano saxophone, conn-o-sax, clar-o-sax, saxie, mezzo-soprano saxophone, alto saxophone, tenor saxophone, baritone saxophone, bass saxophone, contrabass saxophone, subcontrabass saxophone, tubax, aulochrome, tarogato, folgerphone, contrabassoon, tenoroon, piccolo oboe, oboe d'amore, English horn, French horn, oboe de caccia, bass oboe, baritone oboe, contrabass oboe, bagpipes, bugle, comet, didgeridoo, euphonium, flugelhorn, shofar, sousaphone trombone, trumpet, tuba, accordion, concertina, harmonica, harmonium, pipe organ, voice, bullroarer, lasso d'amore, whip and siren), other stringed instruments (including harps, dulcimer, archlute, arpeggione, banjo, cello, Chapman stick, cittern, clavichord, double bass, fiddle, slide guitar, steel guitar, harpsichord hurdy gurdy, kora, koto, lute, lyre, mandola, mandolin, sitar, ukulele, viola, violin, and zither) and keyboard instruments (including accordion, bandoneon, calliope, carillon, celesta, clavichord, glasschord, harpsichord, electronic organ, Hammond organ, pipe organ, MIDI keyboard, baby grand piano, electric piano, grand piano, janko piano, toy piano, upright piano, viola organista, and spinets).

Figure 2A:
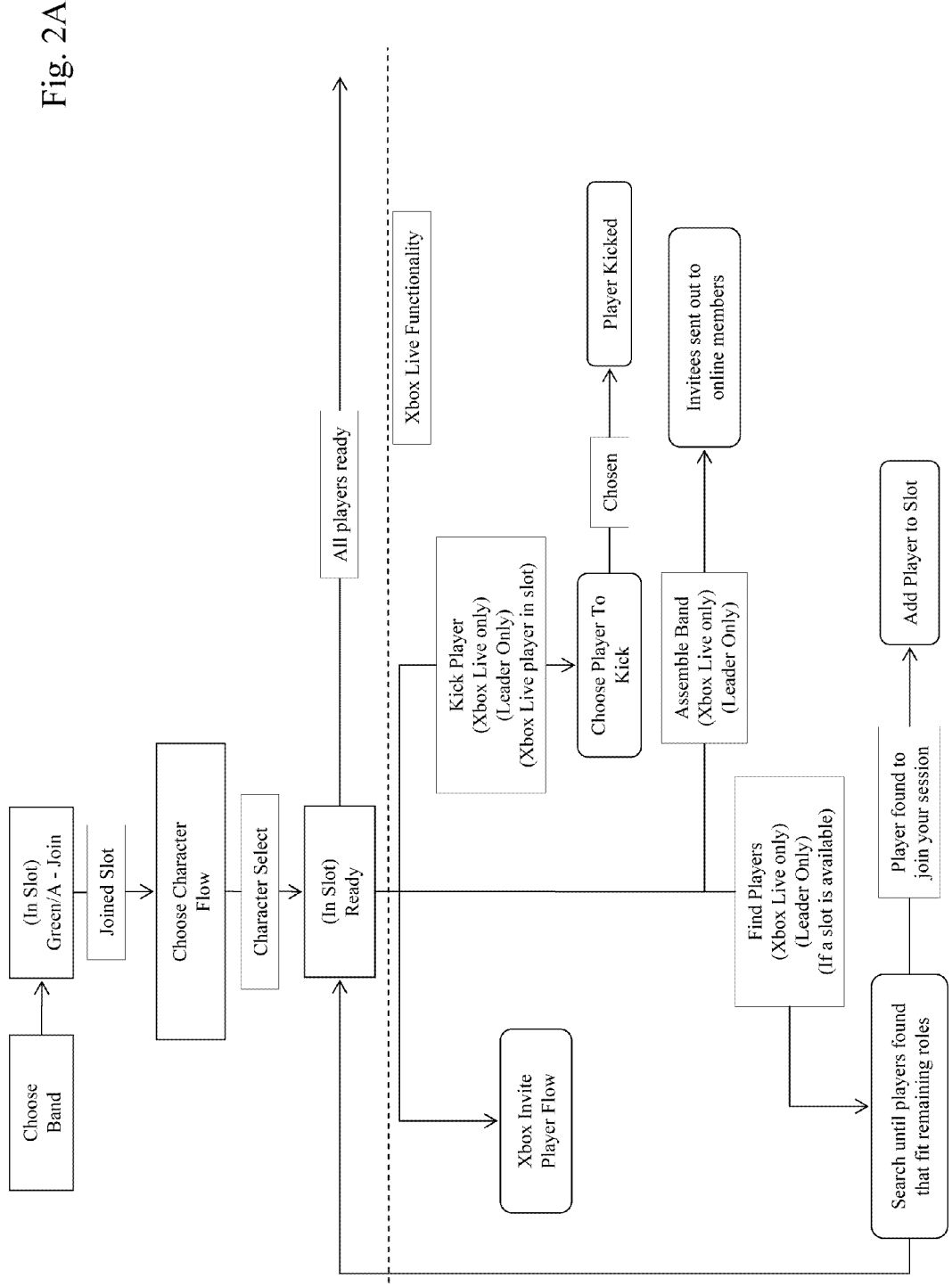
FIGS. 2A and 2B are flow diagrams of embodiments of methods for matching suitable remote players to one or more local players of a rhythm-action game.

Referring now to FIG. 2A, a flow chart illustrating one embodiment of a method for allowing players to form transient online bands is shown. Players may form online bands for the purpose of playing a rhythm action game cooperatively and/or competitively with remotely located players. In brief overview, the method comprises plugging into a local machine which assigns the player, who has chosen a character to play as, to a slot. One or more additional local players may join. The player may then find additional players, invite specific players, or remove players from the band. Once the band slots have been filled, the game may begin. Although FIG. 2A discusses online functionality in the context of MICROSOFT XBOX LIVE, it should be understood that any game system and any network functionality associated with any game system may be used.

Still referring to FIG. 2A, a player may decide to play an online experience by selecting an option from a menu. In some embodiments, a game may provide a "quickplay" option in which a player may play one or more songs with a number of other players without first creating a persistent band. Throughout the description, this mode may be referred to as "quickplay" or "transient band" mode.

The game may first detect whether one or more local players are present, and which simulated instruments the local players would like to use. In some embodiments, the game may detect the type or types of controllers plugged into the game to determine the simulated instruments used by the local players. In other embodiments, the game may allow a player to select their instrument. For example, if the game detects that a player has plugged in a guitar controller, the game may allow a player to choose between playing guitar or bass parts. For local players, slots in a band may also reflect the order the controllers are plugged into a game system, and/or the arrangement in which the controllers are plugged into given physical slots on the game system. Or for example, slots in a band may reflect the order avatars appear on stage during performances.

After the game has detected a local player using a simulated instrument, the game may allow the player to select or create a character to represent the player in the game. A character may comprise any information to the player, and may be customized by the player in any way. Character attributes which may be set by a player and/or set automatically include a character name, screen name, hometown, motto, favorite music, skill level, amount of in-game money, bands the character is a member of, and amount of in-game fame. In some embodiments, a player may be able to customize an avatar representing the character. A player may alter any attribute of an avatar including without limitation gender, appearance, clothing, style, gestures, size, height, color, in-game instrument, gear, demeanor, tattoos, face paint, and makeup. In some embodiments, a player may modify their avatar's clothing or instrument with virtual stickers. In some embodiments, a player may save a character so that it can be accessed later. In other embodiments, the character may be erased after a use. In some embodiments, character data may be uploaded and/or saved on a server so that other players may view the character. In some embodiments, a server may provide a leaderboard or similar feature which allows users to browse through a listing of characters and view their past performance. In some embodiments, a single player may be able to create and/or maintain multiple characters.

After a player has created a character or selected an already created character, the player may be taken to a screen which allows the player to assemble or join a band. Referring ahead to FIGS. 3A and 3B, example screenshots of a band selection screen are shown. This example screen may be used in conjunction with the band matching methods illustrated in FIGS. 2A and 2B. In brief overview, in FIG. 3A the player "rocker hmx" is currently joined to playas a band using the avatar "Jyllian". Three open slots labeled "searching" are shown signifying that searching for these members is taking place online.

A band may have a leader who is designated as the decision maker for certain matters involving the band. In some embodiments, the band leader may have the sole authority to find new players for a band, which may entail either asking specific players to join or using an online player matching service. In some embodiments, the band leader may have the sole authority to remove band members.

As shown in FIG. 2A, after arriving at the band formation screen, a player may be able to invite one or more local or remote players to join the band. In some embodiments, the player may be able to select from a list of friends, or a list of players the player has previously played with to invite. In other embodiments, the player may be able to search through a listing of players to invite. In these embodiments, the listing may be sorted by skill level, latency, instrument, physical location, experience, or username in order to aid the player's search. In some embodiments, after a player has joined a band, the player may be able to select the character they want to play as. For example, in FIG. 2A, the player "rocker hmx" may select among a number of characters that player has created using the "select rocker" option (shown in FIG. 3A), or may have the option to create a new character. In some embodiments, certain characters may not be available to a player if the characters correspond to a different instrument than the user is playing.

A band formation screen may also have the option to search for additional remote players in the cases where there is not a specific player the player would like to invite into the band. Referring ahead to FIGS. 3A and 3B this may take the form of a "Search" and/or "Cancel Search" menu option displayed. This option (which may also be included in the screen of FIG. 3B) may employ an algorithm which finds players of similar skill to play against. After a player has selected to search for players, the player may also be able to cancel the search, such as if the search is taking too long, or another local player arrives. In some embodiments, after a player selects to search for more players, the one or more players found by the search algorithm will appear in the slots as members of the band. In other embodiments, a player may be prompted "do you want to allow player _____ to join?" and allowed to select yes or no. In any of these embodiments, the band leader may be able to kick out a player after they have joined. In some cases, after a player selects to search for players, a search algorithm may determine that the player matches with another, larger, partially formed band looking for players. In these cases, the player may be prompted as to whether they want to join the matching band instead of finding players for their own band.

A search algorithm used to match players may match players based on any criteria including, without limitation, skill, latency, experience, instrument, physical location, language, and hardware. For example, in one embodiment, a search algorithm may first search for players of the required instruments of a comparable skill level. In some embodiments, skill level may be measured using a history of past online performance. After identifying a pool of comparably skilled players of the required instruments, the search algorithm may select the player with the lowest latency to the forming band. In this embodiment, the latency measure may be either the latency between the potential players and the searching player or between the potential players and a given server.

After a transient band is formed, the band may then be given the opportunity to play one or more songs as a band. In some embodiments, one or more members of the band may be replaced after a song. In some embodiments, a transient band may be given the option to change into a persistent band.

Referring back to FIG. 2A, after connecting a controller and selecting a character, a player may also have the option of starting a session with a persistent band of which they are a member. This is shown in FIG. 2A as the "assemble a band" flow. In that flow a player selects a band they are a member of, and then invitations are sent to the other players to join a session as that band. Invitations to other players can be sent via any means, and appear on the other players' screens' in any manner. Invitations may be sent using the "Invite Friend" menu option as shown in FIGS. 3A and 3B. In one embodiment, each invited player may receive a pop-up message saying "Player _____ has invited you to play with _____ the band." If a player accepts an invitation to join a band, they may be displayed on a screen such as FIG. 3B, with the indication "[player who invited them]'s Guest".

A game may also provide a screen for creating and editing properties of a band. These properties may be stored locally or on a server. Properties of a band may include the names of the band members, the date the band was created, the name of the band leader, the number of songs the band has performed, the amount of fame the band has accumulated, the current amount of "buzz" surrounding the band, the number and type of venues the band has played at, the band's "hometown," a band logo, band possessions such as vehicles, equipment, and money, and band employees, such as roadies, set designers, managers, and agents. In some embodiments, some or all of these properties may be set by a member of the band or by the band leader. In other embodiments, some or all of these properties may be determined by a central server tracking the band's progress. In some embodiments, an external web site may be provided which allows a band's attributes and/or progress through a tour to be viewed over the internet. In one of these embodiments, the web site may give bands an option to make their attributes and statistics public Referring now to FIG. 2B, a flow chart illustrating an embodiment of a method for matching suitable remote players to one or more local players of a rhythm-action game is shown. In brief overview, the method comprises: identifying one or more local players to participate in a networked session of a rhythm action game corresponding to a predetermined band template, each local player associated with a type of simulated musical instrument (step 201); identifying a first type of simulated musical instrument represented in the predetermined band template and not associated with any of the one or more local players (step 203); identifying a remote player associated with the first type of simulated musical instrument (step 205); and providing a networked session of the rhythm action game with the one or more local players and the identified remote player (step 207). Any of the steps shown may be performed by a game console, a centralized server, or a plurality of game consoles.

Figure 2B:
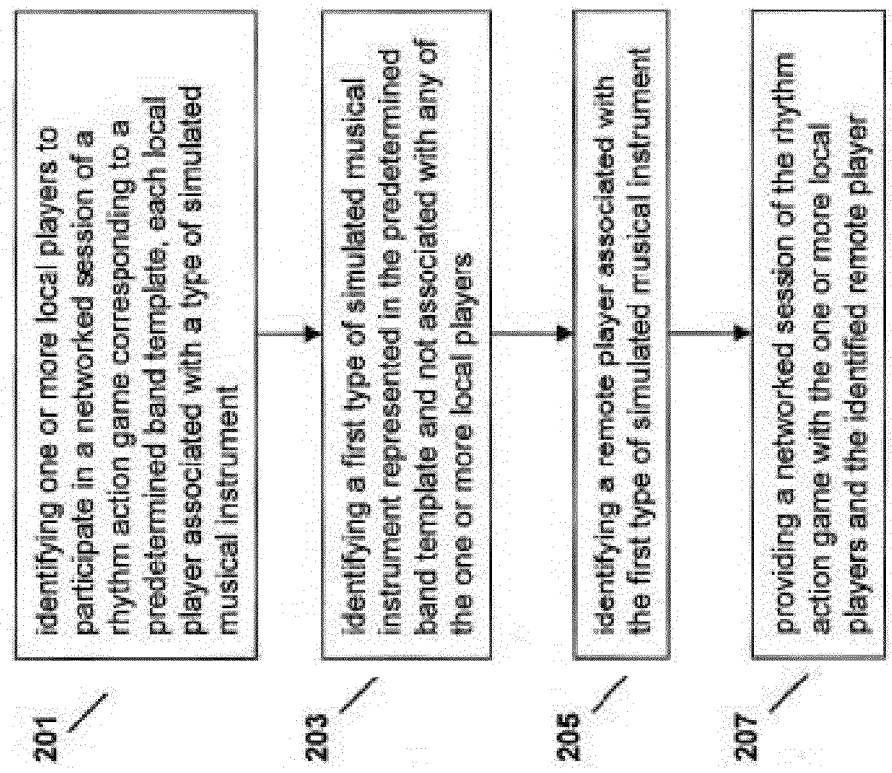
Figure 3A:
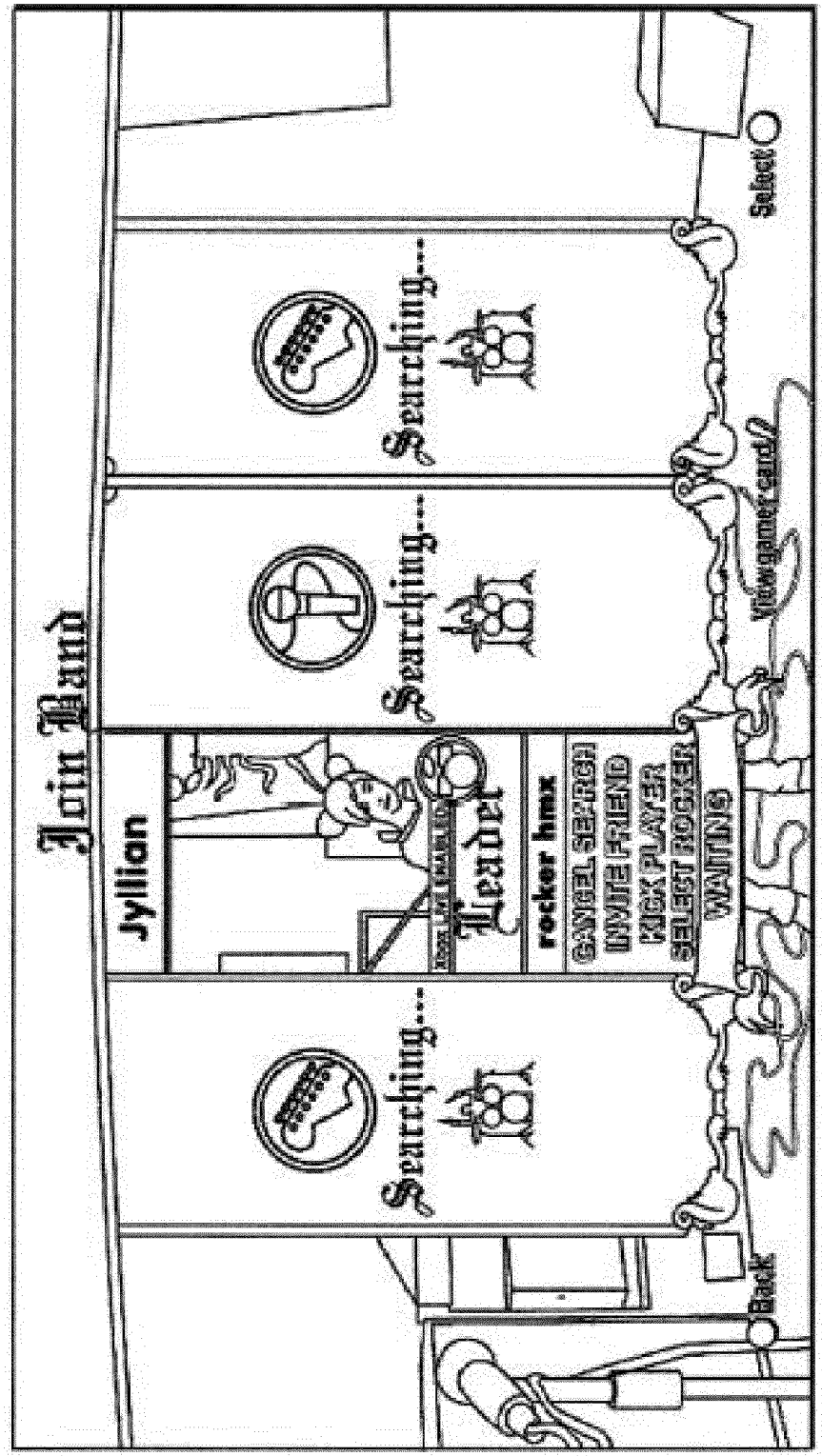
FIGS. 3A and 3B are example screenshots of a game which permits players to form bands with remote players.
Figure 3B:
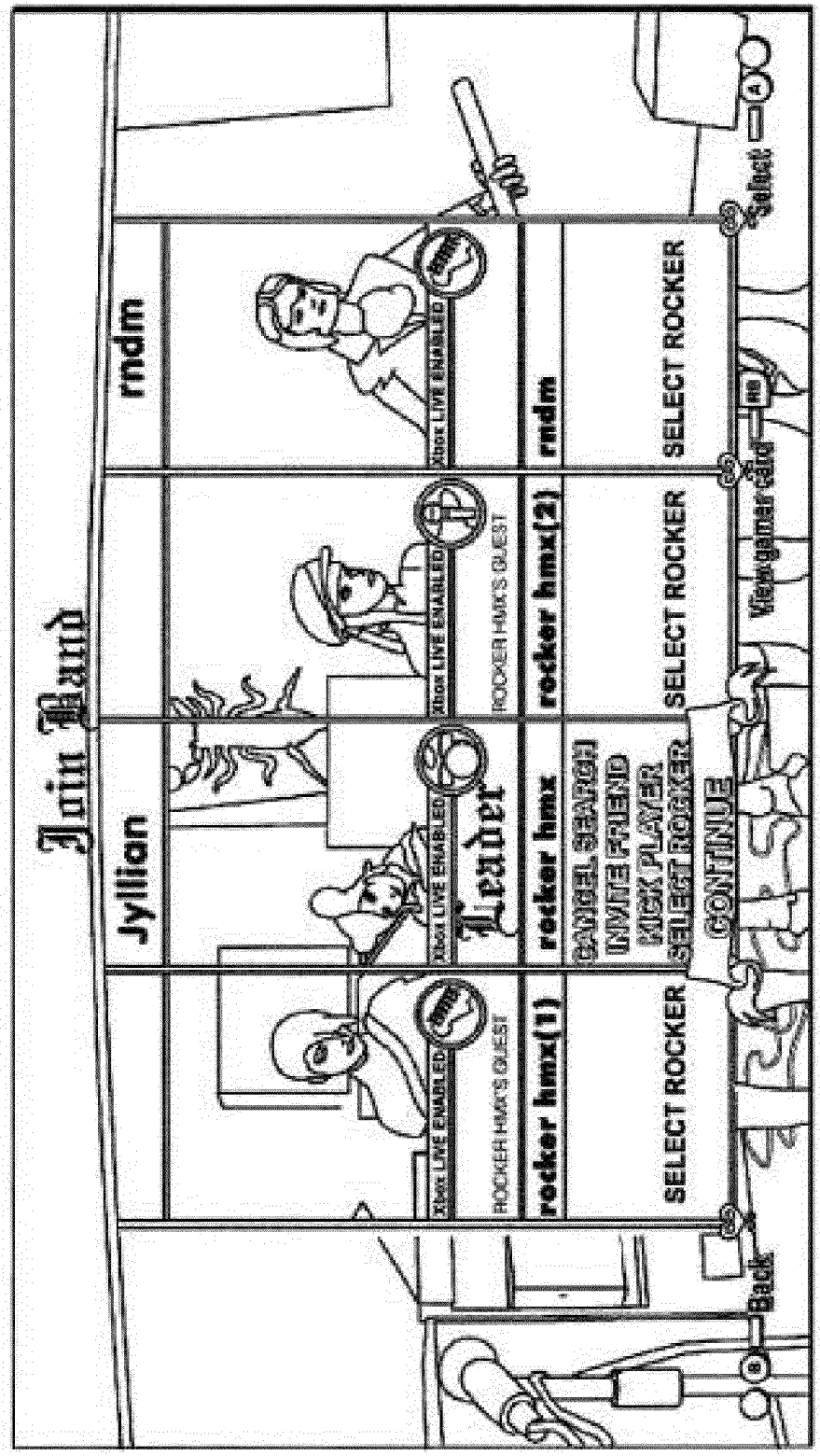

Still referring to FIG. 2B, now in greater detail, one or more local players may be identified to participate in a networked session of a rhythm action game corresponding to a predetermined band template, each local player associated with a type of simulated musical instrument. The local players may be identified by any means and at any time. For example, the local players may be identified by one or more simulated instruments connected to the local game console. The local players may be identified at different times. For example, a local player may begin searching for remote players, and another local player may join midway through the remote search process or after the remote search process has been completed.

A band template may comprise any specification of allowable instrument types and numbers of those types for a rhythm-action game. A band template may specify minimum and/or maximum numbers for each instrument type. For example, a band template may specify that a band may have up to two guitarists, one drummer, and one vocalist. Or for example, a band template may specify that a band must have at least one guitarist, at least one vocalist, and no more than one drummer. Or for example, a band template may specify that a band may have a guitarist, a bassist, a drummer, and a vocalist.

The method may then comprise identifying a first type of simulated musical instrument represented in the predetermined band template and not associated with any of the one or more local players (step 203). For example, if a guitarist and a drummer are the local players, and the band template specifies that a band includes a guitarist, a bassist, a drummer, and a vocalist, the method may identify that a vocalist and bassist are the types not represented locally. This identification may be performed either by the local console, a central server, or a remote console.

The method may then comprise identifying a remote player associated with the first type of simulated musical instrument (step 205). The remote player may be further identified by any criteria, including without limitation the remote player's presence in a group having one or more other needed instrument types.

After the players have been identified, a networked session of the rhythm action game may be provided with the one or more local players and the identified remote player (step 207). The session may be hosted on any of the local console, the remote console, or a central server. The session may comprise any of the gameplay described herein, and may comprise a persistent band or a quickplay session.

Quickplay Example

The following paragraphs provide a detailed example of how online matchmaking may be implemented in a game that allows up to four players to play together, including 2 guitarists, one vocalist, and 1 drummer. In the quickplay mode, players are able to form a cooperative band to play songs without any persistent data stored about their team. A full band consists of 1 drummer, 1 vocalist, and 2 guitarists. When the user first enters our matchmaking screen, he is allowed to join the band and become its leader. Any other players in the same room can also connect instruments to the console and join up as members of the band.

At this point in the process, the player has created a session on a matchmaking server. However, the session is marked as "private", meaning that no one else can see that it exists yet. If the player only wants to play online with friends, he then selects an "Invite Friend" button. This will bring up a list of the player's friends, and upon selecting a friend, an invite message is sent to the matchmaking server, which then relays the message to the friend if he is currently playing the game. If the friend accepts the invite, he is given the appropriate information that will allow him to connect to the session, even though it may still be private on the matchmaking server. An invite system may be structured such that the friend can receive an invite while in any game mode (e.g. mid-song, in single-player modes, etc.). In this way, it does not require him to be sitting in a lobby to see that his friend would like to play with him.

A user may also decide that he would like to play with strangers. To do this, he selects a "Find Players" option on the matchmaking screen. At this point, the screen goes into a "searching" state. A matchmaking algorithm optimized to form complete bands as quickly as possible may then be started:

1) The player's console identifies the instruments that are present locally (step 201) and then sends a search request to the matchmaking server along with a list of the instruments that the local band contains. The matchmaking server will search its database for every session that has marked itself as "public," and returns a list of the sessions that have the correct empty instrument slots (steps 203 and 205). For example, if the searching session has a guitarist and drummer, the matchmaking server will filter out every session that already has a drummer, or two guitarists. Note that having one or no guitarists is acceptable since bands can have two guitarists, but only one drummer.

2) The console receives the list of viable sessions and sorts them, giving higher priority to sessions that have fewer available slots. This may enable full bands to fill up quickly and can proceed to playing the game. It may also reduce load on the server to have sessions removed from the public pool as quickly as possible.

3) The console attempts to join the first session in the list, where the hosting console performs a full handshake and verification that the instrument configuration is legal. The hosting console will reject if the slots have already been taken, if the remote console is currently attempting to join a different session, or if the remote console has already moved on past the matchmaking screen.

4) If the join is successful, the algorithm stops and the console is now a member of another's session. Otherwise, the game looks at the next session in the list and repeats step 3 as many times as there are results in the list.

5) If the game has gone through the entire search list and has still been unable to join another session, he then tells the server to mark his own session as "public". At this point, another console may join his session. If this ever happens, the game will stay in this "public" state until the band fills up or the host decides to move on with an incomplete band. Also, once a remote user has joined, the game will never move on to the next step. Note also that the host must update its current instrument configuration on the matchmaking server every time a new console joins the session.

6) The game waits a random amount of time between 10 and 20 seconds. If no remote console joins the session in this time, he sends another search ping to the matchmaking server and repeats 2-5. The session will stay "public" on the server, but will reject any join requests if he is currently waiting for a join request from another host.

7) Once a full complement has joined the session and/or the user of the host console designates that he is satisfied with the band composition (which may include the user deciding to play with one or more open slots) a game starts with the joined consoles (step 207).

Head to Head Example

In some embodiments, the matchmaking algorithms described herein may be applied to head-to-head competitive modes, such as one-on-one remote competitions and remote "battle of the bands" competitions. Matchmaking with strangers in head to head modes uses a modified version of the above algorithm, in which players are grouped with opponents that are using the same instrument type.

In some modes, players with a guitar controller are required to choose whether they want to play a song's guitar part or bass part before they enter the matchmaking screen. In those cases, guitarists are only matched up with other guitarists who chose the same part that they did. In other modes, users are required to choose a difficulty level before they are match. In those cases, only players that have chosen the same difficulty will be grouped together.

Head-to-head modes may fall into two general categories: "Player Match" and "Ranked". Player Matches are casual encounters in which no stats are recorded. In Player Matches, the user may invite his friends to play with a mechanic that is similar to Band Quickplay. In Ranked matches, details about the winner and loser are tracked so that users may be ranked on a leaderboard. Players are not allowed to invite friends to play them in a Ranked match, as that would allow players to rig matches in order to abuse the ranking system.

Persistent Band Example

In some embodiments, the matching methods described herein may be applied to persistent band modes. For example, a game may provide a "World Tour" option which allows persistent bands to make progress as a group together through a set of venues, events, and songs, and resume their progress later if they desire.

After choosing the persistent mode, a player chooses one of four options:
1) Start a new band
2) Substitute for an existing band
3) Select an existing band that the user owns
4) Select an existing band that the user is a member of but does not own When a player chooses to start a new band, he will own the band. The user is taken to a matchmaking screen that may look similar to the matchmaking screens for Quickplay (FIGS. 3A and 3B). Just as in the other modes, the user can keep his session private and invite his friends directly into the session. He can also select "Find Players," which will mark his session as public. At this point, random strangers may join his session, provided they have the correct instruments. Unlike Band Quickplay, however, this mode may not prompt the player's console to start looking for sessions to join. In persistent mode, the creator of the band may be guaranteed to be the host. After the user has proceeded past the matchmaking screen, he will have the option to make any users currently in the session permanent members of the band if desired.

When a player chooses to substitute for a band, he will be taken to a searching screen, where he will wait while the game asks the server for a list of bands that have a slot available for his instrument. This search will only find sessions that have marked themselves as public. Once the server has returned the list, the game will sort the list, giving highest priority to larger bands. The game then starts at the top of the list, and attempts to join each session in order. As soon as a join request is accepted, the console joins the session and the user joins the host on the matchmaking screen. At that moment, he is a "substitute" or a temporary member of the band, though the host may decide to promote him to a permanent member.

If the player chooses a band that he has already created, he will be taken again to the matchmaking screen. As before, he will have the option to invite his friends or allow strangers to join the band if he wishes. However, any other remote player that he has already added to the band's permanent roster will also be able to join into the band, even without him explicitly inviting the player or making the session public.

If a player chooses a band that he is a member of, but is not the owner, he is taken to a searching screen. He sends a special request to the matchmaking server which contains the unique ID of the band. The matchmaking server looks through all its existing sessions to see if the owner is currently playing Band World Tour for that band. Even if the session is marked as private, the matchmaking server will return the connection info for the session so that the user can join up. This structure ensures that the band owner doesn't have to send out invites to each friend to join the session.

Figure 4A:
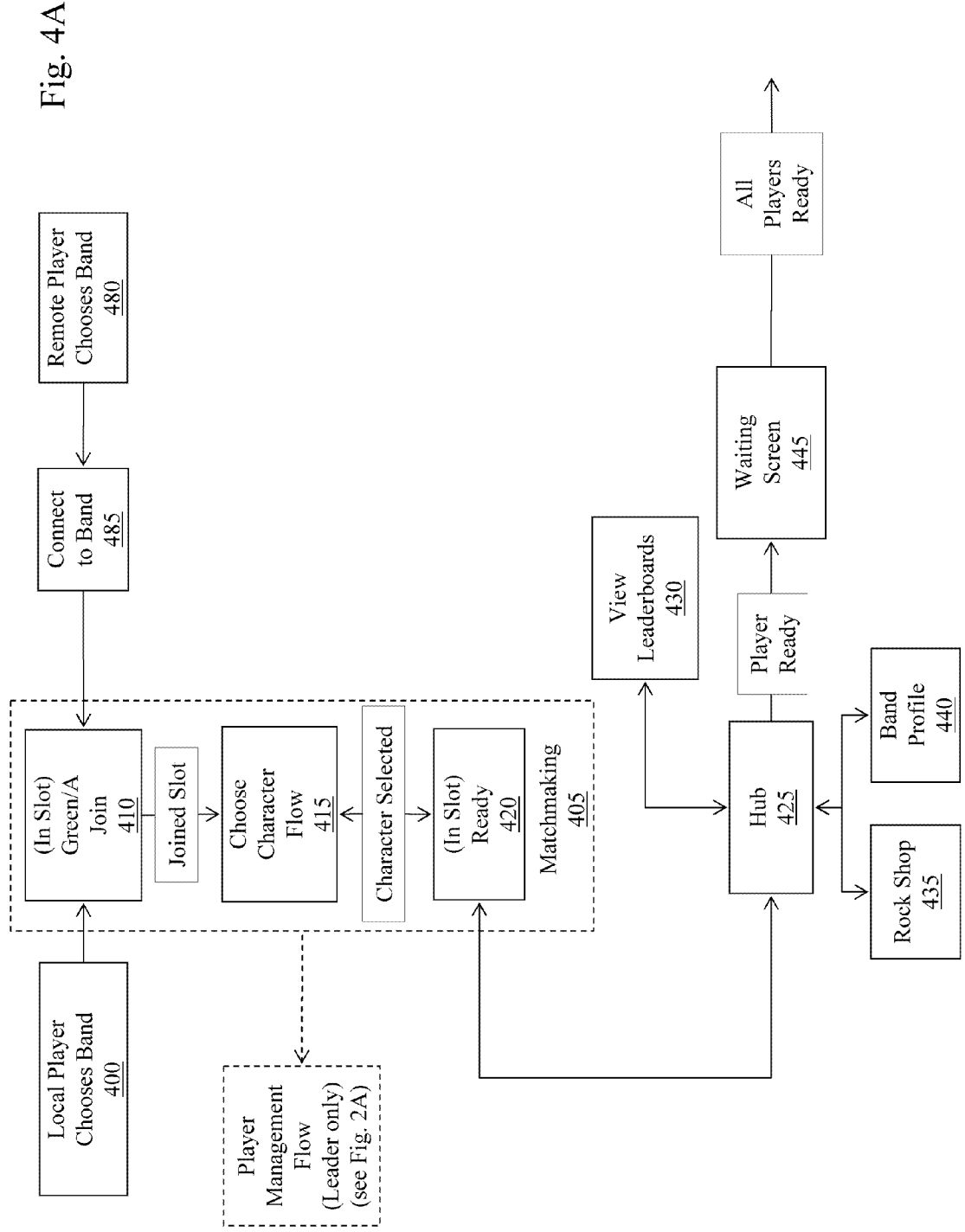
FIG. 4A depicts a flow similar to that of FIG. 2A, but with the players using asynchronous shell interfaces to interact with the game and to send and receive notifications to/from other players consoles.

In some embodiments, though the sessions of the remote players and the local players are networked and in communication, the remote members of the band or the leader can perform certain actions asynchronously from each other before beginning gameplay, such as look at band leaderboards, i.e., high score tables, modify their avatar's appearance, or view or alter the band profile, while the members or leader are waiting for all members of the band to be ready to play. These actions are possible by desynchronizing the interfaces, or "shells," of the consoles until all players are ready to play the game. Advantageously, the invention provides a notification system to inform players of the actions other players are performing, such as players joining or leaving, what other players are doing, or that other players are ready to play. FIG. 4A depicts a flow similar to that of FIG. 2A, but with the players using asynchronous shell interfaces to interact with the game and to send and receive notifications to/from other players' consoles. Although FIG. 4A omits the remote player management aspect of FIG. 2A, the remote player management is still available and present. It is removed from FIG. 4A for solely for clarity.

As shown in FIG. 4A, the local player (or players) chooses a band 400 and enters matchmaking 405. The local player joins the session and is assigned a slot based on their instrument 410. From this point, any of the following actions and interactions with remote players can occur in any order. The local player chooses a character or avatar 415 and when he indicates he is ready 420, he is taken to a Hub screen 425, which is, in effect a standby screen.

Figure 4B:
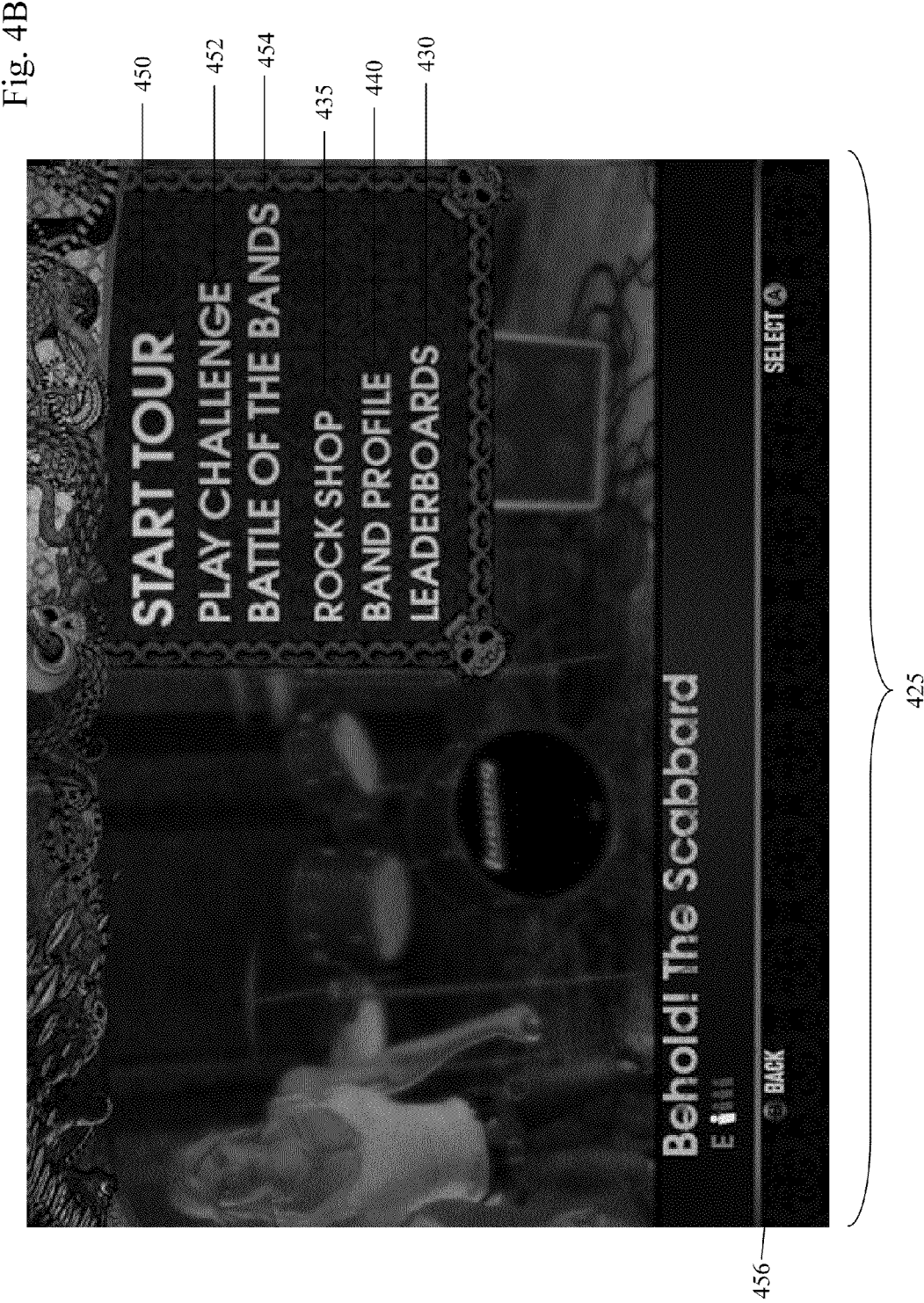
FIG. 4B is a screen shot depicting a player's view of a Hub Screen.

FIG. 4B is a screen shot depicting a player's view of the Hub Screen 425. Here, the Hub 425 is the screen as-seen by the player zslmtu236, described below. From the Hub 425, the player can select "Start Tour" 450 which indicates he is ready to play the game and which will take him to a waiting screen 445, or he can select "Play Challenge" 452 or "Battle of the Bands" 454 which allow the band to complete certain achievements or play against other bands for a high score for a particular song, set of songs, and the like. From the Hub Screen 425, the player can also select "Rock Shop," 435 "Band Profile," 440 and "Leaderboards," 430 which take the player to the respective areas described below. The player may also select "back" 456 to take the player back to the Matchmaking area 405.

Asynchronous to the local player or where in the flow the local player is, the remote player also chooses a band 480 and connects to the local player's band 485. The remote player also enters matchmaking 405. The remote player joins the session and is assigned a slot based on their instrument 410 and selects a character 415. When the remote player indicates he is ready 420, he is also taken to the Hub screen 425.

As described above, from the Hub screen 425, the local player or remote player can view high score tables ("leaderboards") 430, visit the Rock Shop 435 (character/avatar customization), view or alter the band profile 440, or indicate that he is ready to begin gameplay at which point he is taken to a waiting screen 445. Again, any player can be at any point in the flow relative to the other players' consoles. For example, while the remote player is joining 410, the local player can be in the Hub 425, in the Rock Shop 435, etc. Advantageously, the alternative is true as well; the remote player can be in the Hub 425 or viewing the band profile 440 or other actions while the local player is still choosing his character or avatar 415. The local or remote player can also indicate he is ready from the Hub 425 and wait for the other players to finish in the Rock Shop 435, viewing high score tables 430, etc, and when all players have indicated they are ready to begin gameplay (via the Hub 425), the game begins.

Figure 5A:
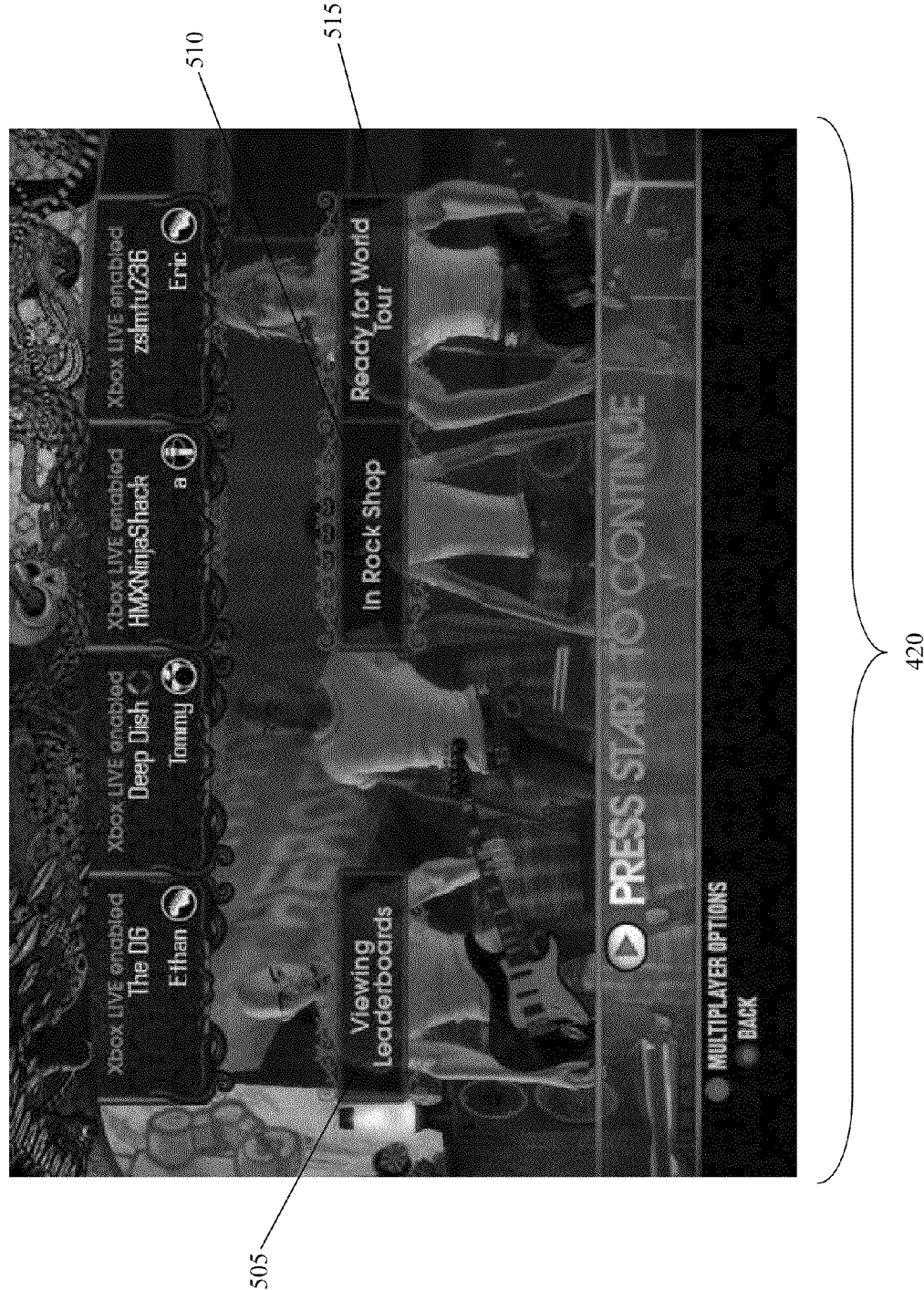

FIGS. 5A, 5B, 5C, and 5D depict remote players and the leader performing various actions described herein asynchronously via their shells while waiting for all players to be ready. FIG. 5A depicts the matchmaking area 405 described herein, as seen by player Deep Dish (playing as "Tommy"), where players join slots of the instruments of the band template. In 5A, the players have already chosen their characters and are already in their slots 420. For example, the character "Ethan" is assigned to the guitar, "Tommy" is assigned to the drums, "a" is assigned to the microphone, and "Eric" is assigned to the guitar. In this embodiment, the players do not all stay on the matchmaking screen until everyone is ready to play. Instead, remote players—here "Ethan," played by the player The DG, "a," played by the player HMXNinjaShack, and "Eric," played by the player zslmtu236—are interacting on their consoles with the various customization and high score table screens while waiting for everyone to be ready to play. In this example, Tommy, played by the player Deep Dish, is still in matchmaking 405 and has not indicated he is ready to play. Ethan is indicated 505 as viewing the leaderboards 430 and "a" is indicated 510 as being in the character customization area (i.e., the "Rock Shop" 435). Eric is indicated 515 as being ready to play the game and is thus marked as "Ready for World Tour."

Figure 5B:
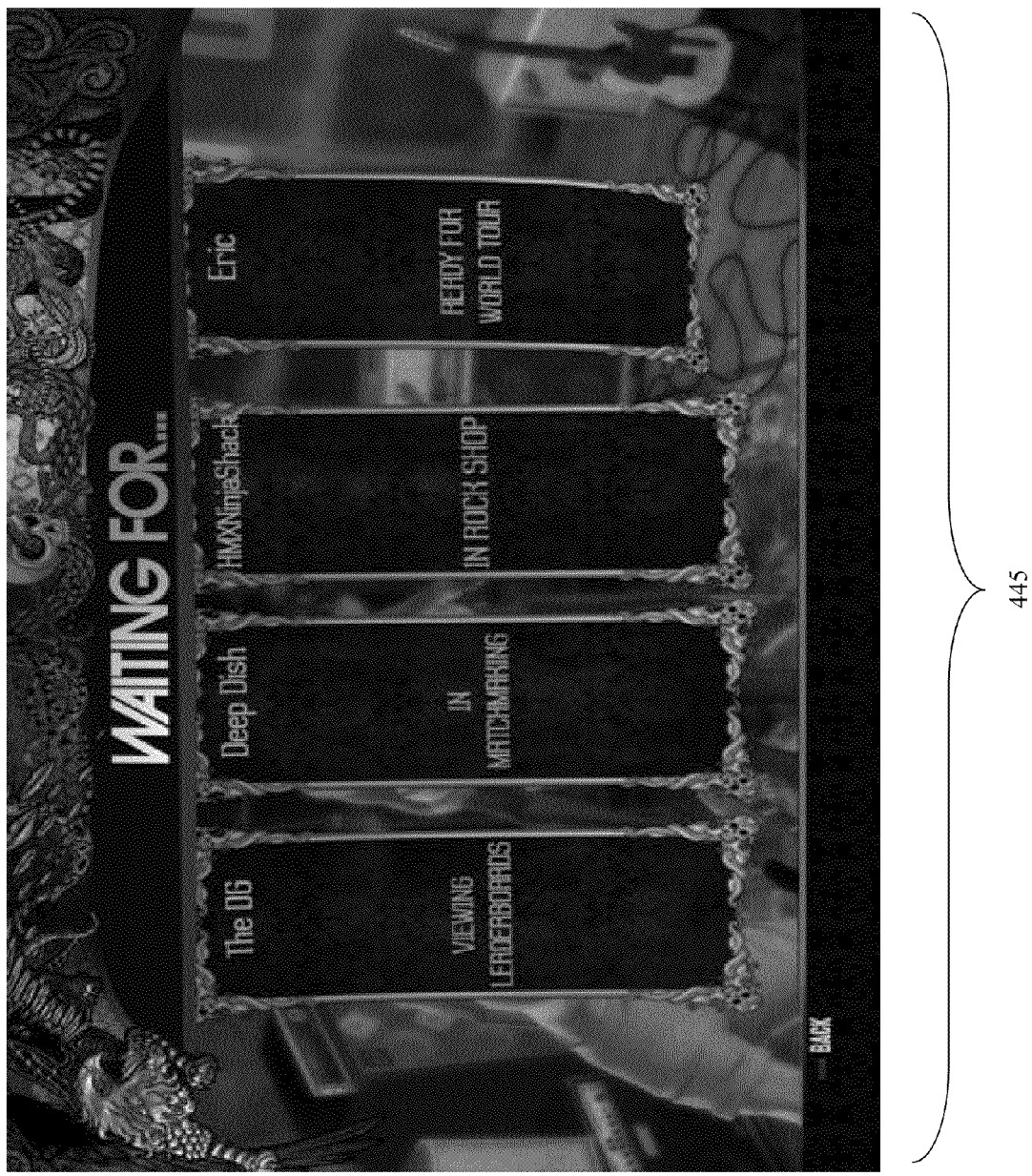

FIG. 5B depicts the screen zslmtu236 (playing as Eric) sees after he has indicated he is ready to play the game. He is taken to a waiting screen 445 where the other players' activities are displayed. As before, player Deep Dish (Tommy) is in matchmaking 405, player The DG is viewing the leaderboards 430, and HMXNinjaShack is in the Rock Shop 435. Zslmtu236 can see what the other players are doing so he knows who is preventing the game from starting and who he is waiting for.

Figure 5C:
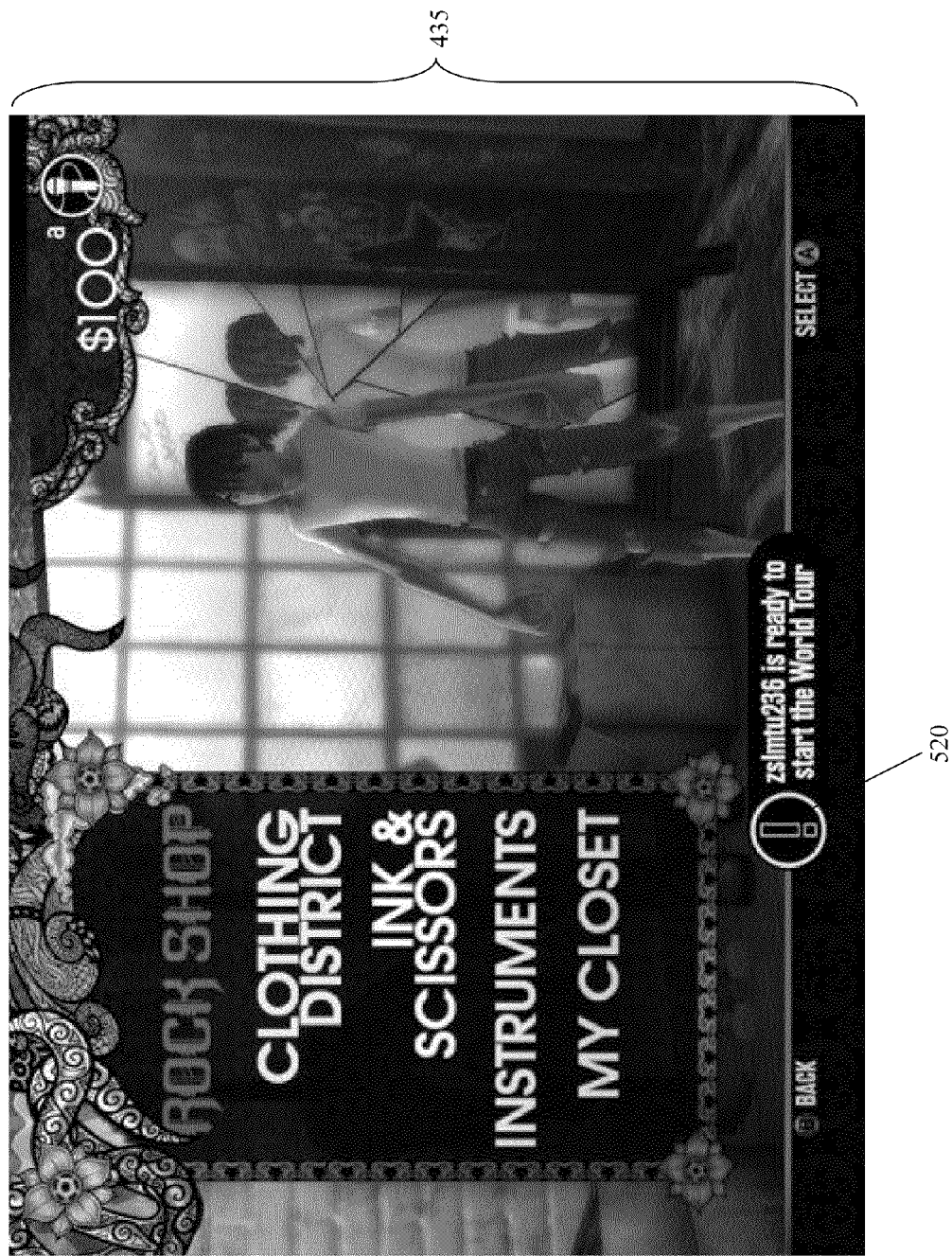

FIG. 5C depicts the screen HMXNinjaShack sees while he is in the character customization screen, i.e., the Rock Shop 435. While in the Rock Shop 435, HMXNinjaShack can perform all of the customizations described herein, e.g., alter clothing, haircuts, tattoos, etc. Beneficially, in this embodiment, HMXNinjaShack is alerted 520 that zslmtu236 is ready to play the game via a notification alert. The notification alert 520 is a network notification sent between game consoles of the players upon a player transitioning to or from another screen, e.g., to or from the Hub 425, to or from the Rock Shop 435, the Band Profile 440, etc. The notification 520 instructs HMXNinjaShack that other players are waiting on him to finish customizing his character so all players can start playing the game. When HMXNinjaShack is finished customizing his character, he is taken to the Hub screen, where he can indicate he is ready to start playing the game.

FIG. 5D depicts the screen player The DG sees, i.e., the leaderboards 430, while waiting for other players to be ready to play. In FIG. 5D, The DG is alerted 525 that player Deep Dish has joined. This is advantageous because if The DG was viewing the leaderboards 430 while waiting for all players to join the networked session, now The DG can return to the Hub 425 and indicate he is ready to play.

Aspects of the present invention may be provided as one or more computer-readable programs embodied on or in one or more articles of manufacture comprising computer readable media. The article of manufacture may be a floppy disk, a hard disk, a CD-ROM, DVD, other optical disk, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as executable instructions. In some embodiments, portions of the software programs may be stored on or in one or more articles of manufacture, and other portions may be made available for download to a hard drive or other media connected to a game platform. For example, a game may be sold on an optical disk, but patches and/or downloadable content may be made available online containing additional features or functionality.

Having described certain embodiments of the invention, it will now become apparent to one of skill in the art that other embodiments incorporating the concepts of the invention may be used.

What is claimed is:

1. A method for providing interaction between a remote player and a local player of a rhythm-action game executed on a local game console, the method comprising:
   identifying, by the local game console, at least one local input device configured to participate in a networked session of a rhythm action game corresponding to a band template, wherein the band template includes a plurality of slots, each slot is associated with a particular type of simulated musical instrument, and wherein the local input device is i) a (game controller coupled to the game console, ii) associated with a particular simulated musical instrument controller type, and iii) configured to be associated with one of the plurality of slots;
   for each of the at least one local input device, determining an associated one of the plurality of slots based on the simulated musical instrument controller type of the local input device;
   determining, by the local game console, a first slot of the plurality of slots that is not associated with any of the at least one local input device;
   determining a first simulated musical instrument controller type associated with the first slot;
   providing, from the local game console, information to search for and identify a remote input device, coupled to a remote game console, associated with the first simulated musical instrument controller type; and
   communicating, by the local game console, with the remote game console, to establish the networked session of the rhythm action game with the local input device and the remote input device before initiating a game session for the local input device and the remote input device.

2. The method of claim 1, further comprising providing a first standby interface for the local input device and a second standby interface for the remote input device, wherein the first standby interface and the second standby interface enable the local input device and the remote input device, respectively, to accommodate actions that are part of the networked session, wherein the actions of the local input device are asynchronous with respect to the actions of the remote input device.

3. The method of claim 2 wherein the actions comprise customizing an avatar using at least one of the local input device and the remote input device.

4. The method of claim 2 wherein the actions comprise causing the display of a leader board.

5. The method of claim 2 wherein the actions comprise at least one of causing the display of a band profile and altering the band profile.

6. The method of claim 2 wherein the actions comprise indicating that the local player is ready to play.

7. The method of claim 2 wherein the actions comprise choosing an avatar.

8. The method of claim 2 further comprising, after all players associated with the input devices have indicated that they are ready to play, synchronizing the networked session of all players, and initiating a gameplay session.

9. The method of claim 1 wherein, if the remote player associated with the remote input device was previously added to a networked session with the local player and added to a band, enabling the remote player to join the networked session without an invitation from the local game console.

10. The method of claim 1, wherein the local input device is identified after the remote input device is identified.

11. The method of claim 1, further comprising instructing a display to display an option to search for a particular remote player.

12. The method of claim 1, further comprising instructing a display to display an option to allow a remote player to join.

13. The method of claim 1, further comprising instructing a display to display an option to invite a specific remote player.

14. The method of claim 1, further comprising identifying a plurality of remote input devices, each remote input device associated with a particular simulated musical instrument type and associated with any one of the plurality of slots not associated with any of the at least one local input device.

15. The method of claim 14, wherein the plurality of remote input devices are local to each other.

16. A non-transitory computer-readable medium storing computer readable instructions, for providing interaction between a remote player and a local player of a rhythm-action game, the computer readable instructions operable to cause a data processing apparatus to:
identify at least one local input device configured to participate in a networked session of a rhythm action game corresponding to a band template, wherein the band template includes a plurality of slots, each slot is associated with a particular type of simulated musical instrument, and wherein the local input device is i) a game controller coupled to a game console, ii) associated with a particular simulated musical instrument controller type, and iii) configured to be associated with one of the plurality of slots;
determine, for each of the at least one local input device, an associated one of the plurality of slots based on the simulated musical instrument controller type of the local input device;
determine that a first slot of the plurality of slots is not associated with any of the at least one local input device;
determine a first simulated musical instrument controller type associated with the first slot;
provide information to search for and identify a remote input device, coupled to a remote game console, associated with the first simulated musical instrument controller type; and
communicate with the remote game console to establish the networked session of the rhythm action game between the local input device and the remote input device before initiating a game session for the local input device and the remote input device.

17. The non-transitory computer-readable medium storing computer readable instructions of claim 16, further including instructions operable to cause the data processing apparatus to provide a first standby interface for the local input device and a second standby interface for the remote input device, wherein the first standby interface and the second standby interface enable the local input device and the remote input device to receive actions that are part of the networked session asynchronously from the other input device.

18. The non-transitory computer-readable medium storing computer readable instructions of claim 17 wherein the actions comprise customizing an avatar.

19. The non-transitory computer-readable medium storing computer readable instructions of claim 17 wherein the actions comprise causing the display of a high score table.

20. The non-transitory computer-readable medium storing computer readable instructions of claim 17 wherein the actions comprise at least one of causing the display of a band profile and altering the band profile using the local input device.

21. The non-transitory computer-readable medium storing computer readable instructions of claim 17 wherein the actions comprise indicating that the local player is ready to play.

22. The non-transitory computer-readable medium storing computer readable instructions of claim 17 wherein the actions comprise choosing an avatar.

23. The non-transitory computer-readable medium storing computer readable instructions of claim 17 further comprising instructions operable to cause the data processing apparatus, when all players associated with the input devices have indicated that they are ready to play, to synchronize the networked session of the rhythm action game, and initiate a gameplay session.

24. The non-transitory computer-readable medium storing computer readable instructions of claim 16 wherein, if the remote player was previously added to a networked session with the local player and added to a band, the instructions are further operable to cause the data processing apparatus to enable the remote player to join the networked session without an invitation from the local player.

* * * * *